US007815107B2

(12) United States Patent
Kingsborough et al.

(10) Patent No.: US 7,815,107 B2
(45) Date of Patent: Oct. 19, 2010

(54) PAYMENT PROGRAM FOR USE IN POINT-OF-SALE TRANSACTIONS

(75) Inventors: Donald Kingsborough, Danville, CA (US); Talbott Roche, Belvedere, CA (US); Teri Llach, Palo Alto, CA (US); Julianna Shaw, Hillsborough, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 344 days.

(21) Appl. No.: 11/459,738

(22) Filed: Jul. 25, 2006

(65) Prior Publication Data
US 2007/0022008 A1 Jan. 25, 2007

Related U.S. Application Data

(60) Provisional application No. 60/702,193, filed on Jul. 25, 2005.

(51) Int. Cl.
*G06K 5/00* (2006.01)
(52) U.S. Cl. .......................... 235/380; 235/493; 705/14; 705/39; 705/1; 705/64; 705/38
(58) Field of Classification Search ................. 235/380, 235/493; 705/14, 39, 1, 64, 38
See application file for complete search history.

(56) References Cited

U.S. PATENT DOCUMENTS

| | | | |
|---|---|---|---|
| 5,970,480 | A | 10/1999 | Kalina |
| 6,227,447 | B1 | 5/2001 | Campisano |
| 6,341,724 | B2 | 1/2002 | Campisano |
| 7,104,443 | B1 | 9/2006 | Paul et al. |
| 2002/0120582 | A1 * | 8/2002 | Elston et al. .................. 705/64 |
| 2003/0061167 | A1 | 3/2003 | Mann, III et al. |
| 2004/0200897 | A1 * | 10/2004 | Demere ...................... 235/380 |
| 2006/0000893 | A1 * | 1/2006 | Bonalle et al. ............... 235/380 |
| 2006/0000900 | A1 * | 1/2006 | Fernandes et al. ........... 235/380 |
| 2006/0015404 | A1 * | 1/2006 | Tran ............................ 705/14 |
| 2006/0118611 | A1 | 6/2006 | Michelsen et al. |

(Continued)

OTHER PUBLICATIONS

Foreign communication from related counterpart application—International Search Report and Written Opinion, PCT/US06/28773, Feb. 21, 2007, 6 pages.

(Continued)

*Primary Examiner*—Allyson N Trail
(74) *Attorney, Agent, or Firm*—Conley Rose, P.C.; Rodney B. Carroll

(57) ABSTRACT

In some embodiments, the present application relates to card-free programs provided by a merchant to a customer, whereby the customer has access to functions such as payment options and/or loyalty program benefits without needing to present a physical card at a point of sale. For example, a customer may make a card-free purchase of goods or services from a merchant, whereby the customer need not present a card such as a debit card, credit card, loyalty card, or other physical tender to make a purchase. Further, the customer need not provide biometric data or otherwise use an electronic device or identifier to make a purchase. Alternatively or additionally, the customer may access a loyalty program without needing to provide a physical card or data associated with a card.

28 Claims, 22 Drawing Sheets

U.S. PATENT DOCUMENTS

| | | | |
|---|---|---|---|
| 2006/0224454 A1* | 10/2006 | Kantor et al. | 705/14 |
| 2006/0249575 A1* | 11/2006 | Turner et al. | 235/380 |
| 2007/0022046 A1 | 1/2007 | Kingsborough et al. | |
| 2007/0022047 A1 | 1/2007 | Kingsborough et al. | |
| 2007/0022048 A1* | 1/2007 | Kingsborough et al. | 705/39 |
| 2007/0118470 A1* | 5/2007 | Warren et al. | 705/38 |
| 2007/0271114 A1* | 11/2007 | Walker et al. | 705/1 |
| 2008/0077499 A1* | 3/2008 | Ariff et al. | 705/14 |

OTHER PUBLICATIONS

Office Action dated Nov. 13, 2008 (19 pages), U.S. Appl. No. 11/459,736, filed Jul. 25, 2006.

Office Action (Final) dated May 12, 2009 (19 pages), U.S. Appl. No. 11/459,736, filed Jul. 25, 2006.

Advisory Action dated Sep. 23, 2009, (3 pages), U.S. Appl. No. 11/459,736, filed Jul. 25, 2006.

Office Action dated Oct. 28, 2009 (14 pages), U.S. Appl. No. 11/459,736, filed Jul. 25, 2006.

Office Action dated Dec. 24, 2009 (15 pages), U.S. Appl. No. 11/459,732, filed Jul. 25, 2006.

Office Action dated Dec. 28, 2009 (23 pages), U.S. Appl. No. 11/459,733, filed Jul. 25, 2006.

Office Action (Supplemental) dated Jan. 4, 2010 (3 pages), U.S. Appl. No. 11/459,732, filed Jul. 25, 2006.

* cited by examiner

PAYMENT PROGRAM FOR USE IN POINT-OF-SALE TRANSACTIONS

CROSS-REFERENCE TO RELATED APPLICATIONS

The present application claims priority to U.S. Provisional Application No. 60/702,193, filed Jul. 25, 2005, and entitled "Payment Program For Use in Point-Of-Sale Transactions," which is hereby incorporated by reference herein for all purposes.

BACKGROUND OF THE INVENTION

1. Field of the Invention

This invention relates generally to methods and apparatus for conducting retail sales and, more particularly, to methods and apparatus for payment for retail purchases by consumers enrolled in payment and/or loyalty programs offered by a retailer.

2. Background of the Invention

The retail industry has shown increasing interest in improving the convenience of the shopping experience. For example, the use of loyalty cards have enabled merchants to reward customers based upon their patronage of the merchant. Loyalty cards have also enabled merchants to provide customers with a variety of other incentives and/or conveniences such as check cashing privileges. Furthermore, the use of loyalty cards have become quite popular with cost conscious shoppers since merchants typically provide discounts on the goods being purchased whenever the shopper presents a loyalty card issued by that merchant. Merchants have attempted to minimize the inconvenience to shoppers which results from requiring the shopper to present a loyalty card in order to receive discounts on goods and/or other benefits. For example, some merchants have issued small tokens that attach to a customer's key ring and, have imprinted thereon, a scannable code for identifying the shopper as a participant in the retailer's loyalty program.

Efforts to improve customer convenience have also focused on speeding transactions at the point-of-sale (POS) to minimize the amount of time that a customer waits in line. The widespread adoption of bar code scanners is one result of such efforts. More recently, merchants have begun exploring the use of radio frequency identification (RFID) tags in order to quickly inventory the goods in a customer's shopping cart prior to arrival of the customer at the POS. By doing so, the purchase price of the goods is transferred to the POS, thereby eliminating the need for the cashier to scan the goods themselves. Likewise, merchants have explored other methods of employing RFID tags to speed payments. For example, key fobs have been employed to complete purchases of gasoline. Similarly, mountable tags have been employed to both complete purchases of gasoline and pay for a variety of charges associated with usages of toll roads, parking facilities and the like. Other methods for speeding payments have also been explored. For example, personal electronics-based systems such as mobile telephones and biometric based-systems that rely on a unique body feature such as a thumb or retina have been employed in a variety of payment scenarios.

Drawbacks of such loyalty and payment systems include the requirement that a consumer must carry a physical device such as a card, RFID tag or mobile telephone or consent to a biometric scan, a process disliked by many. Thus, ongoing needs exist for the development for methods for improving the convenience of a customer's shopping experience, especially in the areas of improved transaction speed, enhanced loyalty programs, and combinations thereof. The present application addresses such ongoing needs, particularly a need for payment and/or loyalty programs that do not require presentation of a physical device or consent to a biometric scan in order to process a payment and/or issue cash rewards or other benefits based upon usage of the loyalty program.

SUMMARY OF THE INVENTION

A variety of methods and apparatus have been developed to address these and other needs in the art. Each of these is suitable for use alone or in combination with one or more of the other methods and apparatus disclosed herein. The disclosed methods and apparatus, each of which has been developed to enhance POS transactions in a respective manner, are as follows:

A. A Method For Instantly Enrolling Customers In A Card-Free Program Offered By A Merchant. This process enables a customer to enroll in a card-free program offered by a merchant. The card-free program may be, for example, a payment processing program, a loyalty program or a loyalty program linked to the payment processing program (linked loyalty program). The enrollment process is also applicable to other types of card-free programs not specifically recited herein. The process of enrolling in the card-free program may be carried out at any number of locations and/or using a variety of devices. For example, enrollment may be carried out at the merchant's premises through use of a pinpad or other data input/output (I/O) device located at a point-of-sale (POS) or store kiosk for enrollment. Enrollment may also be conducted over the public switched telephone network (PSTN) through use of a telephone, over the internet through use of a personal computer (PC) or other computer system or by various combinations of the foregoing. In order to enroll, the customer provides identification information that is both generated by, and unique to, the customer. The identification information may include, for example, (i) an identification code, typically comprised of a unique identification number such as the combination of a telephone number assigned to the customer and the month and day of birth for the customer, and (ii) an authorization or security code, commonly referred to as a personal identification number (PIN). The identification information provided by the customer may be associated by the merchant with one or more functions of this card-free program, another card-free program, or a card-based program. For example, the identification information may be associated with a new or preexisting loyalty program account of the customer. When the card-free identification information is associated with an existing card-based loyalty account, the customer may access their card-based loyalty program account and/or obtain benefits associated with the card-based loyalty program without the physical use of a card.

The identification information may be further associated with one or more payment options such as an automated clearing house (ACH) debit from a financial account such as a checking or savings account or a charge to a line of credit such as a bank or merchant sponsored credit card. To enable such actions, the customer provides, during the enrollment process, the appropriate financial account information (such as a routing number for a financial institution and an account number for the account to be debited) and authorization to debit funds from or charge purchase to the identified account. The card-free payment functionality may also be linked with the loyalty program functionality so that the customer receives benefits of the loyalty program for card-free purchases paid using funds from the identified account. During enrollment, the identification number may be optionally associated with additional functionality of the card-free program such as (i) the ability to purchase from affiliated merchants, including, if desired, participation in their loyalty programs, (ii) adding any number of additional users such as family members to a master account of a card-free program, (iii) designating multiple payment options such as ACH, credit or other payment options, (iv) other types of functionality not specifically recited herein, or (iv) combinations thereof During enrollment, the merchant may perform security and/or payment verification checks such as verifying the identity of the customer, validating of the financial account identified, by the customer, as the source of funds from which payments are to be drawn, cross-checking against prohibited customer lists or other types of security checks.

B. A One Step, Method For Instantly Enrolling Customers In A Card-Free Rr Card-Based Modified ACH Payment Processing Or Linked Loyalty Program. Where the customer is able to provide all of the information required, for example, identification information and financial account information, to enroll in a payment process, linked loyalty program or other program offered by a merchant, the enrollment process may be carried out in a relatively expeditious enrollment process hereinafter referred to as an "instant" enrollment process. Instant enrollment of a customer may be carried out at a POS such as a check-out lane or register, or at a store kiosk for enrollment. Instant enrollment of a customer may also be carried out from a web application on a computer. For example, the customer may input the required information, typically, identification information in the form of a unique identification number and financial account information required for enrollment in a payment process via a pinpad or other data I/O device located at the POS. Likewise, the financial information may be entered by the customer using the pinpad or keyboard, entered manually by a clerk or entered automatically, for example, by reading magnetic ink on a blank check presented by the customer. Preferably, instant enrollment is carried out in a minimal amount of time, for example, 30 seconds or less, such that the enrollment process does not adversely affect the quality of service for either the enrolling customer or other customers waiting in line behind the enrolling customer.

C. A Two Step Method For Enrolling Customers In A Modified ACH Payment Processing Or Linked Loyalty Program Suitable For Use With Both Card-Free And Card Based Programs. Where the customer is unable to provide all of the information required in order to complete enrollment in a payment process, a linked loyalty program or other program offered by a merchant, the enrollment may be carried out in two or more steps or separate sessions. In a first step, the customer provides initial information of sufficient detail to permit a later identification of the partially completed enrollment. Again, the initial information may be provided using a pinpad or other data I/O device located at a POS or store kiosk of the merchant. The amount of information initially provided by the customer may vary, but may include identification information, for example, an identification number, suitable for a later identification of the partially completed enrollment. Other available information, for example, identification information for one or more family members to be included on the account, may also be provided. Upon completion of the first step in the enrollment process, the customer may be provided with an enrollment number that the customer may use in addition to, or in lieu of, the identification information provided by the customer during the initial step in the enrollment process. At a subsequent point in time, the customer provides the remainder of the data required to complete enrollment in another enrollment session. For example, the customer may provide the financial account information necessary to link a pre-existing enrollment in the merchant's loyalty program to an ACH payment process, thereby enabling the customer to make card-free purchases of the merchant's goods or services. The customer may complete enrollment by returning to the merchant's premises with the required information, by calling a designated number and providing the required information over the telephone, for example, by interacting with an automated telephone system, or transmitting the required information over the internet after accessing a secured portion of the merchant's web site. To complete enrollment, the subsequently provided information is associated with the initially provided information, for example, using the enrollment number provided by the merchant during the first step of the enrollment process.

D. A Method For Presentation And Acceptance Of Terms And Conditions In An ACH Payment Or Linked Loyalty Program. During either the instant or two-step enrollment of a customer in a program offered by a merchant, for example, a card-free or card-based ACH payment process or linked loyalty program, various terms and conditions, the acceptance of which are required to complete enrollment of the customer in the program, may be electronically presented to the customer, for example, via a display portion of a pinpad or other data I/O device located at the POS. In turn, the customer may elect to accept or reject the electronically presented terms and conditions, again, for example, via the pinpad or other data I/O device located at the POS. Alternately, presentation and acceptance of the terms and conditions may be made, via a voice and/or keypad entry in a telephone system, or an internet-accessible user interface at the merchant's web page. The disclosed method for presentation and acceptance of terms and conditions is equally applicable to card-free programs and to those that require the use of a card.

E. A Card-Free Payment Process Suitable For Use In Financial Transactions. This process enables a customer to access selected services, for example, payment options and/or loyalty program benefits, offered by a merchant. Unlike existing services offered to customers, these and other services may be accessed through use of a unique identifying code which may be easily memorized by the customer. In accordance with this process, a customer may make a card-free purchase of goods or services from a merchant such that the customer is not required to present cash or other form of physical tender, for example, a debit card, credit card or loyalty card, provide biometric data using a uniquely identifiable body part such as a thumb or eye, or operate an electronic device configured to transmit or otherwise exchange encoded identifying information with the first merchant in order to complete the purchase. As a result, the disclosed process is directed to the first true process by which a customer may complete a transaction relying solely on mnemonic information.

To complete a transaction, for example, a purchase of selected goods and/or services for which payment is required, a customer provides certain identifying information to a merchant of the selected goods and/or services, for example, using a pinpad or other data I/O device provided, by the merchant, at the POS. The provided identifying information, which preferably had been previously committed to memory by the customer may include: (a) a unique identification number, for example, telephone number and/or month and day of birth for customer; and (b) an authorization or other type of security code, for example, a PIN. The merchant verifies the provided information, typically, by use of a computerized verification and approval process and, upon verification and approval, the customer may have access to various services associated with the card-free payment process, for example, payment options and/or loyalty program benefits associated with the customer. Use of the disclosed process is not limited to the specific applications recited hereinabove. Rather, the process may be extended to a wide variety of financial applications, for example, the deposit of funds in a bank account, as well as non-financial applications, for example, the admission of a person to secured facilities such as airports.

In accordance with the disclosed payment process, the provided identifying information may be used to initiate a transfer of funds equivalent to the price of the goods and/or services being purchased by the customer. While the funds would most commonly be transferred from a savings or checking account via an ACH debit, it is contemplated that the funds may originate from various sources of funds maintained by a third party on behalf of the customer, for example, a credit card or line of credit maintained by a third party on behalf of the customer. It is further contemplated that the source of the funds may either be pre-selected or selected, at the pinpad or other data I/O device provided at the POS, from any number of choices associated with the provided identifying information.

Should the customer desire to link the card-free payment process to other offered services, for example, the aforementioned loyalty program, the customer may be able to access or otherwise utilize the linked services using the card-free access process hereinabove described. For example, by linking a loyalty program to a card-free payment process, the customer could receive benefits associated with the loyalty program, for example, discounts on the purchase of selected goods and subsequently pay the merchant the discounted amount for the selected goods using the ACH debit or other form of payment previously associated with the card-free payment process. Whether linked or unlinked, the card-free payment process provided by the merchant may be coupled to services offered by any number of other merchants. The other merchants may opt to couple their card-free payment process, card-free loyalty program and/or card-free linked loyalty program to the card-free payment process or card-free linked loyalty program offered by the first merchant.

F. Method For Distribution Of Tender-based Rewards In A Loyalty Program. This process associates the rewards distributed by participation in a program offered by a merchant, for example, a card-based or card-free linked loyalty program, to the type of tender used by the customer to purchase goods from the merchant. The rewards, if any, issued by the merchant, for example, rebates, discounts and coupons, are distributed based upon the specific type of tender, for example, ACH debits, bank credit cards, store credit cards, cash, check, debit card, gift card or electronic funds transfer offered by the customer. The customer may offer the tender in a traditional manner or using a card-based or card-free linked loyalty program. In turn, the customer may receive incentives if they choose a preferred form of tender, for example, an ACH debit may receive reduced or no incentives if they choose a non-preferred form of tender, for example, a bank credit card that involves transaction fees for the merchant.

The tender-based rewards may be linked to a card-free program such that a customer is rewarded when using functions of the card-free program, for example, access to loyalty program benefits, payment options or combinations thereof. For example, a customer may be rewarded under a linked loyalty program for using a specific card-free payment type such as an ACH debit. In addition to, or in lieu of, linking a tender-based reward to a card-free program, the tender-based reward may be linked to a product-based reward such that a customer is rewarded for purchasing a specific number, type or combination of products via a specific payment type, either traditional or card-free. For, example, a customer may be rewarded under a loyalty program for a cumulative purchase of a given number of a specific product using a specific card-free payment type such as an ACH debit. Such rewards may be cumulative, for example, a first level of reward for purchasing via an ACH debit and a second level of reward for card-free access of the ACH debit.

G. A Computer System Suitable For Use In Conjunction With Either An ACH Modified Payment Processing Or Linked Loyalty Program. The foregoing processes are enabled through use of a computer system configured to (i) authenticate those customers identifying themselves as participants in a program, for example, payment processing or linked loyalty programs offered by a merchant, (ii) authorize the merchant to have access to the information required to complete a transaction associated with the program and (iii) initiate the transaction itself. Most, but not all, such transactions would be initiated at a POS located on the premises of the merchant. The location of the computer system relative to the POS may vary. For example, the computer system may form part of a remotely located control center coupled by a wide area network (WAN) to any number of retail stores at which the merchant intends to offer the program to customers; a file server, located on the premises for which the merchant intends to offer the program, coupled to each POS by a local area network (LAN), or at each POS itself.

The computer system is comprised of a processor subsystem and a memory subsystem, coupled to the processor subsystem, for the bi-directional exchange of address, data and control signals therebetween. The computer system further includes at least one application which resides in the memory subsystem and is executable by the processor subsystem. The applications may include a transaction identification application, an ACH transaction application, a loyalty program application or other type of merchant program transaction application. The transaction application determines, from data received from the POS, the type of transaction to be executed by the processor subsystem. Upon identification of the type of transaction, the transaction identification application transmits the received data to the transaction application, for example, the ACH payment program transaction application or the loyalty program transaction application, which performs all transactions of the identified type. The transaction application receiving the data from the transaction identification application may then execute the transaction and return the results of the transaction to the POS.

To execute, each application is associated with one or more areas of the memory subsystem coupled to the processor subsystem. For example, the transaction identification application may be coupled to a list of transaction types; the ACH transaction application may be coupled to a list of authentication codes required to authorize customers attempting to use the ACH payment processing program and a list of customers enrolled in the ACH payment processing program and the information required by the merchant to execute an ACH transaction for the listed customers; and the loyalty program application may be coupled to a list of loyalty program benefits and a list of loyalty program enrollees. In the event that the loyalty programs include cumulative benefits, for example, the issuance of certain rebates upon reaching a pre-selected level of total purchase, the area of memory which maintains the loyalty program enrollees may also maintain cumulative information for all such enrollees. The applications which execute transactions, for example, the ACH transaction application or the loyalty program transaction application, execute transactions using the information received from the transaction identification application and information read from the memory area associated therewith. As needed in order to complete the transactions, the transaction applications may transmit information to and receive information from outside computer systems. Where transaction applications have been linked together, for example, a linked loyalty program incorporating a tender-based rewards program, the ACH transaction application may be further coupled to the loyalty program application so that the ACH transaction application may transmit, to the loyalty program application, the data necessary for the loyalty program application to execute the tender-based rewards program.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the specific embodiments disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 2E is an illustrative screen shot of a web enrollment interface for soliciting customer information for enrollment in either the modified ACH payment processing or linked loyalty program;

FIG. 2F is an illustrative screen shot of a web enrollment interface for soliciting customer financial information for enrollment in either the modified ACH payment processing or linked loyalty program and for soliciting payment authorization from the customer;

FIG. 2I is an illustrative screen shot of a web enrollment interface for soliciting customer entry of a unique identification number and PIN for enrollment in either the modified ACH payment processing or linked loyalty program;

DETAILED DESCRIPTION OF THE PREFERRED EMBODIMENTS

Definitions

Figure 1:
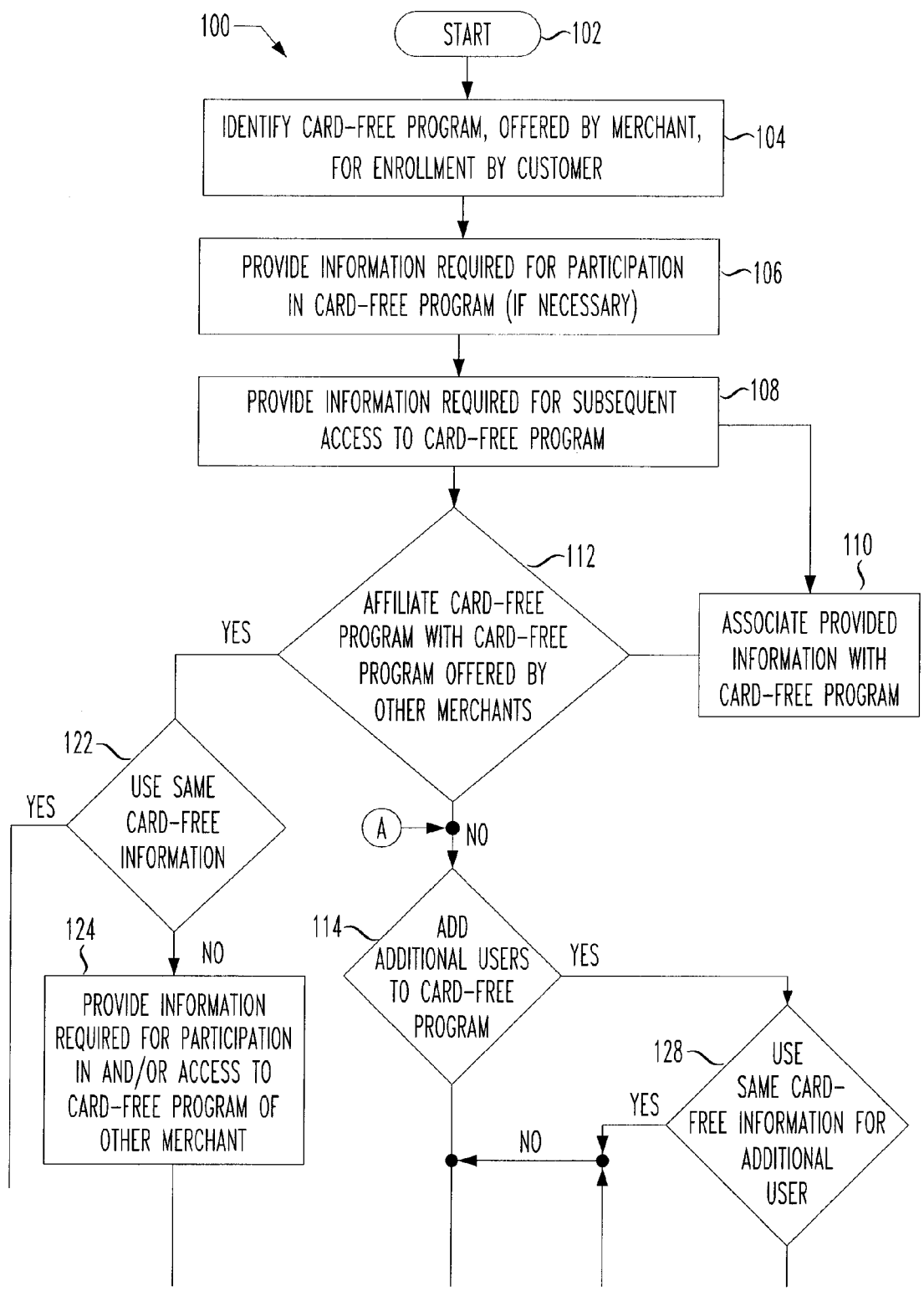
FIG. 1 is a flow chart of a method for enrolling in a card-free program offered by a merchant.
Figure 1:
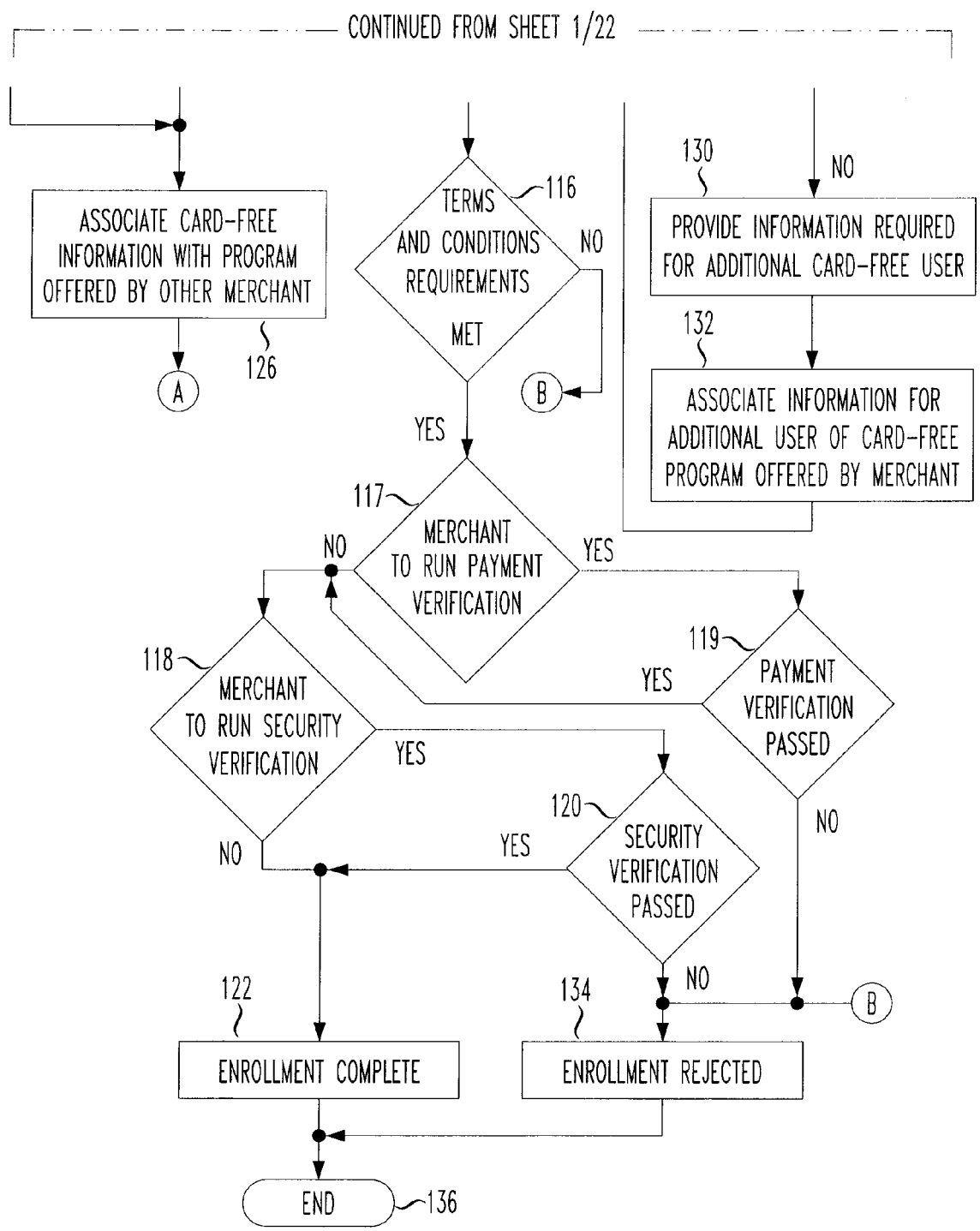

The term "One Step" enrollment refers to instances where the customer is able to provide all of the information required in order to complete enrollment in a single session. The "one step" enrollment may comprise a series of activities wherein the customer provides the required information and various verifications occur, all of which occur during a single session. The single "one step" session may be carried out either in a store, such as at a POS or kiosk, or remotely, such as from the customer's home computer.

The term "Two Step" enrollment refers to instances where the customer is unable to provide all of the information required in order to complete enrollment in a single session, and the customer is enabled to return to the enrollment process in a separate session once the information required to complete enrollment is available. The "two step" enrollment may comprise a series of activities wherein the customer provides the required information and various verifications occur, all of which occur during more than a single session. Specifically, the customer may provide some information in a first session, and later return to resume the enrollment process. The "two step" sessions may be carried out either in a store, such as at a POS or kiosk, or remotely, such as from the customer's home computer, and any combination of in the store or remotely.

The term "in-store," as used herein, refers to actions which take place at the premises of the merchant.

The term "out-of-store," as used herein, refers to actions which take place at a remote location, such as at a networked computer in a customer's home.

The term "instant" enrollment, as used herein, is intended to refer to a relatively expeditious enrollment process. "Instant" enrollment may also refer to enrollment that is completed in a single session, without the customer returning to resume a previously initiated enrollment. With instant enrollment, the customer may immediately begin use of the card-free payment program and other programs in which he or she has enrolled instantaneously.

The term "Merchant," as used herein, refers to a seller of goods or services. A merchant may maintain its own card-free payment network, or may contract with a payment program third party to take responsibility for card-free payment transactions. Some merchants maintain loyalty programs, which may or may not be additionally contracted out to third parties.

The term "Payment Program Third Party," as used herein, refers to a third party that contracts with the Merchant to offer the card-free payment processes disclosed herein. In various embodiments, merchants may be unwilling or unable to support a card-free payment program such as disclosed herein, and therefore a payment program third party may maintain and support the processes for enrollment and maintenance of various card-free payment programs for various merchants. In so doing, the payment program third party may necessarily interact with various systems controlled by the merchants with whom it contracts, including, for example, loyalty programs. The payment program third party may maintain a web site for purposes of enrolling customers. The payment program third party may establish its own payment network and loyalty program, such that any time a customer uses the payment program third party's card-free transaction program, the customer receives network benefits in addition to, where applicable, any loyalty rewards earned through the merchant's loyalty program.

The term "modified ACH payment" is intended to refer to otherwise conventional ACH transactions that have been modified on the "front end" but are conventionally configured on the "back end." In turn, the term "front end" is intended to refer to the process by which a merchant initiates an ACH transaction requesting the transmission, to the merchant, of funds, in an amount specified by a customer of the merchant, from an account maintained by the customer at a financial institution. Conversely, the term "back end" is intended to refer to all other portions of a conventional ACH transaction which occur after the merchant has requested the transmission of funds, in the amount specified by the customer of the merchant, from the account maintained by the customer at the financial institution.

An "ACH transaction" refers to a financial transaction processed via the well-known batch processing, store-and-forward system commonly referred to as the ACH network, which is described in more detail herein.

A "point-of-sale" (POS) refers to a physical location at which a product and/or service may be purchased. Without limitation, examples of a POS include a check-out lane in a grocery store or other retail establishment, a gasoline pump, a kiosk and the like.

A loyalty card refers to a card issued by a merchant that, oftentimes, is associated with information related to the customer, (e.g., name, address, various preferences, and the like). The loyalty card may be associated with all aspects of a loyalty program offered by the merchant, may be associated with selected aspects of the merchant's loyalty program, may simply be used as an in-store identification card or used for other purposes not specifically recited herein.

A loyalty program of a merchant refers to any program in which customers enrolled in the program receive benefits from the merchant. Without limitation, such benefits may be provided in the form of discounts, cash rebates, frequent flyer miles, free products, cash discounts which may be applied towards future purchases of any items, coupons which may be applied towards a future purchase of a specified item (or items) and advertisements.

The term "status" refers to the stage, within the application process, that the customer has reached. The customer is either a new applicant that has not yet taken any action towards enrollment in either the modified ACH payment processing or linked loyalty program or a pending applicant that has taken some actions towards enrollment in the aforementioned programs but has not yet completed the enrollment process.

The term "list" refers to a series of entries, each written to a respective address within the corresponding memory area, comprised of a series of data bits which describes certain information contained in that entry. For example, a memory area may be used to describe a program which, for example, may be comprised of a description of the membership in and the benefits provided by the merchant program. In turn, the memory area would include one or more lists, each comprised of a series of entries.

I. Enrollment Processes, Generally

A. A Method for Instantly Enrolling Customers in a Card-Free Program Offered by a Merchant Disclosed herein is a method of enrolling a customer in a card-free program offered by a merchant, comprising the customer providing information, unique to the customer, for use, by the merchant, in connection with the card-free program offered by the merchant; and associating the unique information provided by the customer to at least one attribute of the card-free program offered by the merchant. A first one of the at least one attribute of the card-free program offered by the merchant may be an automated payment process enabling card-free payment for a purchase of goods or services at a point of sale (POS) using an automated clearing house (ACH) transaction. Alternatively, a first one of the at least one attribute of the card-free program offered by the merchant may be an automated loyalty program providing benefits to the customer in exchange for the customer's patronage of the merchant, and optionally a second one of the at least one attribute of the card-free program offered by the merchant may be an automated payment process enabling card-free payment for a purchase of goods or services at a point of sale (POS) using an automated clearing house (ACH) transaction.

The customer providing unique information for use by the merchant in connection with the card-free program offered by the merchant may further comprise the customer providing first and second subsets of unique information for use by the merchant in connection with the card-free program offered by the merchant. The first subset of unique information is required for the customer to participate in the card-free program and the second subset of unique information is required for the customer to access the card-free program. The first subset of information may be comprised of an identifier of a financial institution with which the ACH transaction is to be conducted and an identifier of an account, maintained by the financial institution from which funds necessary to complete the ACH transaction are to be withdrawn. The second subset of information may be comprised of first and second fields, the contents of the first field being pre-determined prior to the customer initiating enrollment in the card-free program offered by the merchant and the contents of the second field being selected, by the customer, during the enrollment process.

Referring to FIG. 1, a method 100 for instantly enrolling a customer in a card-free program offered by a first merchant will now be described in greater detail. As used herein, the term "instant" enrollment is intended to refer to a relatively expeditious enrollment process. For example, enrolling a customer in a program in 30 seconds or less is considered to be an instant enrollment. In alternatively embodiments, instant enrollment includes, in the alternatively, enrolling a customer in equal to or less than about 30, 25, 20, 15, or 10 seconds. However, it is specifically contemplated that, while less preferred, enrollments requiring slightly more time, for example, between 45 and 60 seconds, are also considered to be instant enrollments. In its broadest sense, an instant enrollment is considered to be any enrollment which consumes a sufficiently brief period of time such that the enrolling customer, or those customers waiting in line behind the enrolling customer, consider the time required to complete the enrollment as a reasonable period of delay to be periodically expected while a cashier checks out customers. For example, a brief delay which occurs while a cashier attends to a price check is a reasonable period of delay which is periodically expected by customers. Typically, instant enrollment of a customer in a card-free program is conducted at a POS, for example, a cash register or check-out stand of a store. However, as will be more fully described below, the customer may be enrolled in a card-free program at a wide variety of other locations including a store kiosk or a web application accessed at a network computer. Furthermore, while many enrollments require only a single session, it is also contemplated that the customer may initiate enrollment in a first enrollment session conducted at a first location and complete enrollment in a second enrollment session conducted at either the first location or a second location different from the first location.

The method 100 of enrolling the customer in a card-free program offered by a first merchant commences at 102. As disclosed herein, enrollment is completed in a single session conducted at the premises of the first merchant, for example, at a pinpad or other data input/output (I/O) device located at a POS. It is fully contemplated, however, that various other locations may be used to initiate enrollment of the customer in a card-free program including remote locations, for example, the home of the customer by way of a web application accessed at a networked computer. Similarly, it is also contemplated that other types of data I/O devices, for example, the telephone or the internet may be used to enroll the customer in the card-free program. At 104, a card-free program, offered by the first merchant, in which the customer wishes to enroll, is identified. For example, the card-free program may be: (a) a loyalty program which provides the customer with rewards, for example, cash discounts, for purchasing goods from the first merchant; (b) a charitable-giving program which transfers a portion of the first merchant's profit on the sale of goods to the customer to a designated charity; (c) a payment processing program, for example, an automated clearing house (ACH) payment processing program which automatically pays for goods or services purchased by the customer; (d) a loyalty program linked to an ACH or other payment process (linked loyalty program); or (e) a tender-based reward distribution program which provides customers with rewards, again, for example, cash discounts, based upon the tender offered by customers to pay for goods or services being purchased thereby. The foregoing list is provided by way of example and is not intended to be exhaustive. Accordingly, it is fully contemplated that the first merchant may offer a wide variety of card-free programs other than those specifically recited herein. If the first merchant offers multiple card-free programs, a customer may enroll in any number of the card-free programs offered thereby.

At 106, the customer provides any necessary information required for participation in the card-free program. Such information may include, name, address, telephone number, driver's license number and issuing state, date of birth, social security number, or like identifying information in addition to financial information. This list of types of information is not intended to be exclusive. Certain of the programs offered by the first merchant may require the customer to provide detailed financial information which should remain confidential while other programs offered by the first merchant may require the customer to provide little, if any, confidential information. For example, for participation in either ACH payment program or linked loyalty programs, the customer may identify a financial institution and an account through which payment is to be processed. Furthermore, because both ACH payment and linked loyalty programs involve the transfer of money from a checking or other type of account, some customers may prefer that use of the ACH payment or linked loyalty program require the use of a card. Accordingly, although many of the embodiments disclosed herein are directed to programs configured to function as card-free programs, it is fully contemplated that the configuration of the disclosed programs may be readily modified so that they function as a card-based program. The disclosed programs may be configured to include the distribution of cards, for example, loyalty cards, and to complete transactions whether or not the customer presents a card, thereby allow the customer to have the option of choosing whether to use the card when initiating a transaction. In the foregoing configuration, cards may be distributed to all customers or, in the alternative, only to those customers who express a desire to receive a card.

Having provided the information required to participate in the card-free program offered by the first merchant, the method 100 proceeds to 108 where the customer provides identifying information required for subsequent access to the card-free program for which the customer wishes to participate. Preferably, the identifying information, which is referred to herein as either an access code or a unique identification code, is a number comprised of a series of digits, provided by the customer, that is unique to that customer. For ease of use, it is also preferred that the access code may either be comprised of, or include as a portion thereof, one or more combinations of digits that the customer has already committed to memory. For example, home, work and mobile telephone numbers are all combinations of digits that most customers have already committed to memory. In programs requiring minimal security, the access code required for the customer to subsequently access the program may be relatively short, for example, a four digit code. In programs requiring more security, for example, ACH payment and linked loyalty programs, it is preferred that the access code which is entered for the customer to subsequently access the card-free program be comprised of additional number of digits, including digits which are unique to the customer and digits that are not publicly available. For example, it is contemplated that for ACH and linked loyalty programs, the identifying information required to gain subsequent access to the program comprises an eighteen digit code, the first ten digits of which may be a telephone number of the customer, the next four digits of which may be the month and day of birth for the customer and the last four digits may be a security code, commonly know as a personal identification number (PIN), selected by the customer before completing enrollment in the program, for example, by entering the PIN at the pinpad located at the POS during the enrollment process.

Alternatively, it is contemplated that for ACH and linked loyalty programs, the identifying information required to gain subsequent access to the program comprises a nineteen digit code: a five digit bank identification number (which is appended on to digits provided by the customer), ten digits provided by the customer which may be, for example, the customer's telephone number, a check digit, and a three digit program code, which may differentiate the type of program in which the customer is enrolled. For example, a payment processing program, a loyalty program, and a linked loyalty program may all be offered by the merchant, and the program code indicates to which, of the offered programs, the code provides access.

It is fully contemplated that the identifying information required to access the card-free program may be any number of digits. Furthermore, the term "digits" is not intended to be limited to the numbers 0-9. Rather, the term encompasses all alphanumeric and/or other characters and/or symbols, for example, the "#" and "*" keys, that the customer may enter using the data I/O device provided by the customer. Furthermore, while there is no requirement that the digits be related to personal information of the customer, it is believed that, by relating the digits to the customer in this manner, the customer may be able to commit the digits to memory with little effort and thereby become more comfortable with the concept of card-free transactions. Finally, it is fully contemplated that, when creating the access code, the combination of digits which enables subsequent accesses to the card-free program may be entered in any matter, for ease of use, it may be preferable that the customer provide the identifying information as a series of answers to questions appearing on a display portion of the pinpad or other data I/O device located at the POS, in a store kiosk or accessed at a networked computer. Conversely, when subsequently accessing the card-free program by entering the identifying information, it is contemplated that the program may be configured to accept the identifying information as a series of answers to questions appearing on the display portion of the pinpad or other data I/O device located at the POS or, in the alternative, as an eighteen or nineteen digit code entered by the customer in a sequential manner.

Steps 106 and 108 may be exchanged in their order of execution. Upon providing the information required for participation in the card-free program of the first merchant at 106 and providing the information required to subsequently access the card-free program of the first merchant at 108, the method 100 proceeds to 110 for association of the information provided at 106 and 108 to the card-free program offered by the first merchant. The foregoing association process includes two associations—the association of the information required for the customer to participate in the program (i.e., customer-specific participation data) to the information required for the customer to subsequently access the program (i.e., customer-specific access data) and the association of the information required for the customer to participate in the program (i.e., customer-specific participation data) to the information required to provide the benefits offered as part of the program to the customer (i.e., program-specific data). More specifically, and as will be more fully described below with respect to FIGS. 5A-C, the first merchant maintains a software application which operates the card-free program offered thereby. Likewise, data is stored in a memory, associated with the software application, and maintained by the first merchant. The information required for participation in the card-free program is stored in a first area within the memory and the information required to subsequently access the card-free program is stored in a second area within the memory. For example, if the card-free program is a software application which attends to payment of a purchase using the ACH payment process, the name of the customer, the account number for the account from which the payment is to be drawn and the bank or other financial institution to which the request for funds is to be directed would be stored in the first area of the memory. Similarly, the information required for accessing the card-free program, for example, the eighteen digit access code unique to the customer, is stored in the second area of the memory and linked to the corresponding information in the first area of the memory containing the information required to perform the requested ACH payment. By associating the participation and subsequent access information in this manner, upon subsequent receipt of an access code and an associated request to access the ACH payment process, the ACH payment software application compares the received access code to a series of access codes stored in the second area of the memory and, if a match is identified, the ACH payment software application may use the identifying information linked to the matching access code to execute the requested ACH payment.

For card-free programs offered by the merchant which require additional information in order to complete a transaction by a customer, it is contemplated that the second association, e.g., the association of the information required for the customer to participate in the program to the information necessary for the benefits of the program to be provided to the customer, may also be necessary. For this association, the information necessary to provide the benefits of the program to the customer may be stored in a third area of the memory. For example, if a loyalty program requires a variable discount based upon the total amount of purchases made by the customer within a pre-selected time frame, the total amount of purchases made by the customer (i.e., the customer-specific participation data) may be stored in the first area of the memory and a list of the dollar value of purchases and associated discounts for the program (i.e., the program-specific data) may be stored in the third area of the memory. In this example, upon the loyalty program application confirming the identity of the customer by successfully matching the provided access code to an access code stored in the second area of the memory, the loyalty program application may determine the total amount of purchases made by the customer (which, in this example, would form a portion of the participation information for the customer) by accessing the information stored in the first area of the memory linked to the second area of memory. The loyalty program application may then determine the discount to which the customer is entitled by accessing the information stored in the third memory area. The foregoing example of a loyalty program differs slightly from the ACH payment hereinabove described in that the first area of the memory is periodically accessed by the loyalty program application to update the total amount of purchases made by the customer in the predetermined time period.

The method 100 then continues on to 112 for determination as to whether the customer wishes to enroll in additional programs. While, as illustrated herein, the additional programs offered at 112 relate to card-free programs offered by other merchants, it is fully contemplated that the additional programs may instead be additional programs offered by the first merchant. As disclosed herein, the method 100 issues an inquiry to the customer as to whether enrollment in additional programs is desired by generating a question for display on the pinpad or other data I/O device previously used by the customer to provide participation and subsequent access information at 106 and 108, respectively. However, the foregoing process by which inquiries are issued is purely exemplary and it is fully contemplated that other inquiry techniques may be used instead. If enrollment in additional programs is desired, the method 100 may then proceed to 122 for determination as to whether the same participation and subsequent access information, specifically the participation and subsequent access information provided by the customer at 106 and 108, respectively is to be used to obtain access to and participate in the additional program in which the customer wishes to enroll.

If different information is to be used to participate in and/or obtain subsequent access to the additional program, the method 100 proceeds to 124 where the customer provides the additional information required for participation in and/or obtain subsequent access to the second card-free program. For example, if the customer possesses a store credit card for the second merchant, the customer may desire that purchases at the store operated by the second merchant be paid by the store credit card. In this example, the customer would identify the store credit card as the method of payment and the account number of the store credit card as the information required for participation in the additional program. As the exemplary additional program in which the customer wishes to enroll involves a financial transaction, it is contemplated that the information provided to subsequently access the program may be another highly secure, unique number such as the aforementioned eighteen digit number.

Upon providing the information required for participation in and obtaining subsequent access to the card-free program of a second merchant at 124 or upon determining, at 122, that the same information shall be used when enrolling in the card-free program of the second merchant, the method 100 proceeds to 126 where plural information association processes are conducted. Similar to the first association process previously described with respect to the card-free program offered by the first merchant, the first association process occurring at 126 is the association of the information required for participation in the card-free program offered by the second merchant to the information required to subsequently access the card-free program provided by the second merchant. More specifically, in this, the first association process of 126, either (1) the information required for participation in the card-free program of the first merchant provided at 106 and the information required to subsequently access the card-free program of the first merchant provided at 108 or (2) the information required for participation in and obtain subsequent access to the card-free program of the second merchant provided at 124, is associated with the card-free program of the second merchant.

In a manner similar to that described with respect to the card-free program of the first merchant, the card-free program of the second merchant utilizes a software application and an associated memory for association of the information required to participate in the program offered by the merchant to the information necessary to subsequently access the program. Also as before, the information required for participation in the card-free program of the second merchant is stored in a first area within the memory and the information required to subsequently access the card-free program of the second merchant is stored in a second area within the memory. Again, the software application and associated memory will be more fully described with respect to FIGS. 5A-C. Here, however, the software application which, in conjunction with the associated memory, operates the card-free program may be maintained by the first merchant, the second merchant or collectively by the first and second merchants. Of the foregoing options, maintenance by the first merchant would be more appropriate when the card-free programs of both the first merchant and the second merchant utilize the information provided at 106 and 108, maintenance by the second merchant would be more appropriate when the card-free program of the first merchant utilizes the information provided at 106 and 108 and the card-free program of the second merchant utilizes the information provided at 124 and maintenance by the first and second merchant collectively would be more appropriate when the card-free program of the first merchant utilizes the information provided at 106 and 108 while the card-free program of the second merchant uses a combination of all or part of the information provided at 106 and 108 and all or part of the information provided at 124.

Alternatively, the software application which operates the card-free payment program may be maintained by a payment program third party that contracts with one or more merchants to provide card-free payment processing. In such embodiments, the payment program third party would periodically synchronize with merchant data, such as loyalty program data, maintained by the merchant.

Similar to the second association conducted at 110 in connection with the card-free program offered by the first merchant, for card-free programs offered by the second merchant which require additional information in order to complete a transaction by a customer, it is contemplated that a second association, e.g., the association of the information required for the customer to participate in the program to the information necessary for the benefits of the program to be provided to the customer, may also be necessary. For this association, the information necessary to provide the benefits of the program to the customer may be stored in a third area of the memory maintained in connection with the second card-free program.

Finally, the third association to be conducted at 126 is the association of information related to the card-free program offered by the second merchant to information related to the card-free program offered by the first merchant. Such an association is necessary whenever plural software applications are employed, for example, when a first software application, typically, a software application maintained by the first merchant, operates the card-free program offered by the first merchant while a second software application, typically, a software application maintained by the second merchant, operates the card-free program of the second merchant. In such situations, the respective software applications may be able to exchange information therebetween. For example, if a purchase at the POS of the second merchant is to be applied to the rewards offered by a loyalty program offered by the first merchant, the second software application advises the first software application of the purchase at the POS of the second merchant. While it is contemplated that a wide variety of techniques may be used to conduct the information exchanges between the first and second software applications, one such technique would be for the second software application write the information needed by the first software application to a fourth area of the memory associated with the first software application. The first software application may later use the information written to the selected area of memory to update information maintained in one of the areas of the memory associated therewith.

Upon determining at 112 that the card-free program offered by the first merchant in which the customer has enrolled is not to be affiliated with any card-free programs offered by other merchants or upon completion of the association of card-free information used in conjunction with association of a card-free program of the second merchant with the card-free program of the first merchant at 126, the method 100 proceeds to 114 for determination as to whether additional users are to be added to the card-free program in which the customer is enrolling. If it is determined that additional users are to be added, for example, if the display portion of the pinpad or other I/O device generates a query as to whether additional users are to be enrolled in the same account being created for the customer and the customer affirms that additional users are to be added, for example, by depressing a "yes" button on the pinpad, the method 100 proceeds to step 128 where additional users are added to the account being created for the customer in the process of enrolling in the card-free program.

At 128, the customer determines whether the additional users to be added to his or her account in the card-free program offered by the merchant may use the same information provided by the customer in connection with their participation and/or subsequent access to the card-free program offered by the merchant. It is contemplated that various benefits may result from the use of different information for each user included in a single account. For example, if different participation information is used for each member of a group to be collectively enrolled, under a single account, in a card-free linked loyalty program, each user may pay for their goods using their personal checking account while collectively accumulating rewards under the loyalty program. Conversely, if different access information is used for each member of the group being enrolled, the customer may more readily track the usage of the card-free program by each member of the family, business organization or other group to be given individual access to the account. Furthermore, different participation information for each user allows for disparate functionality among users, for example providing access to varying lines of credit or accounts for various users. Also, by using different access numbers, each member of the group may be more likely to remember the eighteen digit code with which they are to access the account. For example, it is highly likely that the additional users to have access to the account established by the customer would be able to remember their access code if the code required for them to access the account consisted of their own telephone number, month and day of birth and personally selected PIN rather than those originally provided by the customer at 108.

If it is determined at 128 that personalized information is to be provided for each additional user of the account in the card-free program being established by the customer, the method 100 proceeds to 130 where the participation information and/or subsequent access codes for the additional users is provided. While it is contemplated that the additional participation information and/or access codes to be provided for the additional users may be provided by the customer at the pinpad, it is relatively unlikely that the customer may have the appropriate information for each additional user to be added to the account. Thus, provision may be made for adding information for each additional user at a later point in time. For example, the customer may be advised at the POS or web application for enrollment, again, for example, by a message generated on the display portion of the pinpad that account information for the additional users may be provided by accessing or returning to a web site which permits modification of user information upon entry of the previously selected access code. Alternatively, the card-free program may be configured such that, upon a subsequent access of the card-free program, a reminder that identification information for the additional users has not yet been provided.

Regardless, after the participation information, access information or both for each additional user identified during the enrollment of the customer in the card-free program offered by the first merchant is provided at 130 (or, in the alternative, information which enables the customer or additional user to provide the participation and/or user information at a later date), the method 100 proceeds to 132 where the provided information for each additional user is associated with the customer's account for the card-free program. Apart from the use of separate participation and/or access information for each additional user, the association between the provided information and the card-free program is similar to that previously described with respect to 110 or 126 and need not be described in greater detail herein.

After (1) the customer declines to add additional users to their account at 114, (2) the customer indicates at 128 that one or more additional users for the card-free account are desired and provides information at 130 which enables the additional users to participate in the card-free program and access the account established by the customer or (3) the customer indicates at 128 that one or more additional users for the card-free account are desired and that the additional users are to use the same information as that used by the customer to participate in the card-free program and access the account established by the customer, the method 100 proceeds to 116 for determination as to whether the customer has satisfied the terms and conditions requirement necessary to complete enrollment of the customer in the program offered by the first merchant. Further details as to the terms and conditions requirement will be set forth below with respect to FIG. 3 and need not be described in greater detail herein. At this point, it need only be noted that, if it is determined at 116 that the customer has failed to meet the terms and conditions requirement, the method 100 proceeds to 134 where the customer is informed that enrollment in the program offered by the first merchant is rejected. The method 100 would then end at 136.

Returning momentarily to 134, it is contemplated that the first merchant may employ a variety of avenues to notify the customer that their application for membership in the program offered by the first merchant has been rejected. For example, when the pinpad located at the POS is used as a data I/O device for the customer to provide information in response to queries displayed thereby, the display portion may be used to generate a variety of rejection messages, for example, "We are unable to process your application at this time." In the alternative, the display portion may generate an explicit rejection message. Likewise, a rejection message or message indicating inability to complete enrollment may be displayed in a web application interface. For example, in the foregoing passage in which the customer's application was rejected for failing to meet the terms and conditions requirement of the customer, a rejection message advising that the customer that "Your application cannot be accepted until the terms and conditions governing membership in this program have been accepted." The display may also display a telephone number to call which the customer may call or an internet address which the customer may access to obtain additional information concerning the rejection, and such contact information may alternatively or additionally be provided in hard copy to the customer, for example via printout on a POS printer such as a receipt printer. The display should also display a rejection code for use by the customer should they attempt to obtain additional information concerning the rejection. For example, when calling to obtain additional information concerning their rejection, the customer may provide the rejection code to the call center attendant handling the call. The attendant may then use the rejection code to access the application of the customer and provide the customer with the desired information. Alternately, the display may simply display a reminder that, to obtain additional information concerning the rejection of their application, the customer may use their access code in the same manner hereinabove described with respect to rejection codes. Finally, the merchant may choose to follow up the instant rejection provided at the POS with a letter detailing the reasons for the rejection. Whether or not the first merchant generates such a letter depends on a variety of factors, for example, whether or not the first merchant has obtained sufficient information, e.g., a mailing address for the customer, to generate a rejection letter and/or whether the first merchant is legally obligated to send a written letter explaining the reasons for denying the customer's application for enrollment in the card-free program offered by the first merchant.

Returning to 116, if the customer meets the terms and conditions requirement defined by the first merchant for enrolling in the card-free program offered thereby, the method proceeds to 117 for further processing in the manner set forth below. As to the terms and conditions requirement that the customer must meet, depending on the type of program that the customer is seeking to enroll in, the first merchant may vary the terms and conditions requirement to be satisfied by the customer. For example, enrollment in a loyalty program may involve a relatively less restrictive terms and conditions requirement while enrollment in an ACH payment program may involve a relatively more restrictive terms and conditions requirement.

At 117, it is determined whether payment verification may be run on the customer. The first merchant may configure the method 100 such that payment verifications are not run on any customers, payment verifications are only run on selected customers or payment verifications are run on all of the customers. If it is decided at 117 that the first merchant (a) will not run payment verifications on any customers, (b) will only run payment verifications on selected customers and (i) the customer seeking to enroll in the card-free program is not one of the customers selected for payment verification, or (ii) the customer seeking to enroll in the card-free program is selected for payment verification at 117 and passes payment verification at 119, or (c) will run payment verifications on all customers and the customer seeking to enroll in the card-free program passes payment verification at 119, the method 100 will proceed to 118 for determination as to whether security verification is to be run on the customer. Again, the first merchant may variously configure the method 100 such that security verifications are not run on any customers, security verification are only run on selected customers or security verifications are run on all customers. Here, if it is decided at 118 that the first merchant (a) will not run security verifications on any customers, (b) will only run security verifications on selected customers and (i) the customer seeking to enroll in the card-free program is not one of the customers selected for security verification, or (ii) the customer seeking to enroll in the card-free program is selected for security verification at 118 and passes security verification at 120, or (c) will run security verifications on all customers and the customer seeking to enroll in the card-free program passes security verification, the customer will be accepted into the card-free program and the method 100 will proceed to 122 for enrollment of the customer in the card-free program.

At 122, the customer is advised of the successful completion of enrollment in the card-free program offered by the first merchant. For example, a first message which welcomes the customer to the program, either alone or in combination with a second message which reminds the customer how to subsequently access functions of the card-free program. These messages may appear on the display portion of the pinpad or in the web application interface. If desired, notification of successful enrollment in the program may also include written notification of the successful enrollment, together with a reminder how to subsequently access the card-free program and/or a summary of the benefits of participating in the program. Written notification of successful enrollment requires that the information required for participation in the card-free program that was provided by the customer at 106 include a mailing address for the customer. Alternatively or additionally, such written notification of successful enrollment may be provided to the customer via printout on a POS printer such as a receipt printer.

Generally simultaneously with the notification to the customer of their successful enrollment in the card-free program offered by the first merchant, the account established for the customer may be activated, thereby enabling the customer to participate in the card-free program in which they have been successfully enrolled. Preferably, activation may be immediate, thereby enabling the customer to conduct a transaction during the same visit. For example, the customer may be able to enroll in the modified ACH payment processing program during a purchase at the POS and then use the modified ACH payment processing program to pay for that purchase. In another example, the customer may enroll in the modified ACH payment processing program at a store kiosk upon entering the store, and may then use the program to make a purchase during the same visit to the store. It is contemplated that enrollment of the customer in the selected program may be accomplished using a wide variety of techniques. One such technique would be to establish the aforementioned link between the participation information and the access information provided by the customer since, without such a link, the customer, even when providing their eighteen digit code, would be unable to initiate an ACH payment or other transaction using the card-free program offered by the first merchant. Alternatively, the entry of the information required for participation in the card-free program offered by the first merchant and provided, by the customer, at 106, may be marked to indicate that the provided information relates to an active participant in the program. In this case, the card-free program application would not utilize the link from the information required to subsequently access the card-free program to the information required for participation in the card-free program unless the information required for participation in the card-free program had been marked. Finally, after completing enrollment at 122, the method 100 ends at 136.

Returning to 117, if it is determined that the first merchant is to run payment verification on the customer requesting enrollment in the card-free program, the method 100 proceeds to 119 for performance of the payment verification. As previously set forth, the first merchant may require that payment verifications are performed on all customers seeking to enroll in the card-free program offered by the first merchant or on selected ones of the customers seeking to enroll in the card-free program. To ensure that the use of selective payment verification is not applied improperly, considerable care may be used to determine the criteria used for identifying which of the customers are to undergo payment verification. For example, the first merchant may determine that payment verification may be performed randomly such as on one out of every ten customers seeking to enroll in the program offered by the first merchant. Another option would be for the merchant to establish a set of criteria for waiving payment verification, for example, the customer having been enrolled previously in at least one other program offered by the first merchant for a pre-determined period of time, the customer providing a cash deposit or the customer presenting both a driver's license and a major credit card for inspection by the first merchant. The foregoing are provided purely by way of example and it is fully contemplated that a wide variety of other criteria may be used to determine at 117 whether or not a customer is selected for payment verification.

Payment verification on either all customers seeking to enroll in the card-free program or on selected customers seeking to enroll in the card-free program is conducted at 119. It is contemplated that payment verification may encompass any number of checks. For example, the payment verification may encompass a check to determine if the customer has a record of presenting checks, either to the first merchant or to any merchant, for which payment was refused. Further by way of example, payment verification may include a credit check and a rejection if the customer has a Fair Isaac & Co. (FICO) score below a pre-selected threshold value. If the customer passes payment verification at 119, the method 100 may continue on to 118 where, if the first merchant has previously determined that all enrolling customers are to undergo security verification or, in the alternative, if the enrolling customer satisfies a pre-determined set of criteria for which security verification is required, the method 100 may then proceed to 120 for security verification. To ensure that the use of selective security verifications is not applied improperly, considerable care may be used to determine the criteria used for identifying which of the customers are to undergo security verification. For example, the first merchant may determine that security verification may be performed randomly such as one out of every ten customers seeking to enroll in the program offered by the first merchant. Another option would be for the merchant to establish a set of criteria for waiving security verification, for example, the customer having been enrolled previously in at least one other program offered by the first merchant for a pre-determined period of time or the customer having previously presented a satisfactory form of identification.

If the first merchant determines at 118 that a security verification is to be run on the customer seeking to enroll in a program offered by the merchant because the customer has failed to meet the requirements set by the first merchant for being exempt from the security verification or if the first merchant has previously determined that security checks are to be performed on all customers seeking to enroll in a program offered by the merchant, the method 100 proceeds to 120 where the security verification is performed. Similar to the payment verification of 118, it is again contemplated that the first merchant may pre-select the desired thoroughness of the security verification. For example, the security verification may encompass a search for outstanding warrants for the customer, verification of the identification previously presented by the customer during the enrollment process (if applicable), or the initiation of an Office of Foreign Assets Control (OFAC) review of the customer. Typically, an OFAC review encompasses checks of terrorist watch lists, lists of known security risks, lists of known criminals and the like. Similarly, a decision as to whether or not the customer passes the security verification at 120 may be based upon the detection of any outstanding warrants, confirmation of the accuracy of the identification presented by the customer and/or the receipt of favorable or unfavorable results of the OFAC review of the customer. The use of the foregoing factors in reaching a determination as to whether a customer passes security verification at 120 is purely exemplary and it is fully contemplated that one or more foregoing factors may be omitted when deciding whether or not the customer passes security verification at 120. Conversely, it is fully contemplated that one or more factors other than those specifically recited herein may be utilized in determining whether or not the customer passes security verification at 120.

Should the customer fail to pass either payment verification at 119 or security verification at 120, the method may again proceed to 134 where the customer application for enrollment in the card-free program is rejected. As previously set forth, rejection includes issuance of an in-store rejection and may further include issuance of an out-of-store rejection. Here, however, as a different basis may form the basis used to deny enrollment of the customer, it may be desired to vary the notification message delivered to the customer. Conversely, it may be desired that the notification message for all rejections be the same regardless of the basis for which enrollment was denied. Having both rejected the customer's application for enrollment in the card-free program and notified the customer of the rejection at 134, the method 100 ends at 136.

The two verifications may take place in any order. Thus, while FIG. 1 shows the security verification taking place subsequent to the payment verification such that only those applicants passing payment verification will undergo security verification, it is fully contemplated that, if desired, security verification may be performed first and payment verification be performed second such that only those applicants passing security verification will undergo payment verification. Between the foregoing alternate ordering of payment and security verifications, there is some motivation in selecting the verification expected to result in more rejections to be conducted first since, by doing so, the number of verifications performed on subsequently rejected customers may be minimized. As the performance of security verifications would also serve the public good, it may be preferred that security verifications are performed on all customers seeking to enroll in the card-free program, whether such a goal is accomplished by performing security verifications first or by performing security verifications on all customers, whether or not they successfully pass the payment verification. Finally, while FIG. 1 also shows the payment and security verifications 119 and 120 as being performed immediately after it is determined that the terms and conditions requirement is met at 116, the payment and security verifications 119 and 120 may take place at any appropriate point in the enrollment process. For example, the payment and security verifications may be conducted immediately after the customer provides the information required for subsequent access to the card-free program at 108. In a further embodiment thereof, the method 100 includes determining whether the customer passes the payment and security verifications at 119 and 120 in real time. In further embodiments thereof, any investigations into a customer's payment and/or financial history, validation of identification presented by a customer, and/or OFAC processing of the customer may be performed by the merchant and/or may be outsourced to at least one outside party.

The foregoing description has been specifically limited to a process for enrolling customers in a card-free program offered by a first merchant. The disclosed enrollment process may be readily modified into a process for enrolling customers in a second type of program, hereafter referred to as a card-based program, which allows the customer to access the program with or without the presentation of a card, typically, a loyalty card, distributed by the first merchant. Like new enrollees in the card-free program, a customer enrolling in a card-based program provides both the information required at 106 for participation in the card-based program as well as the information required at 108 for subsequent access to the card-based program. To modify the card-free enrollment process to one in which the customer may also access the program using a card distributed by the first merchant, completion of enrollment at 122 may further include, upon approval of the customer, the distribution of a program card such as a loyalty card to the customer. Before distributing the loyalty card, however, the account number of the loyalty card may be stored in a fifth memory area of the memory associated with the card-free program application. The account number for the loyalty card may then be linked to the subsequent access information for the customer stored in the second memory area. The linked loyalty card may then be given to the approved customer. The customer may now use the loyalty card to access the card-free program (which has now been modified into a card-based program). To do so, the customer need only present the loyalty card to the cashier at the POS. Upon receiving the account number associated with the presented loyalty card, the card-free program application may compare the received account number with the account numbers stored in the fifth memory area and, upon detecting a match, link to the subsequent access information maintained in the second memory area. Once the card-free program application has determined the subsequent access information using the link from the loyalty card account number, the card-free program application may complete a card-based access as if the program offered by the merchant in the same manner as it would a card-free access of the program, typically, by use of the participation information maintained in the first memory area.

The foregoing description has also been limited to a discussion of the enrollment of customers that have never been previously enrolled in a program offered by the first merchant. However, as many retailers already have loyalty programs in place, provision may be made in the enrollment techniques described hereinabove to address the enrollment of current loyalty program participants in additional card-free and/or card-based programs, for example, the modified ACH payment processing program described hereinabove. The disclosed enrollment process may also be readily modified into a process for enrolling existing participants in a loyalty program in a second program, for example, a card-free program or a card-based program. Like new enrollees in the card-free program, a customer currently participating in a loyalty program who chooses to enroll in either a card-free or card-based program provides both the information required at 106 for participation in the card-free or card-base program as well as the information required at 108 for subsequent access to the card-free or card-based program (unless the existing loyalty program maintains the participation and/or subsequent access information typically provided by the customer at 106 and 108, respectively). To modify the card-free or card-based enrollment process to one to address those situations in which the customer is already a participant in a loyalty program offered by the merchant, completion of enrollment at 122 may further include, upon approval of the customer, an inquiry as to whether the customer would prefer to convert to a card-free program or to continue using a card-based program. Should the customer elect to convert to a card-free program, further modification of the disclosed process is not required. However, should the customer elect to continue using a card-based program, it may be necessary to either (a) have the customer surrender their existing loyalty card in favor of a new loyalty card, or (b) associate the account information for the existing loyalty card to the subsequent access information provided by the customer at 108.

If a new loyalty card is to be provided, before the new loyalty card is given to the customer, the account number of the new loyalty card may be stored in a fifth memory area of the memory associated with the card-free program application. The account number for the loyalty card may then be linked to the subsequent access information for the customer stored in the second memory area. Upon establishing the link, the new loyalty card may be given to the approved customer. The customer may now use the new loyalty card to access the card-based program. A subsequent usage of the new loyalty card would again initiate a series of actions previously described with respect to the card-based program. Conversely, should the customer elect to continue using the existing loyalty card, the account number of the existing loyalty card may be stored in a fifth memory area of the memory associated with the card-free program application. The account number for the existing loyalty card may then be linked to the subsequent access information for the customer stored in the second memory area. Upon establishing the link, the customer may use the existing loyalty card to access the card-based program. Any subsequent usage of the existing loyalty card would again initiate a series of actions previously described with respect to the card-based program.

II. Enrollment Processes, Specifically

Disclosed herein is a method of enrollment of a customer in a payment processing program offered by a merchant or payment program third party, comprising the customer providing, to a first electronic device accessible by a merchant or payment program third party, access information necessary for obtaining access to a source of funds; and generally simultaneously with the providing of the access information to the electronic device accessible to the merchant or payment program third party, the customer further providing, to the first electronic device accessible to the merchant or payment program third party, authorization information required to obtain the access information; wherein the merchant or payment program third party cannot receive the access information until the customer has provided the authorization information. The method may further comprise associating the access information provided to the first electronic device with the authorization information provided to the first electronic device. The access information may be associated with the authorization information such that the access information will be provided to the merchant or payment program third party upon each receipt, by either the first electronic device or a second electronic device coupled to the first electronic device, of the authorization information. The authorization information may be comprised of a series of alphanumeric characters selected by the customer, which may include the telephone number of the customer and/or at least part of the birth date of the customer. For example, the series of alphanumeric characters may be comprised of a first sub-series of alphanumeric characters corresponding to the telephone number of the customer, a second sub-series of alphanumeric characters corresponding to at least part of the birth date of the customer and a third sub-series of alphanumeric characters, said third sub-series being a security code selected by the customer. The customer may provide the access information and the authorization information at a point of sale (POS) operated by the merchant. The associating of the access information and the authorization information may be performed at the POS or at a location remote to the POS.

The description set forth hereinabove did not address the various locations at which enrollment in a card-free program could be conducted in great detail. Nor did the aforementioned passages address how enrollment may be conducted in plural sessions and how the plural sessions may be conducted at a single location or at plural locations. Such variations in the method of enrolling in a card-free program will now be described with respect to FIGS. 2A-C. Enrollment may be completed in either: (a) a single session conducted on the premises of the merchant, for example, at the POS; (b) two or more sessions conducted on the premises of the merchant; (c) two or more sessions, with an initial session conducted on the premises of the merchant and a final session conducted at a remote location, for example, at a personal computer (PC) located at the home of the customer; (d) two or more sessions, with an initial session conducted at a remote location and a final session conducted on the premises of the merchant; or (e) one or more sessions conducted at a remote location such as at a computer located at the home of the customer. For ease of description, however, the methods described herein are directed to those embodiments in which no more than two sessions are required to complete enrollment of the customer.

Figure 2A:
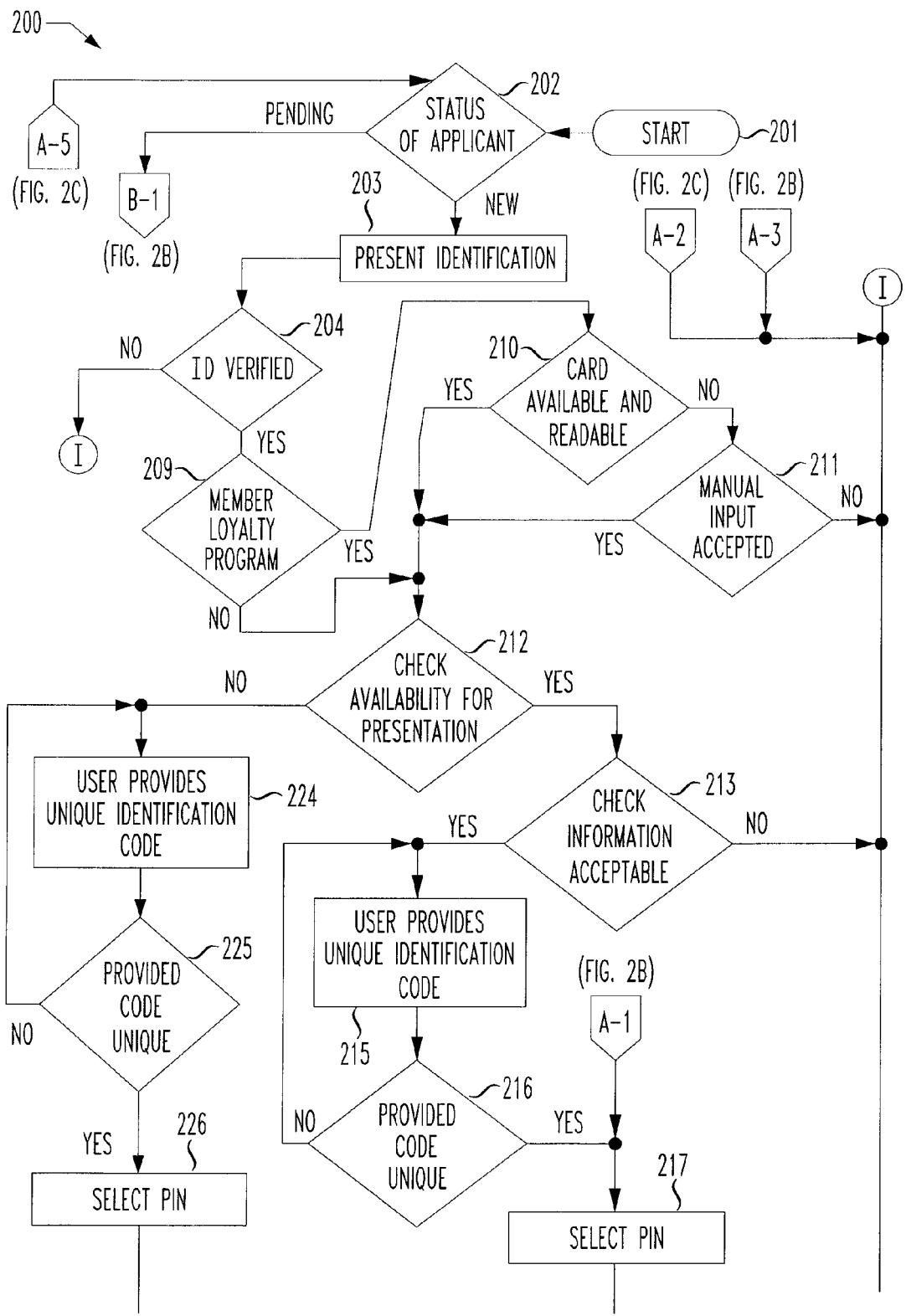
FIG. 2A is a first portion of a flow chart of in-store actions which occur in connection with the enrollment of a customer in either a modified ACH payment processing or linked loyalty program offered by a merchant.
Figure 2A:
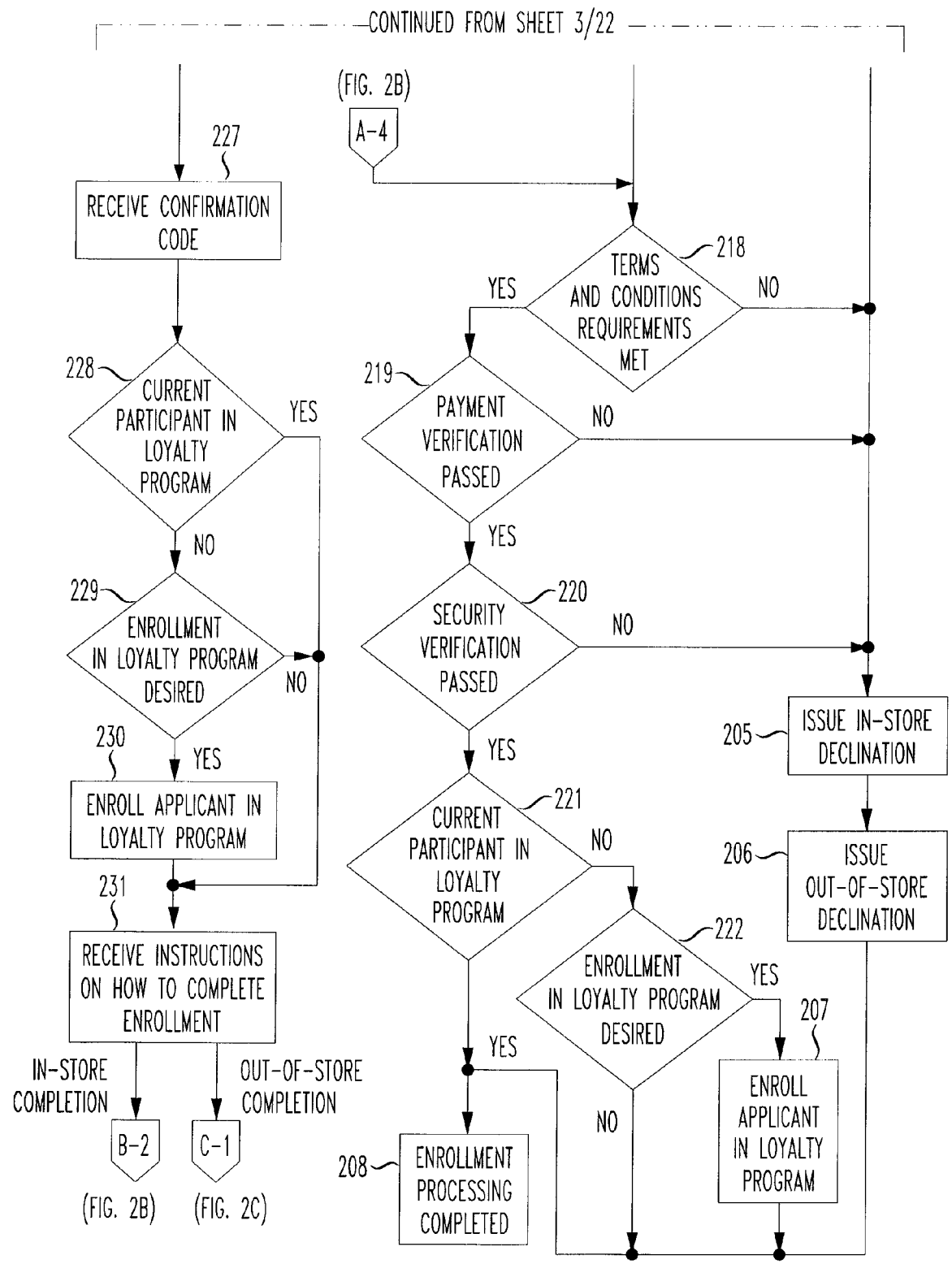
Figure 2B:
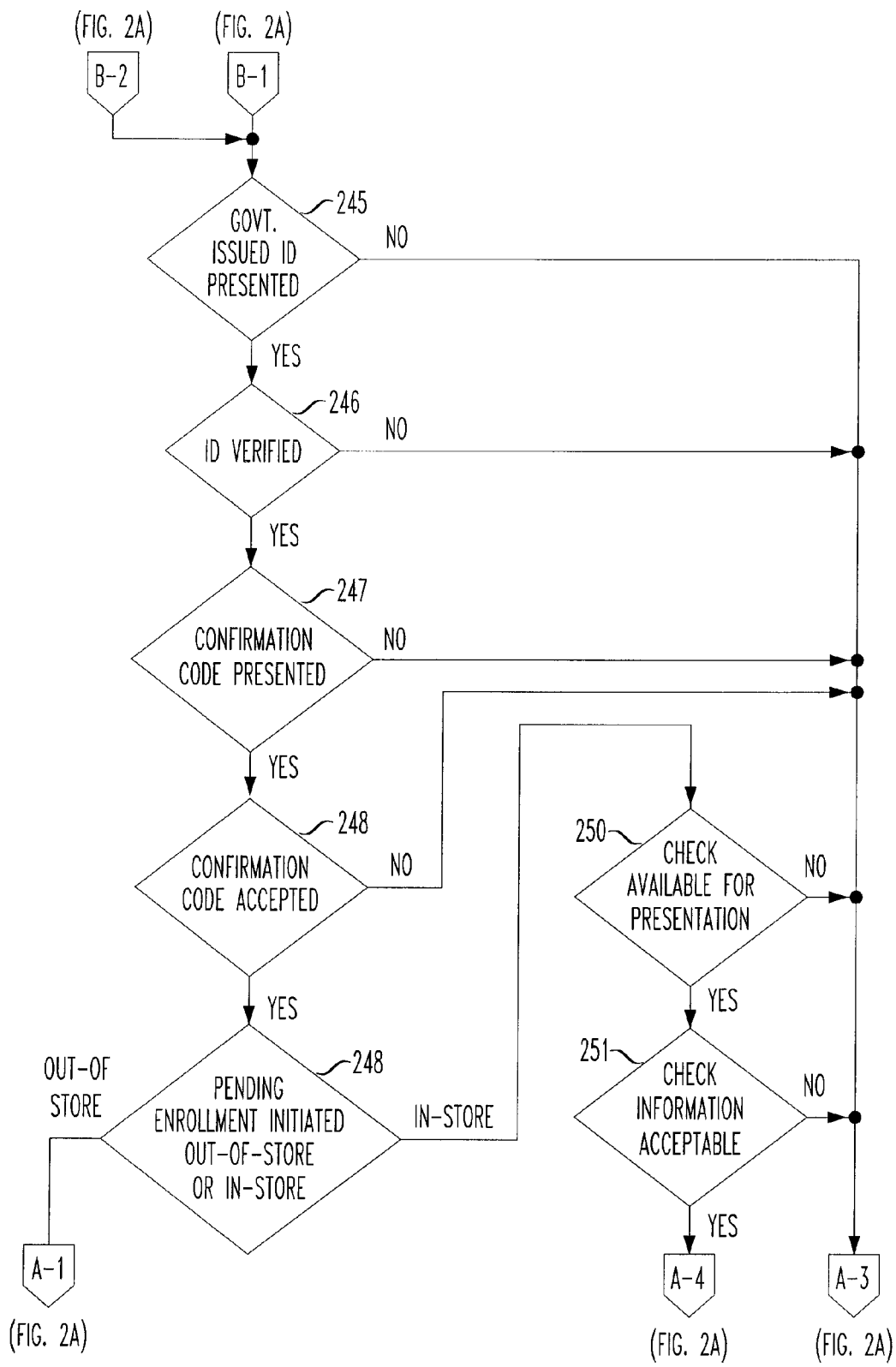
FIG. 2B is a second portion of a flow chart of in-store actions which occur in connection with the enrollment of the customer in either the modified ACH payment processing or linked loyalty program offered by the merchant.
Figure 2C:
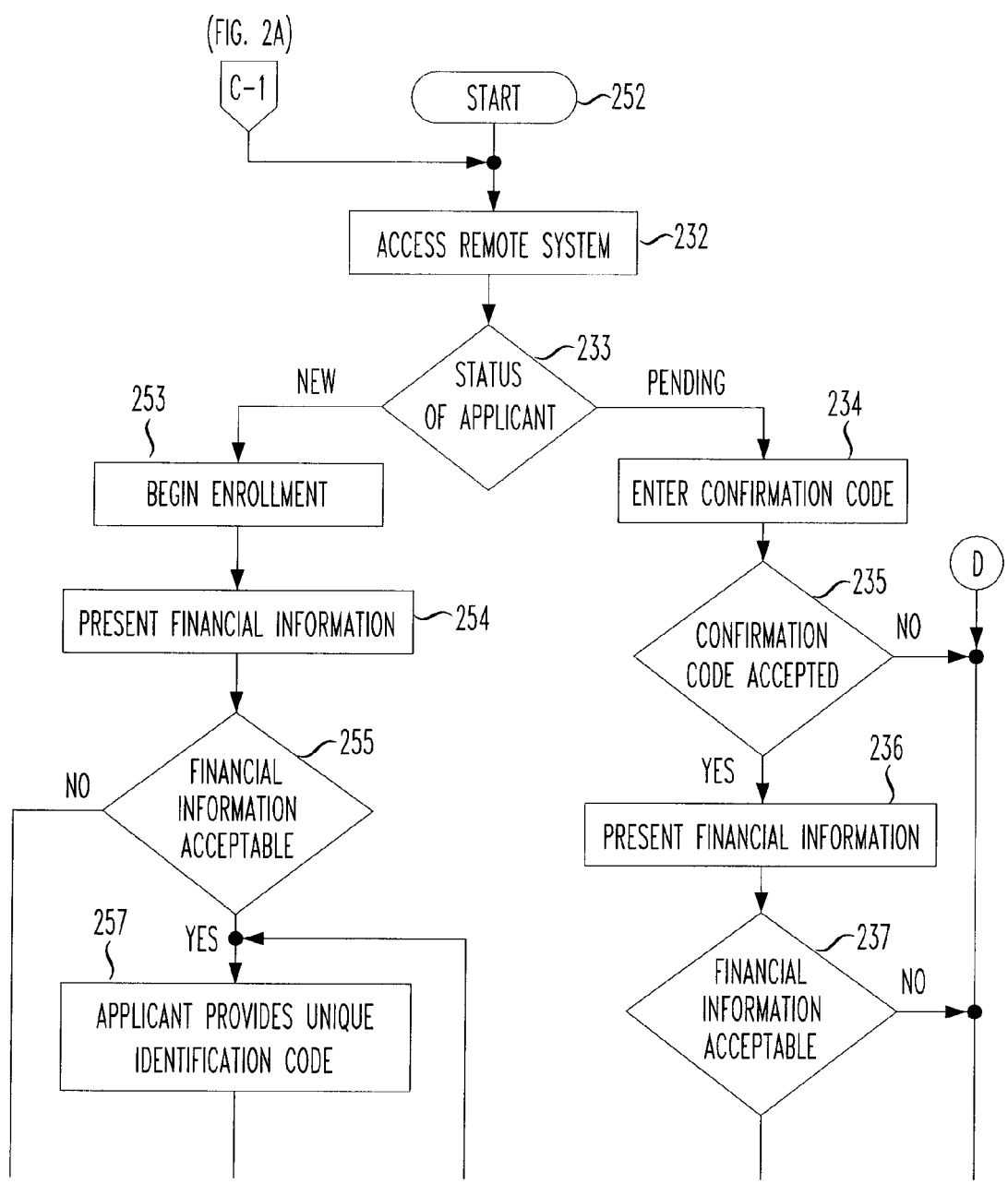
FIG. 2C is a flow chart of out-of-store actions which occur in connection with the enrollment of the customer in either the modified ACH payment processing or linked loyalty program offered by the merchant.
Figure 2C:
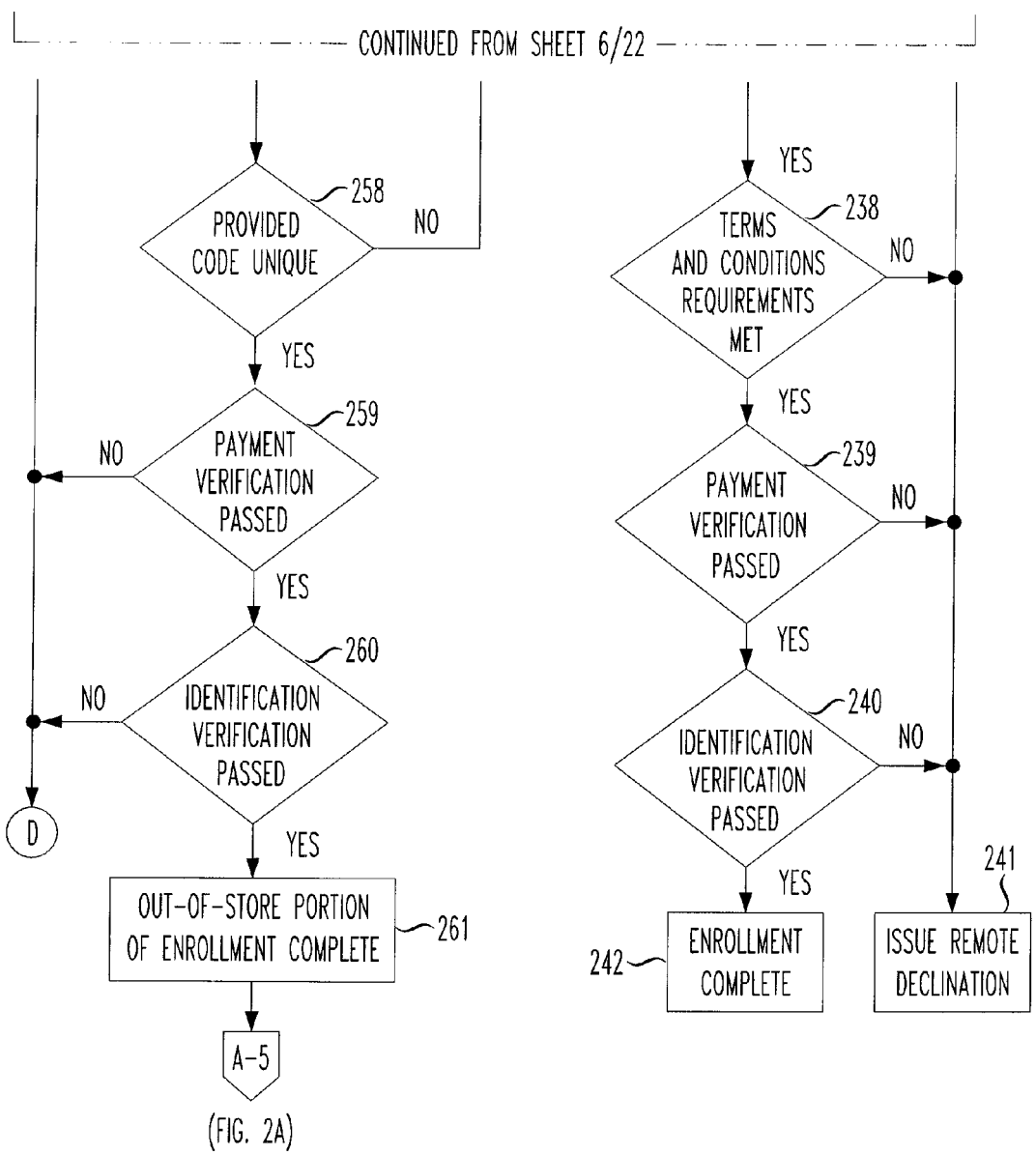
Figure 2D:
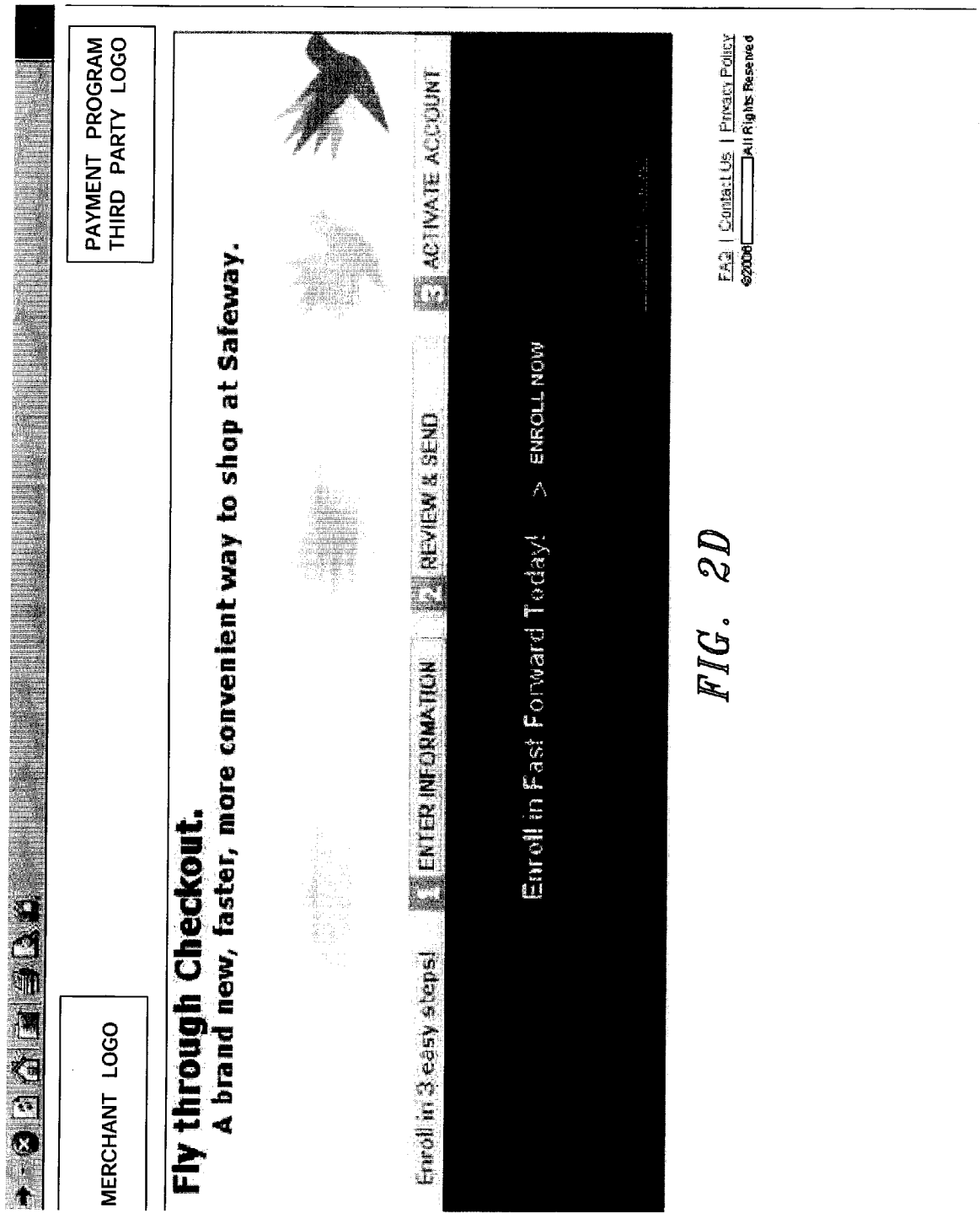
FIG. 2D is an illustrative screen shot of a web enrollment interface for initiating enrollment in either the modified ACH payment processing or linked loyalty program.

For further ease of description, FIGS. 2A-C are segmented between "in-store" actions which take place at the premises of the merchant and "out-of-store" actions which take place at the remote location. More specifically, FIGS. 2A-B are directed to in-store actions while FIG. 2C is directed to out-of-store actions. Even more specifically, various portions of FIGS. 2A and 2B are directed to: (1) in-store actions which occur in connection with an instant (also periodically referred to as a "one-step") enrollment process which is completed, by the customer, in a single visit to a store operated by a merchant; (2) in-store actions which occur in connection with a two-step enrollment process which is initiated, by the customer, in a first visit to the store and completed during a subsequent visit to the same store or to a second store operated by the same merchant; (3) in-store actions which occur in connection with a two-step enrollment process which is initiated during a visit, by the customer, to the store and completed out-of-store at a remote location; and (4) in-store actions which occur in connection with a two-step enrollment process initiated out-of-store at a remote location and completed in-store at a store operated by the merchant. On the other hand, various portions of FIG. 2D are directed to: (1) out-of-store actions which occur in connection with a two-step enrollment process which is initiated, by the customer, in a visit to the store and completed out-of-store at a remote location; (2) out-of-store actions which occur in connection with a two-step enrollment process initiated out-of-store at a remote location and completed in-store at a store operated by the merchant; and (3) out-of-store actions which occur in connection with a one-step or two-step enrollment process initiated and completed at a remote location. Finally, it is contemplated that the foregoing enrollment processes may result in a card-free enrollment in which the enrolling customer is not issued a loyalty card for subsequent use and/or a card-based enrollment in which the enrolling customer is issued a loyalty card for subsequent use, if desired.

The enrollment processes set forth in FIGS. 2A-C are distinct from that previously described with respect to FIG. 1 in a variety of other ways. First, the processes disclosed in FIGS. 2A-C are directed to those programs requiring a greater amount of information, typically, confidential financial information, from the customer in order for the customer to complete enrollment in the program. Further, while the use of a relatively highly secured 18-digit or 19-digit access code to be used by the customer when subsequently accessing the program was disclosed in connection with the enrollment process illustrated in FIG. 1, it was further disclosed that the use of the eighteen digit access code was not always necessary and that relatively lesser secured access codes, typically, but not necessarily, access codes employing a lesser number of digits may be used. In the embodiment disclosed in FIGS. 2A-C, however, it is preferable that highly secured access codes such as the disclosed eighteen digit or nineteen digit access code be used uniformly since financial assets of the customer would be exposed to theft or other types of losses in the event that the access code was compromised, for example, if another person came into possession of the code.

The enrollment processes disclosed in FIGS. 2A-C further differ from that previously disclosed with respect to FIG. 1 in a number of other ways. Again, in consideration of greater security requirement which may be provided to enrollment processes involving financial transactions, the enrollment processes disclosed in FIGS. 2A-C require additional identification of the customer seeking to enroll. More specifically, in the enrollment processes to be more fully described herein, the additional identification required is either a valid driver's license (or other form of government-issued picture ID) and/or a loyalty card previously issued by the merchant. Apart from the need to identify, with a high degree of confidence, the customer seeking to enroll in the program, the merchant or payment program third party may have any number of other reasons for requiring the presentation of a picture IDs and/or existing loyalty cards from customers seeking to enroll in the programs disclosed in FIGS. 2A-C. More specifically, in a broad sense, the merchant or payment program third party seeks to enroll as many customers as is possible in the program and to conduct those enrollments at the POS or at another in-store location. However, the merchant or payment program third party also seeks to avoid unreasonable delays when enrolling customers in the program. Accordingly, it is important that the merchant or payment program third party acquire as much information on the customer in the shortest possible time. Typically, membership in an existing loyalty program means that the customer has previously filled out a form with detailed identifying information and, by simply associating the information provided by the customer while enrolling in the new program with the customer's account number for the loyalty program, a significant amount of information on the customer becomes available for use in enrolling the customer in the new program in a nearly instantaneous manner. Similarly, the driver's license bears basic information on the customer, including their name and address, as well as a license number often used by merchants for identification purposes. The information appearing on the driver's license presented by a customer enrolling in the new program may be easily recorded for subsequent use in the enrollment process, particularly for those states and/or other jurisdictions employing licenses bearing a magnetic strip in which the identifying information is encoded, for example at a POS via a magnetic strip reader such as those typically associated with pinpads.

As previously set forth, the processes disclosed in FIGS. 2A-C may be used with any type of program offered by the merchant or payment program third party with little, if any, modification thereof. The disclosed processes are particularly well suited for use in conjunction with enrollment in financial programs offered by the merchant or payment program third party, such as card-free modified ACH payment processing programs and card-free linked loyalty programs. The processes disclosed are also suitable for use in connection with enrollment of the customer in any number of variants of the aforementioned programs. For example, the disclosed enrollment processes are also suitable for use in connection with card-based modified ACH payment processing programs and card-based linked loyalty programs.

B. A One-Step, In-Store Method for Instantly Enrolling a Customer in a Card-Free or Card Based Modified ACH Payment Processing or Linked Loyalty Program A one-step method by which a customer or other purchaser of goods or services offered by a merchant instantly enrolls in-store in a modified ACH payment processing program shall now be described in greater detail. In addition, a one-step method by which a customer instantly enrolls in-store in a linked loyalty program shall also be described in greater detail. As used herein, a "linked loyalty program" is a loyalty program linked to a payment processing program such as a modified ACH payment processing program. In their broadest sense, a customer completes an instant, in-store enrollment in either of the aforementioned programs by providing information as to the method of payment, for example, account information for a bank account to be debited, for goods to be purchased, and a unique access code to be associated with the payment information. Using the access code, the customer accesses the associated payment information which, in turn, is used to complete an ACH transaction. If linked to a loyalty program, the customer may also receive the benefits offered through that loyalty program.

As used herein, the term "modified ACH payment" is intended to refer to otherwise conventional ACH transactions that have been modified on the "front end" but are conventionally configured on the "back end." In turn, the term "front end" is intended to refer to the process by which a merchant or payment program third party initiates an ACH transaction requesting the transmission, to the merchant, of funds, in an amount specified by a customer of the merchant, from an account maintained by the customer at a financial institution. Conversely, the term "back end" is intended to refer to all other portions of a conventional ACH transaction which occur after the merchant or payment program third party has requested the transmission of funds, in the amount specified by the customer of the merchant, from the account maintained by the customer at the financial institution. However, the disclosed processes need not be limited to ACH transactions modified only on the front end thereof. Rather, it is fully contemplated that the disclosed processes may be configured to further encompass selected portions of the back end of the ACH transaction. In an embodiment, "modified ACH payment" refers to a front end modification whereby the ACH transaction is initiated without the need for a physical tender such as a check or debit card from a customer to a merchant, which may also be referred to herein as a card-free or card-free process. Finally, it should be clearly understood that the foregoing description of the disclosed processes in connection with an ACH transaction is purely exemplary and it is specifically contemplated that the techniques disclosed herein are equally suitable with payment processes other than the particular one disclosed herein.

As further used herein, an "ACH transaction" refers to a financial transaction processed via the well-known batch processing, store-and-forward system commonly referred to as the ACH network, which is described in more detail herein. A "point-of-sale" (POS) refers to a physical location at which a product and/or service may be purchased. Without limitation, examples of a POS include a check-out lane in a grocery store or other retail establishment, a gasoline pump, a kiosk and the like. In an embodiment, a POS may also encompass web servers, automated voice processing systems and other devices and/or systems which enable consumers to make purchases or conduct other financial transactions without any direct physical interaction with the merchant and/or devices maintained by the merchant. A "merchant" may be any individual, group of individuals, or business entity of any form involved in the sale of goods and/or services to consumers or other merchants. Without limitation, examples of merchants include supermarkets, clothing stores, gas stations, retailers, and the like.

Turning now to FIGS. 2A-B, the various in-store actions which occur in connection with a one-step, in-store method of instantly enrolling a customer in either a modified ACH payment processing program or a linked loyalty program offered by a merchant will now be described. In this regard, a customer initiating the enrollment process may not seek to enroll in one of the aforementioned programs in favor of the other. Rather, selections made by the customer during the enrollment process may determine whether the customer is enrolled in the modified ACH payment processing program or the linked loyalty program. Similarly, a customer initiating the enrollment process may not designate whether they wish to be enrolled in a card-free or card-based program. Rather, selections made by the customer during the enrollment process may determine whether the customer is enrolled in a card-free or card-based program.

Importantly, and as will be more fully described below, in the methods described herein, the customer presents a check or other type of acceptable financial information in order to complete a one-step, in-store enrollment in either the modified ACH processing or the linked loyalty program. If desired, the in-store one-step enrollment may be completed in real time and/or as part of a purchase or other transaction between the merchant and the customer. In an embodiment, the one-step, in-store enrollment is an instant enrollment as defined herein. To enroll, the customer shall be asked to present either: (1) a form of identification, typically, a government-issued picture ID; or (2) a loyalty card; in combination with (3) a check or other type of financial information, preferably documented information, identifying the arrangement to be used to compensate the merchant for the goods and/or services to be purchased by the customer.

Preferably, presentation of an acceptable form of identification is a prerequisite to enrollment in either the modified ACH payment processing or the linked loyalty program. This includes both the one-step method of instantly enrolling in the modified ACH payment processing or linked loyalty programs described herein as well as the two-step methods to be subsequently described. The form of identification may be any identification generally recognized by the business community as being suitable for proving the identity of the person presenting the identification. Without limitation, examples of suitable forms which a customer may present include a driver's license, a military identification card, passport, or other government issued identification document. While it is contemplated that, in certain embodiments, the presentation of an acceptable form of identification may not be required, such embodiment are generally not preferable due to any number of shortcomings, for example, an unusually high risk of fraud.

Nor is presentation of a loyalty card considered to be a prerequisite to enrollment in the modified ACH payment processing or linked loyalty programs. Broadly speaking, a loyalty card refers to a card issued by a merchant that, oftentimes, is associated with information related to the customer, (e.g., name, address, various preferences, and the like). The loyalty card may be associated with all aspects of a loyalty program offered by the merchant, may be associated with selected aspects of the merchant's loyalty program, may simply be used as an in-store identification card or used for other purposes not specifically recited herein. In embodiments in which the customer had not been previously enrolled in the merchant's loyalty program, enrollment in the modified ACH payment processing program may also result in the enrollment of the customer in the loyalty program. It is to be understood that a loyalty program of a merchant refers to any program in which customers enrolled in the program receive benefits from the merchant. Without limitation, such benefits may be provided in the form of discounts, cash rebates, frequent flyer miles, free products, cash discounts which may be applied towards future purchases of any items, coupons which may be applied towards a future purchase of a specified item (or items) and advertisements. The loyalty card may be associated with a single merchant or, if desired, with plural merchants. If associated with plural merchants, the loyalty card may provide benefits from one or more of the participating merchants. The loyalty program may also include acceptance of the loyalty card as sufficient proof of identification when paying by check. The use of the loyalty card as a form of identification is generally not preferable because they may more readily be used in a fraudulent manner. This is particularly true for merchants who freely distribute the loyalty cards with little, if any, concern that the recipient has properly identified themselves to the merchant when they request the loyalty card.

If a check is used by the customer to identify the financial arrangement for subsequent compensations of the merchant, the check may be any check that is issued by a bank, credit union or other financial institution and used to draw on a checking account, savings account, credit card, line of credit or other type of asset used by the customer to draw funds on request. The check may be issued in the name of the customer, one or more other responsible parties, or any combination thereof. In some embodiments, the check is voided to provide security to the customer. Other types of information which may be used to identify the arrangement to be used to compensate the merchant include, without limitation, a debit card which identifies a financial institution and an account from which the identified financial institution will draw funds in accordance with a pre-existing agreement with the customer or other responsible party and/or a credit card which identifies a financial institution that will advance funds to the customer in accordance with a pre-existing loan agreement with the customer. If the customer does not present a check or other type of instrument, e.g., a debit card, which relies upon the modified ACH payment processing program to reimburse the merchant, the payment processing program to be more fully described below may be modified to take into account the alternate payment process employed in place of the modified ACH payment processing program. For example, a credit card is one type of instrument that does not rely upon the modified ACH payment processing program to reimburse the merchant. Additionally, a line of credit offered by either the merchant or the payment program third party may be yet another type of instrument that may be used to reimburse the merchant.

Turning now to FIG. 2A, a one-step, in-store method 200 for instantly enrolling customers in either a modified ACH payment processing or a linked loyalty program offered by a merchant commences at 201 and, at 202, the status of the customer seeking to enroll in one of the aforementioned programs is determined. As used herein, the term "status" refers to the stage, within the application process, that the customer has reached. The customer is either a new applicant that has not yet taken any action towards enrollment in either the modified ACH payment processing or linked loyalty program or a pending applicant that has taken some actions towards enrollment in the aforementioned programs but has not yet completed the enrollment process. Accordingly, if it is determined at 202 that the customer is a new applicant, for example, the customer answers affirmatively when asked, at the POS, whether they would like to enroll in either the modified ACH payment processing or linked loyalty programs, the method 200 proceeds to 203. If, on the other hand, the customer is a pending applicant, for example, the customer presents themselves at the POS and requests that their enrollment in either the modified ACH payment processing or linked loyalty program be completed, then the customer is enrolling in one of the aforementioned programs using a two-step enrollment process to be more fully described below.

At 203, the customer seeking to enroll in either the modified ACH payment processing or linked loyalty program presents identification at the POS, typically, to an employee or other representative of the merchant responsible for in-store enrollment of customers patronizing the store or other facility operated by the merchant. Continuing on to 204, the customer's identification is matched to the customer. For example, the employee visually matches a photograph and name appearing on the presented identification to the physical appearance of the customer. If the presented identification matches the customer, the presented identification is accepted, and the method 200 proceeds to 209 for further processing of the application in a manner to be more fully described below. If, however, if it is determined at 204 that the presented identification does not match the customer, an in-store rejection of the customer is issued at 205, typically, by the employee advising the customer that enrollment in either the modified ACH payment processing program or linked loyalty program cannot be processed without suitable identification. The method 200 then proceeds to 206 where an out-of-store rejection is issued to the customer. For example, the merchant may generate a written letter to the customer which advises the customer that enrollment in either the modified ACH payment processing or linked loyalty program has been denied. The out-of-store rejection may not be possible if the merchant lacks the name and address of the customer. Alternatively, the merchant may issue an in-store, written rejection, for example via a POS printer such as a receipt printer. Furthermore, the merchant may elect to issue written and/or out-of-store rejections only when required by law. Having issued an in-store rejection at 205 and optionally an out-of-store rejection to the customer at 206, the method 200 proceeds to 208 where processing of the customer's application to enroll in either the modified ACH payment or linked loyalty program is complete.

Returning to 204, if the presented ID is verified, again, for example, by visually matching the photograph appearing on the presented identification to the physical appearance of the customer, the method 200 proceeds to 209 for a determination as to whether the customer is a current member of the merchant's loyalty program. To do so, the employee may inquire as to whether the customer has a loyalty card or, if the loyalty program is a card-free program, if the customer is a participant in the loyalty program. If the customer answers affirmatively and (1) presents a loyalty card bearing their membership number, (2) states their membership number, or (3) provides a reference number, for example, their telephone number, previously associated with their membership number, the method 200 proceeds from 209 to 210 where, if the customer's loyalty card is both available and readable, information related to the customer associated with the loyalty card is read for use in connection with enrollment of the customer in the linked loyalty program. While the amount of information related to the customer available for use in the enrollment process may vary based upon the amount of information collected at the time of enrollment in the loyalty program, at an absolute minimum, the membership number associated with the loyalty card possessed by the customer may be provided. It is contemplated that the information related to the customer may be transferred using a variety of techniques. For example, the presented loyalty card may be scanned using a handheld optical reader or swiped through a magnetic reader. If, on the other hand, the loyalty card is not available for presentation or if the loyalty card is a relatively unsophisticated card on which the reference number is manually printed or otherwise transcribed, the method 200 proceeds to 211 where the membership number may be input into a pin pad or other suitable data input/output (I/O) device deployed at the POS by the merchant. It is contemplated that either the customer or the employee may physically input the account number at 211.

Similarly, in embodiments where the customer is not carrying their loyalty card or where the merchant employs a card-free loyalty program, the customer may either provide the cashier with their membership number for entry into the pinpad or enter the membership number into the pinpad themselves. As many people find it difficult to remember their membership number for a loyalty program, particularly when the loyalty program has a large number of participants and the membership numbers become quite long, as previously set forth, the membership number for a customer participating in the loyalty program may be associated with a reference number that is relatively easy for a customer to remember. By way of example, a loyalty program may elect to associate the membership number for a participant with their telephone number.

Upon reading or otherwise receiving the membership number of the customer seeking to enroll in the linked loyalty program, a verification is performed, also as part of 210 (if the card is both available and readable) or 211 (if the account number is manually provided). If the membership number read at 210 is verified as being associated with a customer participating in the loyalty program, the enrollment process continues at 212 for further processing in a manner to be more fully described below. If, however, the verification at 210 indicates that the membership number was not successfully read (e.g., the magnetic bar code is not operable), was successfully read but subsequently denied (e.g., the received membership number does not correspond to the membership number for a participant in the loyalty program), the method proceeds to 211 for manual input of the membership number in accordance in the manner previously set forth. Similarly, if the verification at 211 indicates that the manually entered membership number was improperly entered (e.g., the customer or employee enters an incorrect membership number) or was properly entered but subsequently denied, the membership number may, if desired, be entered manually a second time, again, as part of 211. If the membership number entered manually at 211 for either the first or second time is verified as being associated with a customer participating in the loyalty program, the enrollment process continues at 212 for further processing in a manner to be more fully described below. If, however, the membership number is not verified, the method may instead proceed to 205 for issuance of an in-store rejection, an optional out-of store rejection at 206, and completion of the enrollment process at 208. Here, however, the in-store and/or out-of-store rejections may vary from that previously described. More specifically, in response to a failure to verify the customer's membership in the loyalty program, the customer may be advised of the verification failure, for example, by generating a failure message in a display portion of the pinpad used to enter the membership number. Upon learning of the verification failure, the employee may then inquire if the customer would like to continue enrollment in either the modified ACH payment processing or linked loyalty program as a non-member in the loyalty program. If so, the method would proceed to 212 for further processing in a manner to be more fully described below. If the customer declines to continue enrollment as a non-member in the loyalty program, however, the rejection process may proceed in the manner previously set forth.

Upon an indication, by the customer, that they are not a member of the loyalty program at 209 or upon verification of membership in the loyalty program at either 210 or 211, the method 200 proceeds to 212 where the customer's payment system information is captured, for example the customer presents a blank check to the employee. If desired, the customer may elect to void the check before presenting it to the employee. If the customer has a blank check for presentation to the cashier, the enrollment process proceeds to 213 for further in-store processing of the one-step, in-store instant enrollment in either the modified ACH payment processing program or the linked loyalty program. If, however, it is determined at 212 that the customer does not have a blank check for presentation to the cashier, the one-step, in-store instant enrollment process converts into one of plural two-step enrollment processes and proceeds to 224 where the two step enrollment of the customer continues in a manner to be more fully described below.

Returning to 213, upon presentment of the blank or voided blank check, the presented check is scanned or otherwise read, for example, using an optical scanner or magnetic ink reader, and the routing number and account number imprinted on the presented check is captured. It is to be understood that 212 and 213 are not limited to checks but may instead encompass other payment systems or methods by which payment may be made from the customer's account. For example, the customer may elect for an alternate method of payment and instead present a debit or charge card to the employee. If, however, the alternate method of payment elected by the customer involves a payment process which does not incorporate an ACH transaction, the process by which the merchant is reimbursed for purchases made by the customer may be modified correspondingly.

If the banking information captured from the presented check at 213 is acceptable, for example, if the presented check was successfully read and the desired information successfully captured therefrom, the method 200 proceeds to 215 where the customer provides a unique identification code. In addition to a simple confirmation that a routing number and account number were captured from the presented check, it is contemplated that a determination at 213 that the banking information captured from the presented check is acceptable may also include confirmation that the captured routing number corresponds to a financial institution; confirmation that the captured account number corresponds to an account maintained by the financial institution in the name of the customer; an investigation to determine whether the customer has either outstanding checks that the financial institution has refused payment and/or the customer has "bounced" a pre-determined number of checks within in a pre-determined time period; or combinations thereof.

Returning to 215, it is noted that the unique identification code of each customer enrolling in either the modified ACH payment processing or linked loyalty program offered by the merchant is to be different from the unique identification code of every other enrollee. While described herein as being comprised of a number having a predetermined length, it is fully contemplated that the unique identification code may be comprised of any combination of letters, numbers and/or symbols which appear on the pinpad or other I/O device deployed at the POS. The unique identification code may be input, by the customer, by any suitable method, for example, using the pinpad deployed by the merchant at the POS. In one embodiment, the unique identification code is a six digit number comprised of the month, day, and year of the customer's birth provided that no duplicates are allowed. In another embodiment, the unique identification code is comprised of a ten digit number comprised of the customer's telephone number. In still another embodiment, the unique identification code is a fourteen digit number comprised of the customer's telephone number and the month and day of the customer's birth.

At 216, the identification code provided by the customer is verified as unique. The verification may be accomplished by any suitable method. For example, it may be accomplished by electronically checking a data store maintaining the unique identification numbers of enrollees in either the modified ACH payment processing or linked loyalty program and if a match between the provided identification code and an existing unique identification code is found, the provided identification code is classified as "not unique" and the method 200 returns to 215 for selection of another identification code. Telephone numbers may be considered to be unique. Accordingly, if an identification code containing a telephone number is classified as "not unique", such a determination is likely the result of an incorrectly entered telephone number. Accordingly, to avoid such errors, it may be desirable to provide a confirmation process where, to avoid the entry of an erroneous identification number, the identification number is entered twice. Conversely, the failure to find such a match results in the provided identification code being classified as "unique" and the method proceeds to 217 for further processing. In an alternative embodiment, the merchant provides the unique identification code. By doing so, the merchant ensures that the provided identification code is unique.

At 217, the customer selects a security code, commonly known in the art as a PIN. As before, the PIN may be entered by the customer using the pinpad or other I/O device located at a POS. The PIN may be any number of letters, numbers or other symbols which may be selected using a data input portion of the pinpad. For example, a PIN may be comprised of a four to six digit number. In certain embodiments, the PIN may be re-entered by the customer, again to ensure, that no mistakes (e.g., one or more mistyped characters) occurred during the entry thereof. In one embodiment, the PIN is verified as unique. For instance, a database of PINs may be maintained in a data store and each PIN selected by a customer is checked against the database. In this embodiment, if the selected PIN is not unique, the customer may be prompted to select a new PIN. In another embodiment, there is no requirement that the PIN be unique. Here, the unique identification code previously provided by the customer ensures that each and every customer enrolled in either the modified ACH payment processing or linked loyalty program may be uniquely identified. After the customer enters the PIN, it is appended to the unique identification code such that knowledge of both numbers is required for the customer to subsequently access either the modified ACH payment processing or linked loyalty program. For ease of description, after the PIN is appended to the unique identification code, the combination is hereinafter referred to as a unique extended identification code.

Upon selection of a PIN number and subsequent generation of a unique extended identification code at 217, the method 200 proceeds to 218 for determination as to whether the customer has satisfied the terms and conditions requirement necessary to complete enrollment of the customer in either the modified ACH payment processing or linked loyalty program offered by the merchant. Further details as to the terms and conditions requirement set by the merchant may be set forth below with respect to FIG. 3, below. At this point, it need only be noted that, if it is determined at 218 that the customer has failed to meet the terms and conditions requirement set by the merchant, the method 200 proceeds to 205 for further processing in the manner previously set forth. Thus, if the customer does not satisfy the terms and conditions requirement set by the merchant, an in-store rejection is generated at 205, an optional out-of-store rejection may be generated at 206, and the enrollment process concludes at 208.

Here, however, the in-store and/or out-of-store rejections may advise the customer that rejection is a result of the customer's failure to meet the terms and conditions requirement, set by the merchant, for either the modified ACH payment processing or linked loyalty program. Conversely, if the customer satisfies the terms and conditions requirement at 218, the method 200 proceeds to 219 for one or more verifications which may be required prior to completing enrollment in either the modified ACH payment processing or linked loyalty program.

More specifically, at 219, the customer undergoes payment verification and, at 220, security verification. As before, should the customer fail to pass either of these verifications, the method would again proceed to 205 for issuance of an in-store rejection, 206 for an optional issuance of an out-of-store rejection, and 208 for completion of the enrollment process. As before, the in-store and/or out-of-store rejections at 205 and/or 206, respectively, may include either a generic rejection message, for example, "Sorry, but we are unable to approve your application at this time" or a specific rejection message stating the reason for the rejection. The verifications take place in any order. Thus, while FIG. 2A shows the security verification taking place after completion of the payment verification, it is filly contemplated that, if desired, the security verification may be performed before the payment verification. Further, it is noted that FIG. 2A also shows the payment and security verifications at 219 and 220, respectively, as being performed immediately after the terms and conditions requirement is met at 218. The payment and security verifications at 219 and 220, respectively, may be performed at any appropriate point in the method 200. For example, the method 200 illustrated in FIG. 2A includes a determination at 213 as to the acceptability of the captured banking information. However, it is filly contemplated that the payment verification described herein may be executed in place of the, or immediately subsequent to, the banking information acceptability determination at 213. If configured in this manner, the banking information acceptability determination would serve as a preliminary review of the financial suitability of the customer seeking enrollment in either the modified ACH payment processing or linked loyalty program while the payment verification would serve as a final review of the financial suitability of the customer. Similarly, the security verification conducted at 220 may be executed in place of, or immediately subsequent to, the ID verification at 204. If configured in this manner, the ID verification would serve as a preliminary review of whether there are any non-financial considerations to be taken into account in the decision as to whether or not to allow the customer to enroll in either the modified ACH payment processing or linked loyalty program while the security verification would serve as a final review as to whether there are any non-financial considerations to be taken into account in the decision as to whether or not to allow the customer to enroll in either the modified ACH payment processing or linked loyalty program.

It is contemplated that payment verification at 219 may encompass any number of types of financial reviews of the customer. Without limitation, a decision as to whether or not the customer passes payment verification test at 219 may be based upon a review of financial information (including both information related to the account to be used for payment in an ACH transaction as well as information related to the overall financial health of the customer). For example, it is contemplated that a customer may fail payment verification at 219 if the provided financial information includes: (1) a routing number which fails to correspond to any financial institution; (2) an account number which fails to correspond to any account at the identified financial institution; (3) an account number of an account for which the customer lacks authority to withdraw funds; (4) an account number of an account for which a specified level of cash reserves has not been maintained for a specified period of time; or (5) an account number of an account that is frequently overdrawn. The foregoing are provided purely by way of example and it is filly contemplated that any number of these and/or other financial considerations not specifically recited herein may be utilized when establishing the criteria used to determine whether a customer passes or fails the payment verification at 219. In order to provide a definitive answer as to whether the customer's application for enrollment in either the modified ACH payment processing or linked loyalty program may be accepted, it is often preferable that the payment verification at 219 be conducted in real time, thereby ensuring that a decision on the customer's application may be provided in a timely manner. It is contemplated that the payment verification conducted at 219 may be performed by the merchant and/or be outsourced to one or more outside parties.

Similarly, a decision as to whether or not the customer passes the security verification at 220 may be based upon any number of criteria, for example, (1) the degree of confidence to which the identification information provided by the customer can be verified, (2) whether the results of an OFAC review of the customer were favorable or unfavorable, (3) whether the customer appears on any watch lists, for example, terrorist watch lists, (4) whether the customer has ever been arrested or convicted for shoplifting or for passing bad or no account checks, or (5) whether the customer has a history of violence, drug or alcohol addiction and/or mental instability. The foregoing are provided purely by way of example and it is fully contemplated that any number of these and/or other non-financial considerations not specifically recited herein may be utilized when establishing the criteria used to determine whether a customer passes or fails the security verification at 220. Again, in order to provide a definitive answer as to whether the customer's application for enrollment in either the modified ACH payment processing or linked loyalty program may be accepted, it is often preferable that the security verification at 220 be conducted in real time, thereby ensuring that a decision on the customer's application may be provided in a timely manner. It is contemplated that the security verification conducted at 220 may be performed by the merchant and/or be outsourced to one or more outside parties. As opposed to the payment verification conducted at 219, the scope and nature of the security verification conducted at 220 makes it much more likely that a third party may have access to the resources necessary to properly conduct the security verification.

If the customer passes payment verification at 219 and security verification at 220, the method 200 proceeds to 221 for determination as to whether the customer is a current participant in the loyalty program offered by the merchant. As this is the same test that was previously performed at 209, it is contemplated that the prior determination as to whether the customer is a current participant in the loyalty program may be reused at 221. Having (a) met the requirements (verifiable identification, verifiable payment information and creation of a unique extended identification code) for conducting ACH transactions through one of the programs offered by the merchant; (b) been confirmed as a current participant in the merchant's loyalty program; and (c) established a first link between their membership number for the loyalty program and their unique extended identification code and a second link between their unique extended identification code and their payment information as described previously, the customer is formally enrolled in the linked loyalty program offered by the merchant at 221, thereby completing the method 200 at 208.

If, however, it is determined at 221 that the customer is not a participant in the loyalty program, the method 200 proceeds to 222 for determination as to whether the customer wishes to enroll in the loyalty program. For example, as previously set forth, the employee may ask the customer whether or not they are a member of the loyalty program at 209. If the customer answers in the negative, the employee may then ask if the customer wishes to enroll in the loyalty program as part of their enrollment in either the modified ACH payment processing or linked loyalty program. The method 200 may use the information thusly acquired at 209 to determine at 222 whether the customer wishes to enroll in the loyalty program. If the customer wishes to enroll in the loyalty program, the method 200 proceeds to 207 where the customer is enrolled in the program, typically, by assigning a membership number to the customer and linking the assigned membership number to the unique extended identification code. Having (a) met the requirements (verifiable identification, verifiable payment information and creation of a unique extended identification code) for conducting ACH transactions through one of the programs offered by the merchant; (b) enrolled in the merchant's loyalty program; and (c) having established a first link between their membership number for the loyalty program and their unique extended identification code and a second link between their unique extended identification code and their payment information as described previously, the customer is formally enrolled in the linked loyalty program offered by the merchant at 207, thereby completing the method 200 at 208.

Returning to 222, if it is instead determined that the customer does not wish to enroll in the loyalty program, for example, the customer stated at 209 that they only wanted to be able to conduct ACH transactions and were not interested in enrolling in the loyalty program, the method 200 would proceed, from 222, to 208 where, having (a) met the requirements (verifiable identification, verifiable payment information and creation of a unique extended identification code) for conducting ACH transactions through one of the programs offered by the merchant, (b) declined membership in the merchant's loyalty program and (c) having established a link between their unique extended identification code and their payment information as described previously, the customer is formally enrolled in the modified ACH payment processing program offered by the merchant, thereby completing the method 200 at 208.

The foregoing is a description of a one step, in-store method for instantly enrolling a customer in either a modified ACH payment processing or linked loyalty program offered by a merchant. In an embodiment, such modified ACH payment processing and/or linked loyalty programs are card-free programs, card-based programs, or both as described herein. While there is any number of other methods of enrolling in either the modified ACH payment processing or linked loyalty program described herein, such methods are generally characterized as two-step methods in which enrollment cannot be completed instantly. While, as a whole, such other methods cannot be completed instantly, certain portions of those methods can be completed instantly.

The foregoing method has been identified as being suitable for use in either a card-free or card-based linked loyalty program. When used in a card-free linked loyalty program, the customer would provide their unique extended identification code, for example, by entering the unique extended identification code into a pinpad deployed or other I/O device at a POS. Using the link between the unique extended identification code and the customer's financial information, the financial information may be accessed so that an ACH transaction may be initiated. The link between the unique extended identification code and customer's membership number in the loyalty program enables the customer to receive the benefits associated with their participation in the loyalty program. Specifically, the identified membership number would be confirmed as being assigned to a participant in the loyalty program and a link between the identified membership number and the benefits associated with that membership number would enable the appropriate benefits to be provided to the customer. Conversely, in a card-based linked loyalty program, the customer is able to conduct transactions with or without the use of the loyalty card in their possession. Without the loyalty card, transactions would be conducted in the manner hereinabove described with respect to the card-free linked loyalty program. If the customer elects to present the loyalty card at the POS, their membership number would be confirmed as a membership number assigned to a participant in the loyalty program and a link between the membership number and the benefits associated with that membership number would enable the customer to receive the benefits associated with their participation in the loyalty program. The link between the membership number and the unique extended identification code and the corresponding link between the unique extended identification code and the financial information of the customer may then be used to initiate the ACH transaction.

C. Two Step Method for Enrolling Customers in an ACH Modified Payment Processing or Linked Loyalty Program Suitable for Use With Both Card-Free and Card-Based Programs In the foregoing passages, a one step method for instantly enrolling in either a modified ACH payment processing or linked loyalty program offered by a merchant was described in detail. Having described the one step method, various two step methods shall now be described. While each of the two step methods differs from the others in one or more respects, they all share certain common features. Specifically, for all two step enrollment methods disclosed herein, the customer performs the first step at a first point in time and the second step at a second point in time. Furthermore, the first and second steps are performed at first and second locations. At least one, but possibly all, of the steps may be performed in-store. If desired, at least one, but not all, of the steps may be performed out-of-store, i.e., at a remote location, for example, the home of the customer seeking to enroll in the modified ACH payment processing or linked loyalty programs.

C-1 A First Step In-Store/Second Step Out-of-Store Enrollment Process

The first step in-store/second step out-of-store enrollment process will now be described in greater detail, again, with reference to FIG. 2A. In the description to follow, the first step in-store/second step out-of-store enrollment process is also periodically referred to as the check-less enrollment process because the customer lacks, typically inadvertently, a blank check (the typical instrument used to provide the requisite financial information to the merchant) when first initiating enrollment in either the modified ACH payment processing or linked loyalty programs. By providing a method by which the customer may continue the enrollment process initiated without the necessary documentation to complete their enrollment in the program without having to repeat all or part of the incomplete enrollment process, it is contemplated that customers are more likely to complete the enrollment process at a later date, thereby increasing the number of participants in the programs offered by the merchant.

The first step in-store/second step out-of-store enrollment process commences in the same manner as the one-step instant enrollment process described and illustrated hereinabove. However, the two step enrollment process deviates from the one step instant enrollment process at 212 (FIG. 2A). As previously set forth, at this point in the method 200, the customer is asked to present financial information in sufficient detail to enable enrollment of the customer in either the modified ACH payment processing or linked loyalty program. However, if, at 212, the customer is unable to sufficiently identify the financial resource, for example, the financial institution and/or account number of the checking account to be used as the source of funds for either the modified ACH payment processing or linked loyalty program, the method 200 may instead proceed to 224. For example, if a checking account is to be used as the financial resource, the customer may not have, in their possession, a blank check for presentation at 212.

Despite being unable to complete enrollment of the customer in the program, the method 200 may continue to process the enrollment so that as much of the enrollment as possible is completed at the POS and as little as possible may be left for completion at a later point in time. The foregoing may be varied such that less of the process is completed at the POS and more of the process is completed at the later point in time. Accordingly, if the customer is unable to present a blank check or other suitable financial information, the method 200 may proceed to 224 where the customer may again provide a unique identification code in the form and method previously described with respect to 215. Upon the customer providing a unique identification code, the method 200 proceeds to 225 where it is determined whether the provided identification code is, in fact, unique. Again, the action occurring at 225 has been previously described with respect to 216 and need not be described again in detail. If it is determined at 225 that the provided identification code is not unique, the method 200 returns to 224 for selection of a new unique identification code. If, however, it is determined that the provided identification code is unique, the method 200 continues on to 226 for selection of a PIN. Again, the action occurring at 226 has been previously described with respect to 217 and need not be described again in detail. The PIN selected by the customer is subsequently appended to the unique identification number to form a unique extended identification number In one embodiment not specifically illustrated in the drawings, it is contemplated that upon establishment of the unique extended identification code at 226 the in-store portion of the two-step enrollment process, i.e., that portion of the two-step enrollment process that can be completed during the customer's first visit to the merchant's store, ends. If so, the information necessary for the customer to later complete their enrollment in either the modified ACH payment processing or linked loyalty program is provided at 227. For example, the provided information which can be used by the customer to subsequently access an incomplete enrollment process may take the form of a confirmation code. It is contemplated that the confirmation code may be comprised of a combination of any number of alpha-numeric characters and/or symbols typically found on a data I/O device such as a pinpad or PC. For example, a ten digit confirmation code may be suitable for the uses disclosed herein. Typically, the confirmation code may appear on a receipt or other type of printout generated at the POS upon generation of a unique extended identification number. In one embodiment, issuance of the confirmation code may be omitted and the unique extended identification code may be used to subsequently identify the customer seeking to enroll in either the modified ACH payment processing or linked loyalty program. To further enhance the ease with which the customer seeking to enroll in either the modified ACH payment processing or linked loyalty program, it is contemplated that, in addition to the confirmation code, the customer is provided at 227 with a telephone number and/or a web address at which their enrollment may be completed. The aforementioned contact information may be included, together with the confirmation code, on the receipt generated at the POS. The receipt may also advise the customer that enrollment may also be completed at the same or any other store operated by the merchant.

In one embodiment shown in FIG. 2A, it is contemplated that after issuing at 227 the confirmation code (or in lieu thereof where such information is provided at 231) for subsequent use by the customer to complete enrollment in either the modified ACH payment processing or linked loyalty program, the method 200 may then initiate enrollment of the customer into the loyalty program. In other embodiments not illustrated in the drawings, enrollment of the customer in the loyalty program may occur within any portion of the two step process for enrolling the customer in either the modified ACH payment processing or linked loyalty program and, within that portion, at any point thereof. Enrollment in the loyalty program while out-of-store may pose certain complications if the loyalty program is card-based. If so, the customer may either pick up the loyalty card at a store at a later date or await the arrival of the loyalty card through the mail. Among the various embodiments, enrolling a customer in the loyalty program during the first part of a two step process for enrolling the customer in a linked loyalty payment processing program is preferable because it satisfies another objective of the merchant—enroll as many customers in the loyalty program as possible. Such an objective is preferably satisfied in the first portion of the enrollment process since, whenever the enrollment process is broken into two portions, the likelihood that the customer may fail to complete enrollment in either the modified ACH payment processing program or linked loyalty program is increased. Similarly, within any given portion of the enrollment process, it is preferable to enroll the customer in the loyalty program at as early a point as is possible since, by doing so, in the event that the customer decides not to complete enrollment in the modified ACH payment processing or linked loyalty program, in the interim, the customer may still have been enrolled in the loyalty program.

At 228, the method 200 determines whether the customer is currently enrolled in the loyalty program. In this regard, it is again noted that, at 209, the customer indicated to the employee whether or not they are enrolled in the loyalty program. If the customer is not enrolled in the loyalty program, the method 200 continues on to 229 for determination as to whether the customer wishes to enroll in the loyalty program. The manner for determining whether the customer wishes to enroll in the loyalty program at 229 was previously described with respect to 222 and need not be described in detail again. If it is determined at 229 that the customer wishes to enroll in the loyalty program, the process continues on to 230 where the customer is enrolled in the loyalty program in a manner similar to that previously set forth with respect to 207. Upon enrollment of the customer in the loyalty program at 230 or, upon the customer indicating at 220 that enrollment in the loyalty program is not desired or upon the customer indicating at 228 that they are already participants in the loyalty program, the first step of the two step in-store/out-of store process for enrolling in either the modified ACH payment processing or linked loyalty program is complete and the customer may proceed to complete the second step in the process. Accordingly, the process continues on to 231 where the customer receives instructions on how to complete enrollment. The instructions may comprise the information described at 227, e.g., a confirmation code. Further, the instructions may be provided to the customer by way of a printout generated at the pinpad. The instructions may be provided to the customer in various ways. Preferably, the printout contains a Uniform Resource Locator (URL) address of a web site where the customer can complete enrollment in either the modified ACH payment processing or linked loyalty programs via a PC or other computing device. The printout may also contain a telephone number which the customer can call to complete enrollment in either the modified ACH payment processing or linked loyalty program. The instructions may also advise the customer that they can also complete enrollment in either the modified ACH payment processing or linked loyalty program during a subsequent visit to the same or another store operated by the merchant.

If the customer elects to complete enrollment in either the modified ACH payment processing or linked loyalty program out-of-store, the method 200 continues on to 232 where the customer remotely accesses the enrollment system operated by the merchant. As previously set forth, the first, in-store, portion of the enrollment in either the modified ACH payment processing or linked loyalty program was completed when the customer was provided with a telephone number or web site to be accessed when initiating the second portion of the enrollment process from a remote location. Accordingly, the provided telephone system or web site is accessed at 232, for example, by dialing the provided number or directing a web browser to the provided IP address. It is to be understood that enrollment in either the modified ACH payment processing or linked loyalty program may be completed at any suitable time subsequent to completing the in-store enrollment. In addition, the telephone system or web site may be accessed at any suitable location. For instance, the telephone system or web site may be accessed at a remote location such as at the customer's place of residence. The telephone system may include a series of voice prompts by which the customer may be guided through completion of the enrollment process. Similarly, the web site may include a series of screens through which the customer may navigate. At step 233, a voice or screen prompt may ask the customer whether the customer is starting or completing enrollment in either the modified ACH payment processing or linked loyalty program. If the customer indicates that they are completing a pending enrollment, the method 200 continues to 234 where the customer transmits the confirmation code and/or unique identification code, for example, by depressing a string of digits on the keypad of the telephone or PC.

At 235, the received confirmation code is compared to a series of confirmation codes maintained in memory and, if the received confirmation code matches one of the confirmation codes stored in memory, the received confirmation code is accepted and the customer proceeds to 236 to complete enrollment in either the modified ACH payment processing or linked loyalty program. In an alternative embodiment thereof, it is contemplated that the unique extended identification code produced at 225 may be used in place of the confirmation code provided at 227. In another alternative embodiment, it is contemplated that the unique extended identification code produced at 225 may be used in conjunction with the confirmation code provided at 227. For example, the customer may be asked to provide the confirmation code and, if the provided confirmation code is validated, the customer may then be asked to provide the unique extended identification code produced at 225. In this embodiment, only after both the confirmation code and unique extended identification code are accepted, for example, by successfully matching the provided confirmation and unique extended identification codes to the corresponding codes stored in memory, the method 200 continues on to 236. If, however, the confirmation code, unique extended identification number or both are declined, for example, if one or both fail to match one of the confirmation codes and/or unique extended identification codes maintained in memory, the method 200 proceeds to 241 where a remote rejection is issued. In this regard, the remote rejection 241 is generally similar to the out-of-store rejection at 206 and need not be described in greater detail herein.

Upon a successful match of the confirmation code and/or unique extended identification code to a corresponding confirmation and/or unique extended identification code stored in memory at 236, the method 200 continues on to 237 where the customer provides financial account information, typically, account information for a checking account, that was unavailable at 212 when the customer unsuccessfully attempted a one step, in-store instant enrollment in either the modified ACH payment processing or linked loyalty program. Typically, the financial information provided by the customer at 236 is similar to financial information previously presented at 212 and need not be described in greater detail here. Most commonly, however, the financial information is comprised of the routing number and account number for a checking account maintained, on behalf of the customer, at a financial institution. Upon providing financial information at 236, the method 200 continues on to 237 for determination as to whether the provided financial information is acceptable. Typically, acceptability of the provided financial information is determined in the same manner previously set forth with respect to 213 and need not be described in further detail herein.

If the provided information is determined to be unacceptable, the method 200 proceeds from 237 to 241 where, as previously set forth, a remote rejection is again issued. If, however, the provided financial information is acceptable, the method 200 proceeds to 238 for determination as to whether the customer has satisfied the terms and conditions requirement necessary to complete enrollment of the customer in either the modified ACH payment processing or linked loyalty program. As before, the process by which it is determined whether the customer has satisfied the terms and conditions requirement is fully set forth below with respect to FIG. 3 and need not be described in greater detail herein. If it is determined that the customer has met the terms and conditions requirements set forth at 238, the method proceeds to 239 and 240 for respective payment and security verification of the customer. The payment and security verification at 239 and 240 are generally similar to those previously set forth at 219 and 220, respectively, and thus need not be described in greater detail. Likewise, the terms and conditions requirement at 238, the payment verification at 230, the security verification at 240 may be performed in any suitable order as described previously with respect to like functions at 218, 219, and 220, respectively. If the customer passes both the payment verification at 239 and the security verification at 240, the method 200 proceeds to 242 and enrollment of the customer in either the modified ACH payment processing program (if it was determined at 228 that the customer was not a current participant in the loyalty program and the customer declined enrollment in the loyalty program at 229) or in the linked loyalty program (if it was determined at 228 that the customer was a current participant in the loyalty program or if the customer enrolled in the loyalty program at 230). Enrollment in the linked loyalty program or the modified ACH payment processing program or further includes the functionality and linking described previously at 207 and 208, respectively.

The first, in-store portion of the two step in-store/out-of-store enrollment process may occur in real time. Preferably, the first portion of the enrollment process takes place at the POS and is performed "instantly", i.e., is completed in a sufficiently short period of time short so that the quality of service to the customer (and/or other customers) is adversely affected as described previously. In one embodiment, an instant enrollment process is a process that may be completed in less than about 1 minute, alternatively less than about 45 seconds, further alternatively less than about 30 seconds, and still further alternatively less than about 15 seconds. Accordingly, it is contemplated that the first portion of the in-store/out-of-store embodiment is initiated as part of the one step in-store enrollment process previously described herein and converts into a two step in-store/out-of-store enrollment process only when it is determined that the customer does not have a check, other instrument or knowledge of the financial information necessary to complete enrollment in either the modified ACH payment processing or linked liability program. Thus, it is contemplated that the time that may elapse from initiating the enrollment process at 201 to completion of the in-store portion of the two step process at 231 may be accomplished in less than about 30 seconds. While each of the first and second portions of the two step in-store/out-of-store enrollment process may occur in real time, the respective portions of the enrollment process are separated by a period of time, the duration of which may vary dramatically. Thus, while each of the first and second portions of the two step in-store/out-of-store enrollment process described herein are accomplished in real time, a customer is enrolled in either the modified ACH payment processing program or the linked loyalty program system only after both portions are completed. Thus, enrolling in either the modified ACH payment processing or linked loyalty program by completing the two step in-store/out-of-store process will take considerably longer than the time required to enroll in the same program using the one step, instant in-store enrollment process described herein.

C-2 A First Step In-Store/Second Step In-Store Enrollment Process

The first step in-store/second step in-store enrollment process is generally similar to the first step in-store/second step out-of-store process set forth above in Section C-1. In this embodiment, however, rather than completing the process at a remote location, for example, at home, the customer returns, at a later time, to either the same store or a second store operated by the merchant. For example, the customer may continue or resume a previously initiated in-store enrollment at the POS or a store kiosk. Thus, after receiving instructions on how to complete enrollment at 231, the method may instead proceed to 245 (FIG. 2B) where, upon initiation of a transaction at the POS, the customer may indicate that they wish to complete enrollment in either the modified ACH payment processing or linked loyalty program. The employee may then request, and the customer may present, an acceptable form of identification, again, for example, a government issued ID such as a driver's license. Further details of acceptable forms of identification are set forth above with respect to 203 and need not be described herein in greater detail. If, however, the customer declines or is otherwise unable to present an acceptable form of identification at 245, the method proceeds to 205 (FIG. 2A) for issuance of an in-store rejection and subsequent processing in the manner previously set forth in connection with the one step in-store enrollment process.

Upon presentation of the government issued ID at 245, the method proceeds to 246 for verification of the presented ID. Verification of the presented ID was previously set forth in greater detail with respect to 204 and need not be described in greater detail herein. If the presented ID is verified, the method proceeds to 247. If, however, the presented ID cannot be verified, the method may proceed to 205 (FIG. 2A) for issuance of an in-store rejection and subsequent processing in the manner previously set forth in connection with the one step in-store enrollment process.

At 247, the customer is prompted to provide the confirmation code received at 227 (or 231) of the first portion of the first step in-store/second step in-store enrollment process. For example, the cashier may ask the customer to enter the confirmation code using the pinpad deployed at the POS, or likewise, an automated prompt at a store kiosk or web application may prompt the customer. If the customer elects to provide the requested confirmation code, the customer enters the confirmation code using the pinpad. Alternately, the customer may audibilize the confirmation code for subsequent entry by the employee. Here, rather than the confirmation code, in a first alternate embodiment specifically contemplated herein, the customer may instead provide, upon corresponding request of the employee, the unique extended identification number generated at 224. In a second alternate embodiment, the customer may instead provide, upon request by the cashier, both the confirmation code and the unique extended identification number. If presented with both the confirmation code and the unique extended identification number, the customer may provide the two codes as a single string of digits or, as is more likely, as two separate strings of digits provided in response to respective requests by either the employee and/or the display portion of the pinpad. If, however, the customer declines to present the requested confirmation code, unique extended identification number or combination of the two, the method 200 proceeds to 205 (FIG. 2A) for issuance of an in-store rejection and subsequent processing in the manner previously set forth in connection with the one step in-store enrollment process.

Returning to FIG. 2B, if the customer presents the confirmation code (or other requested code and/or number), the method proceeds to 248 for confirmation of the confirmation code (or other requested code and/or number). Upon presentation the confirmation code or, in the alternative, either the unique extended identification code and/or a combination of the confirmation code and unique extended identification number, is compared to a corresponding list, for example, a list of confirmation codes maintained in memory as was described previously at 235 of FIG. 2C. If a match is identified, the method proceeds to 249 for further processing. If, however, no match is identified, the method proceeds to 205 (FIG. 2A) for issuance of an in-store rejection and subsequent processing in the manner previously set forth in connection with the one step in-store enrollment process.

Returning to FIG. 2B, if the confirmation code is accepted at 248, the method proceeds to 249 for determination as to whether the enrollment was initiated in-store or out-of-store. It is contemplated that the foregoing may be determined using a variety of techniques. For example, if enrollment was initiated out-of-store, the customer would have already provided the requested financial information. Conversely, if enrollment was initiated in-store, the customer would have not yet provided financial information. One manner of distinguishing the two would be to generate confirmation codes with the first digit being "0" if enrollment was initiated in-store or "1" if enrollment was initiated out-of-store. The foregoing is but one example of innumerable ways in which the two may be distinguished. Nor is use of the confirmation code the only way to distinguish between the two. For example, if the unique identification number does not have a PIN assigned thereto, enrollment may be designated as having initiated out-of-store where a prohibition exists to providing a PIN from an out-of-store source (e.g., via the Internet), for example due to security reasons. In an embodiment, the customer is simply prompted, for example via pinpad or by a question from an employee, as to whether enrollment was initiated in-store or out-of-store. If it is determined at 249 that the customer initiated enrollment in-store, the method proceeds to 250 for presentation of a check or other appropriate financial information for later use in completing ACH transactions as described with respect to 212 of FIG. 2A.

If it is determined at 250 that the customer does not have a check or other appropriate financial information, the method proceeds to 205 (FIG. 2A) for issuance of an in-store rejection and subsequent processing in the manner previously set forth in connection with the one step in-store enrollment process. If, however, it is determined at 250 that the customer has a check or appropriate financial information for presentation, the financial information is transmitted to the merchant in a manner similar to that previously described with respect to 212 of FIG. 2A and the method proceeds to 251. At 251, the financial information inscribed on the check or otherwise provided to the merchant is checked in a manner similar to that previously set forth with respect to 213 of FIG. 2A. If the provided financial information is not acceptable, the method may again proceed to 205 for issuance of an in-store rejection and subsequent processing in the manner previously set forth in connection with the one step in-store enrollment process. If, however, it is determined that the financial information is acceptable, the method proceeds to 218 (FIG. 2A) for further processing in the manner previously set forth in the one step in-store enrollment process, until the customer is either enrolled in the modified ACH payment processing program, enrolled in the linked loyalty program or enrollment of the customer is terminated by issuance of in-store and/or out-of-store rejections.

In the foregoing manner, the first step in-store/second step in-store process for enrolling a customer in either the modified ACH payment processing or linked loyalty program has been described. The foregoing process is particularly well-suited for customers who fail to remember to complete their enrollment using the telephone or PC but are reminded upon a subsequent visit to the merchant's store. The foregoing process is also well suited for those customers who do not have access to the PSTN or, more commonly, the Internet. Finally, the process is also well suited for those customers who are uncomfortable with providing confidential financial information over the Internet or other unsecured connection.

C-3 A First Step Out-of-Store/Second Step In-Store Enrollment Process

Unlike the foregoing processes, the first step out-of-store/second step in-store enrollment process set forth herein enables a merchant to initiate the enrollment of customers in either the modified ACH payment processing or linked loyalty programs without having the customers visit the store. By allowing enrollments to be initiated in this manner, the merchant is able to reach customers who would ordinarily dismiss efforts to enroll them during a visit to a store. Also, the merchant would be able to reach customers visiting their web site, for example, in search of coupons or other special offers. Finally, as customers are able to complete a number of the acts required for enrollment, the merchant may be able to more quickly process the enrollment of the customers during a subsequent visit to the store.

The first, out-of-store, portion of the enrollment method commences at 252 and proceeds to 232 where the customer remotely accesses the enrollment system operated by the merchant or payment program third party as described previously. For example, the customer may remotely access the enrollment system by directing a web browser to the web site operated by the merchant and indicate that enrollment in either the modified ACH payment processing program or linked loyalty program is desired. For example, the web site may include a page which includes a description of the programs and a link, typically, a graphical user interface (GUI) such as a button, which, upon selection by the customer, re-directs the customer to a new page where enrollment of the customer may be initiated. The method then continues to 233 for determination whether the customer had already begun enrollment in the program. For example, the customer may be presented with a new page which includes text inquiring whether they are a new applicant or had already begun the enrollment process and first and second GUIs, the first of which is to be selected if the customer had previously initiated enrollment and the second to be selected if the customer were a new applicant.

If the customer indicates that they have never initiated the process of enrolling in either the modified ACH payment processing or linked loyalty programs, the method proceeds to 253 by transporting the customer to a new page where the customer begins the enrollment process, typically by providing the merchant with basic identifying information such as name and address. The method then continues on to 254 where the customer provides the merchant with financial information, typically, the routing number of the financial institution maintains a checking account and the account number for the checking account. Further details as to the type of information which may be provided at 254 was previously set forth at 236 and need not be described in greater detail herein. After providing the appropriate financial information, the method proceeds to 255 where the merchant determines if the financial information provided by the customer is acceptable as was previously described with respect to 237 and need not be described in greater detail herein. Here, however, in the event that the financial information is unacceptable, the method proceeds to 241 for issuance of a remote rejection as described previously.

Typically, the remote rejection is comprised of a message indicating, to the customer, that they cannot accept the customer's application for enrollment. The message may also contain a reason for the rejection, for example, "unable to confirm banking information" or may be silent as to the reason for rejection. The message may also give contact information, for example, a telephone number which the customer may call, which the customer can contact to obtain more information regarding the rejection. Finally, if the reason for rejection is "resolvable", for example, the customer made a typing error when entering the routing number for the financial institution, the rejection may also give instructions on how to resolve the error. For example, if the customer made a typo when entering the routing number for the financial institution, the remote rejection may contain a message such as "bank unknown—please re-enter the routing number for your bank."

If the remote rejection of the customer cannot be resolved, the enrollment process may terminate at 241. If resolvable, however, the method would return to the prior action for which the failure to meet the requirements thereof resulted in the transfer to 241. For example, if the remote rejection issued at 241 indicated that the financial institution entered by the customer could not be identified and the customer responds by entering the correct routing number, the customer may be returned to 255 where the modified financial information is checked. Presuming that the basis for the remote rejection could not be resolved, it is also contemplated that, depending on the reason for issuance of the remote rejection, legal obligations may necessitate the issuance of what was previously termed as an "out-of-store" rejection. In this regard, it is noted that all of the remote rejections issued at 241 are technically "out-of-store" rejections. Accordingly, for purposes of distinguishing remote rejections from other types of out-of-store rejections, when referring to a remote rejection issued at 241, the term "out-of-store" rejection shall refer to written rejections mailed to the customer.

Upon determining at 255 that the provided financial information is acceptable, the method proceeds to 257, which is similar in substance to 224 of FIG. 2A. At 257, the applicant provides a unique identification code, for example, by entering their driver's license number, date of birth, or a combination of the two in a GUI provided by the merchant, typically, in the form of an answer box appearing next to a question appearing in written text on a next page of the web site. If the unique identification code is to be comprised of the combination of the driver's license number and the birth date of the customer, the two components of the unique identification code may be provided in response to separate questions or a single question requesting sequential entry of the two numbers information. At 258, the provided unique identification code is checked for uniqueness, which is similar in substance to 225 of FIG. 2A. As previously set forth, a determination of non-uniqueness typically results from the customer incorrectly entering their telephone number while, in rare circumstances, it may result from the use of the same telephone number by more than one person, e.g., roommates, or the reuse of telephone numbers by a telephony service provider.

If it is determined, at 258, that the provided code is non-unique, the method returns to 257 for entry of a new unique number. While not illustrated in FIG. 2C, if the provided unique identification code repeatedly fails the uniqueness test, the method may proceed to 241 for issuance of a remote rejection (likewise for the uniqueness check at 225). Here, however, the rejection may identify that there is a problem with the provided unique identification code and asking that the customer call a specified number for assistance in resolving the problem. If, however, the uniqueness of the provided unique identification code is confirmed at 258, the method proceeds to 259 and 260 for payment and identification verification, respectively. As the payment verification executed at 259 and the identification verification executed at 260 are similar to those previously set forth with respect to 239 and 240, further details as to these processes need not be repeated, except for noting that a failure to pass either the payment verification or the identification verification may result in the issuance of a remote rejection at 241. Upon passing both the payment and identification verifications at 259 and 260, respectively, the method may proceed to 261 where the customer is advised that the out-of-store portion of the enrollment process is complete and that the customer may go to a store operated by the merchant to complete enrollment. The payment verification and identification verification performed at 259 and 260, respectively, may differ form the payment verification and identification verification performed at 238 and 239, respectively, depending on the amount of information, on the customer, available for use during the verification.

As previously set forth, upon completing the first, out-of-store, portion of the enrollment process at 261, the customer receives instructions that the enrollment process may be completed at the POS of any store operated by the merchant offering the modified ACH payment processing or linked loyalty programs. In conjunction with 261, the customer receives instructions on how to complete enrollment, similar to 231 of FIG. 2A, which may include a confirmation code similar to 227 of FIG. 2A. The method 200 would then proceed to 202 (FIG. 2A) for completion of the second in-store portion of the enrollment process, again, for example, at the POS. At 202, it is determined whether the customer is a new applicant or a pending applicant for enrollment in the modified ACH payment processing or linked loyalty programs. For example, the customer may identify himself or herself as a pending applicant to the cashier. Conversely, the cashier may learn of the customer's status during their initial inquiry as to whether enrollment is desired.

Upon identification of the customer as a pending applicant at 202, the method proceeds to 245 (FIG. 2B) for completion of the second, in-store, portion of the enrollment process, e.g., 245-251 of FIG. 2B. The process for completing enrollment of a customer in either the modified ACH payment processing or linked loyalty programs are similar from 245-248 regardless of whether the first portion of the enrollment process is conducted in-store or out-of-store. Thus, functions at 245-248 of the second, in-store, portion of the two step out-of-store/in-store enrollment process is similar to the second, in-store, portion of the two step in-store/in-store enrollment process hereinabove described. As a result, further description of the second, in-store, step of the two step out-of-store/in-store enrollment process at 245-248 is unnecessary. At 249, a determination is made as to whether the enrollment was initiated in-store or out-of-store as described previously. If it is determined at 249 that the customer initiated enrollment out-of-store, the method proceeds to 217 of FIG. 2A for selection of a PIN and subsequent processing as previously described. Typically, it is preferred that the PIN be provided in-store. However, in an alternative embodiment, the PIN may be selected as part of the out-of-store enrollment process described in 253 et seq. of FIG. 2C, in which case the method proceeds from 249 of FIG. 2B to 218 of 2A for verification of terms and conditions and subsequent processing as previously described.

C-4 An Out-of-Store Enrollment Process (One Step or Two Step Enrollment)

Unlike the foregoing processes, the out-of-store enrollment process set forth herein enables a merchant to initiate the enrollment of customers in either the modified ACH payment processing or linked loyalty programs without having the customers visit the store. By allowing enrollments to be initiated and completed in this manner, the merchant is able to reach customers who would ordinarily dismiss efforts to enroll them during a visit to a store. Also, the merchant would be able to reach customers visiting their web site, for example, in search of coupons or other special offers. Finally, as customers are able to complete the acts required for enrollment, the merchant may be able to more quickly process the enrollment of the customers without using up time and resources in the store to perform enrollment.

The out-of-store enrollment method commences at 252 and proceeds to 232 where the customer remotely accesses the enrollment system operated by the merchant as described previously. For example, the customer may remotely access the enrollment system by directing a web browser to the web site operated by the merchant or the payment program third party and indicate that enrollment in either the modified ACH payment processing program or linked loyalty program is desired. For example, the web site may include a page which includes a description of the programs and a link, typically, a graphical user interface (GUI) such as a button, which, upon selection by the customer, re-directs the customer to a new page where enrollment of the customer may be initiated (such as the illustrative screen shot shown in FIG. 2D). The method then continues to 233 for determination whether the customer had already begun enrollment in the program. For example, the customer may be presented with a new page which includes text inquiring whether they are a new applicant or had already begun the enrollment process and first and second GUIs, the first of which is to be selected if the customer had previously initiated enrollment and the second to be selected if the customer were a new applicant.

Figure 2E:
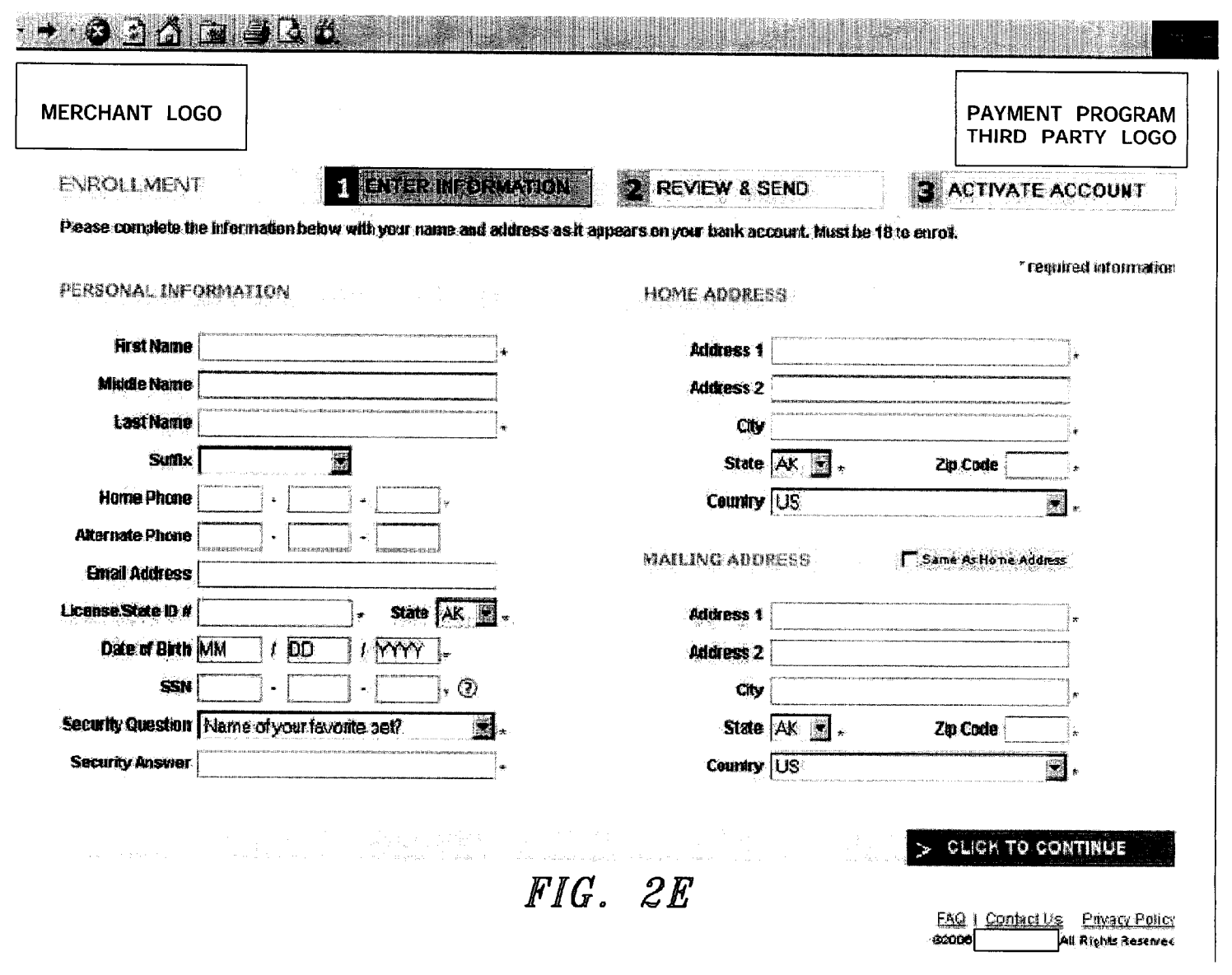
Figure 2F:
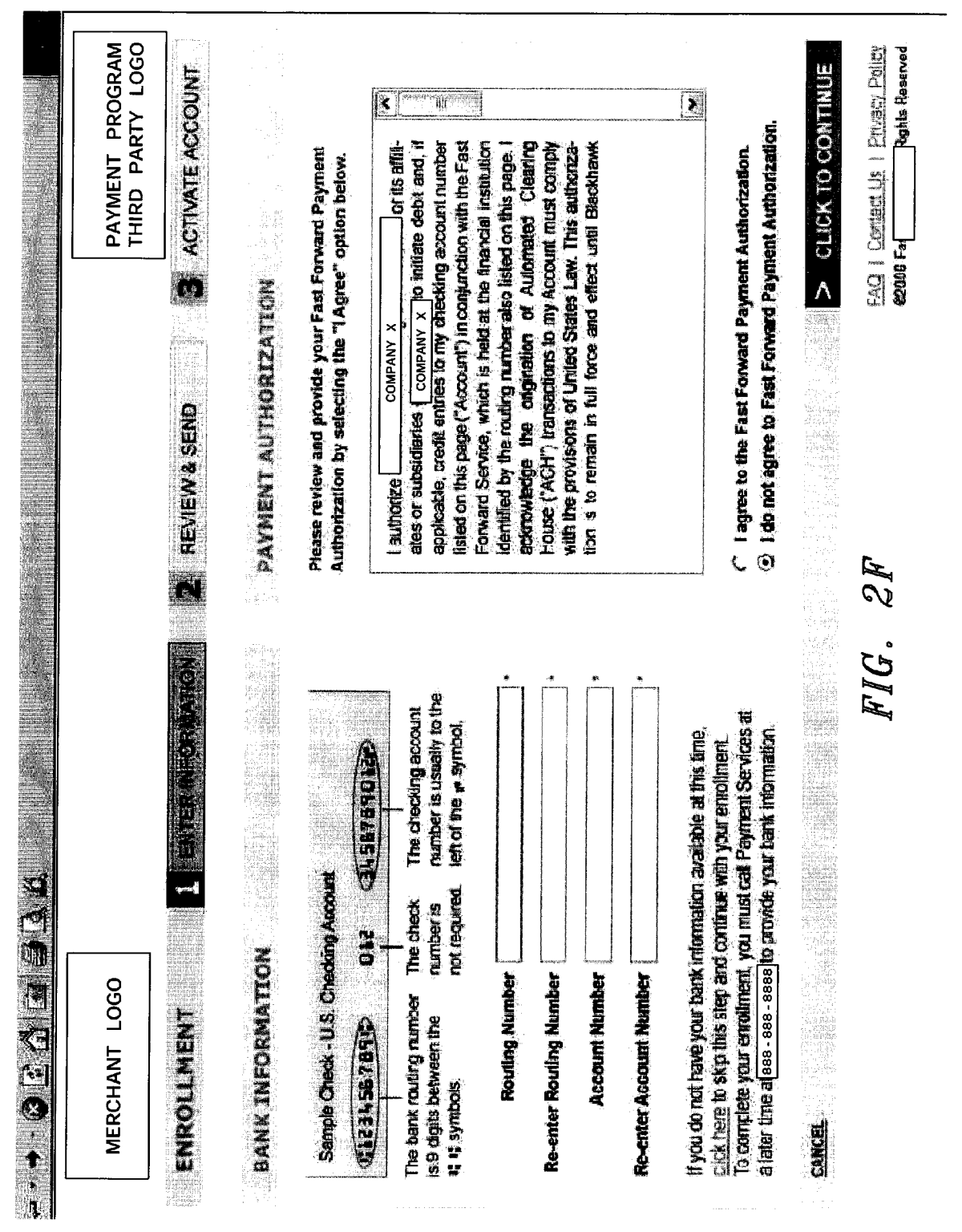
Figure 2G:
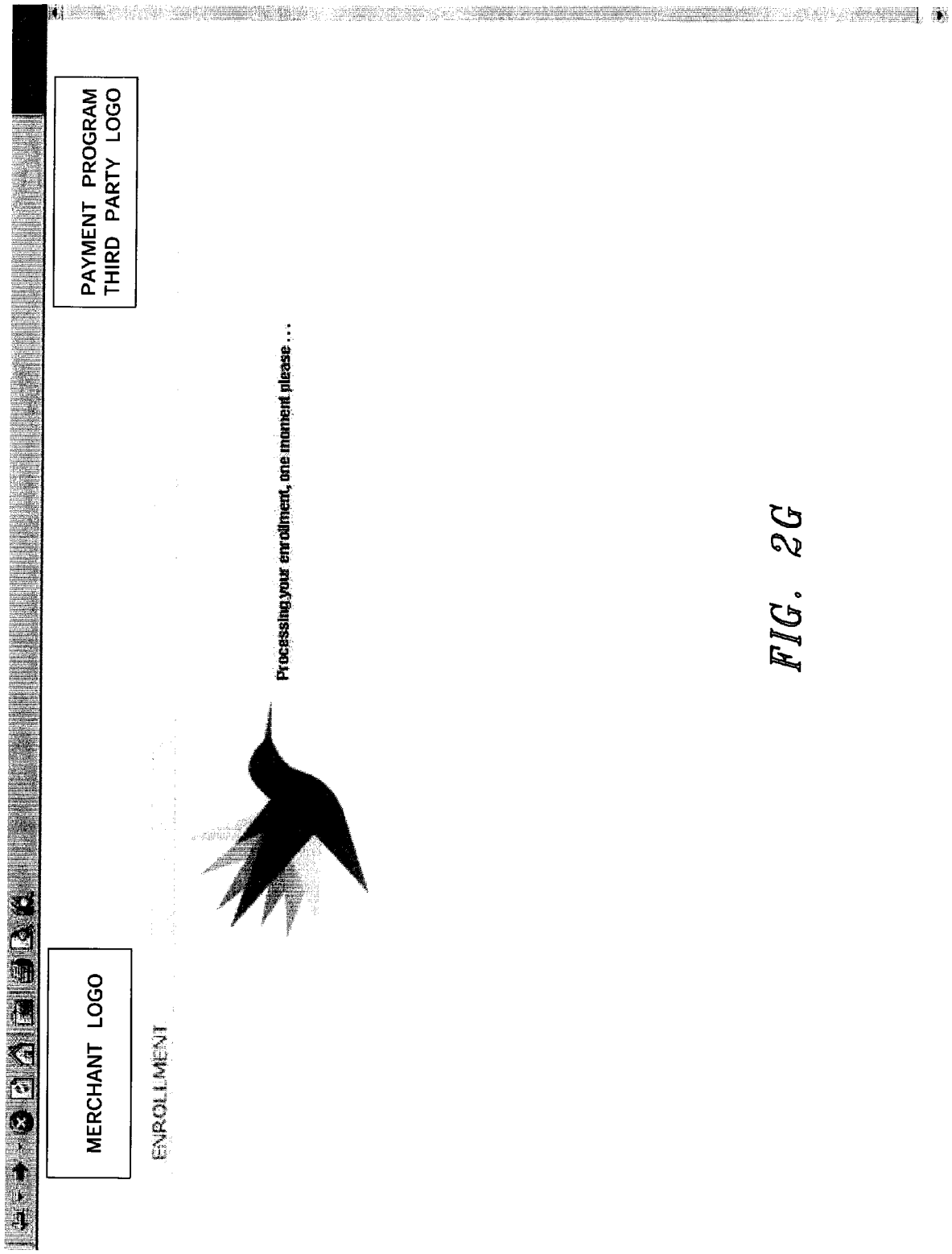
FIG. 2G is an illustrative screen shot of a web enrollment interface for display during verification in the process of enrollment in either the modified ACH payment processing or linked loyalty program.
Figure 2H:
FIG. 2H is an illustrative screen shot of a web enrollment interface for confirming customer information for enrollment in either the modified ACH payment processing or linked loyalty program.

If the customer indicates that they have never initiated the process of enrolling in either the modified ACH payment processing or linked loyalty programs, the method proceeds to 253 by transporting the customer to a new page where the customer begins the enrollment process, typically by providing the merchant with basic identifying information such as name and address (as shown in FIG. 2E). The method then continues on to 254 where the customer provides the merchant with financial information, typically, the routing number of the financial institution maintains a checking account and the account number for the checking account (as shown in FIG. 2F), and solicits authorization from the customer to permit the merchant or payment program third party to debit the account noted. Further details as to the type of information which may be provided at 254 was previously set forth at 236 and need not be described in greater detail herein. The customer may optionally be provided an opportunity to review and confirm all entered information, as shown in FIG. 2H. After providing the appropriate financial information, the method proceeds to 255 where the merchant determines if the financial information provided by the customer is acceptable as was previously described with respect to 237 and need not be described in greater detail herein. During the determination by the merchant, a view may be displayed to the customer indicating that the information is being processed for enrollment, as shown in FIG. 2G. In the event that the financial information is unacceptable, the method proceeds to 241 for issuance of a remote rejection as described previously.

Typically, the remote rejection is comprised of a message indicating, to the customer, that they cannot accept the customer's application for enrollment. The message may also contain a reason for the rejection, for example, "unable to confirm banking information" or may be silent as to the reason for rejection. The message may also give contact information, for example, a telephone number which the customer may call, which the customer can contact to obtain more information regarding the rejection. Finally, if the reason for rejection is "resolvable", for example, the customer made a typing error when entering the routing number for the financial institution, the rejection may also give instructions on how to resolve the error. For example, if the customer made a typo when entering the routing number for the financial institution, the remote rejection may contain a message such as "bank unknown please re-enter the routing number for your bank."

If the remote rejection of the customer cannot be resolved, the enrollment process may terminate at 241. If resolvable, however, the method would return to the prior action for which the failure to meet the requirements thereof resulted in the transfer to 241. For example, if the remote rejection issued at 241 indicated that the financial institution entered by the customer could not be identified and the customer responds by entering the correct routing number, the customer may be returned to 255 where the modified financial information is checked. Presuming that the basis for the remote rejection could not be resolved, it is also contemplated that, depending on the reason for issuance of the remote rejection, legal obligations may necessitate the issuance of what was previously termed as an "out-of-store" rejection. In this regard, it is noted that all of the remote rejections issued at 241 are technically "out-of-store" rejections. Accordingly, for purposes of distinguishing remote rejections from other types of out-of-store rejections, when referring to a remote rejection issued at 241, the term "out-of-store" rejection shall refer to written rejections mailed to the customer.

Upon determining at 255 that the provided financial information is acceptable, the method proceeds to 257, which is similar in substance to 224 of FIG. 2A. At 257, the applicant provides a unique identification code, for example, by entering their driver's license number, date of birth, a telephone number, or a combination of these in a GUI provided by the merchant, typically, in the form of an answer box appearing next to a question appearing in written text on a next page of the web site. An illustrative web GUI for this purpose is shown in FIG. 2I. If the unique identification code is to be comprised of the combination of the driver's license number and the birth date of the customer, the two components of the unique identification code may be provided in response to separate questions or a single question requesting sequential entry of the two numbers information. At 258, the provided unique identification code is checked for uniqueness, which is similar in substance to 225 of FIG. 2A. As previously set forth, a determination of non-uniqueness typically results from the customer incorrectly entering their telephone number while, in rare circumstances, it may result from the use of the same telephone number by more than one person, e.g., roommates, or the reuse of telephone numbers by a telephony service provider.

If it is determined, at 258, that the provided code is non-unique, the method returns to 257 for entry of a new unique number. While not illustrated in FIG. 2C, if the provided unique identification code repeatedly fails the uniqueness test, the method may proceed to 241 for issuance of a remote rejection (likewise for the uniqueness check at 225). Here, however, the rejection may identify that there is a problem with the provided unique identification code and asking that the customer call a specified number for assistance in resolving the problem. If, however, the uniqueness of the provided unique identification code is confirmed at 258, the method proceeds to 259 and 260 for payment and identification verification, respectively. As the payment verification executed at 259 and the identification verification executed at 260 are similar to those previously set forth with respect to 239 and 240, further details as to these processes need not be repeated, except for noting that a failure to pass either the payment verification or the identification verification may result in the issuance of a remote rejection at 241. The payment verification and identification verification performed at 259 and 260, respectively, may differ from the payment verification and identification verification performed at 238 and 239, respectively, depending on the amount of information, on the customer, available for use during the verification.

Figure 2J:
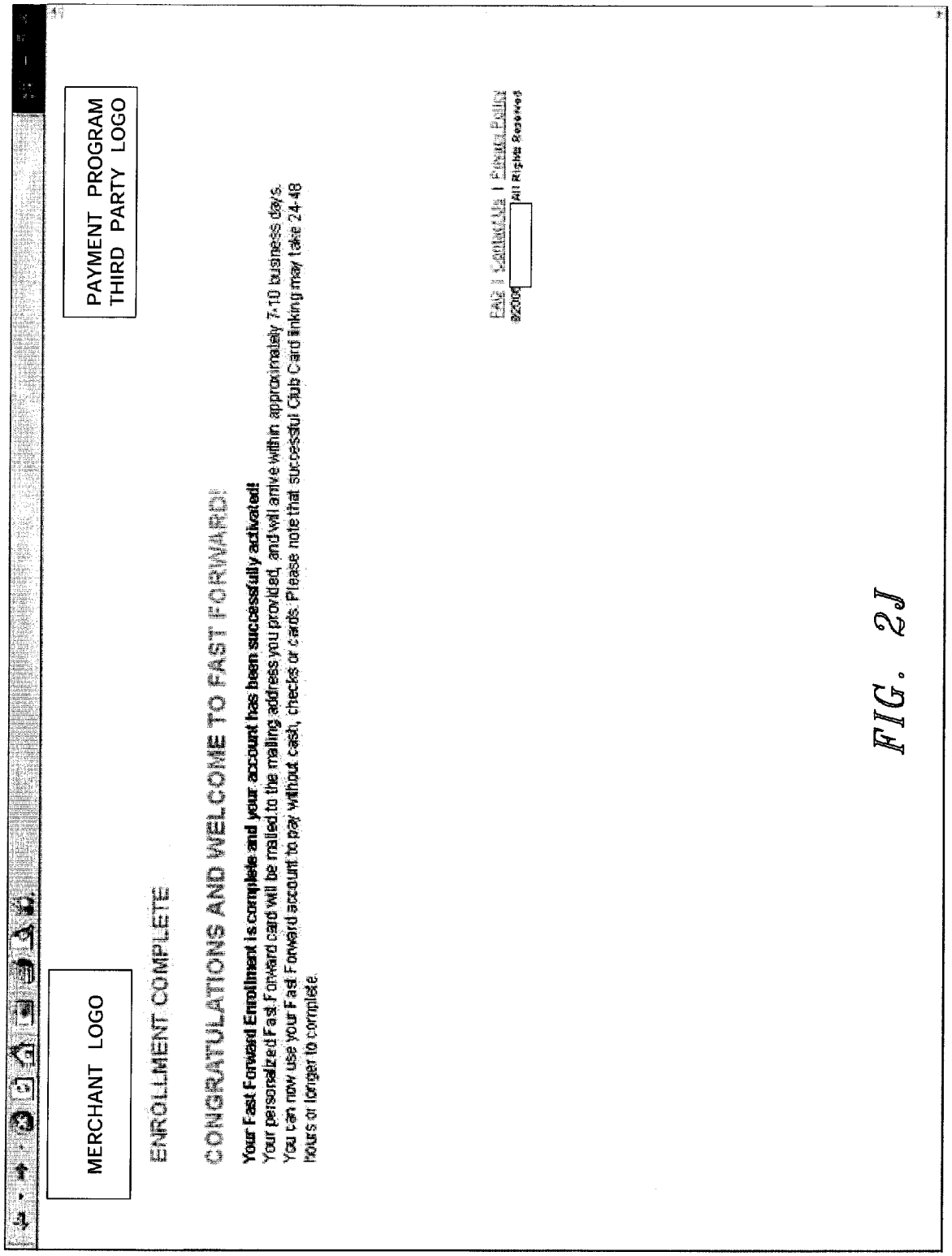
FIG. 2J is an illustrative screen shot of a web enrollment interface for announcing and confirming successful enrollment in either the modified ACH payment processing or linked loyalty program.

The process for finalizing enrollment of a customer in either the modified ACH payment processing or linked loyalty programs are similar from 245-248 regardless of whether the enrollment process is conducted in-store or out-of-store. Thus, functions at 245-248 of the out-of store enrollment process is similar to the second, in-store, portion of the two step in-store/in-store enrollment process hereinabove described, though carried out out-of-store. The method proceeds to 217 of FIG. 2A for selection of a PIN and subsequent processing as previously described. The PIN may be selected as part of the out-of-store enrollment process described in 253 et seq. of FIG. 2C, in which case the method proceeds from 249 of FIG. 2B to 218 of 2A for verification of terms and conditions and subsequent processing as previously described. Upon completion of the enrollment process, the customer may have a enrollment completion view displayed, such as that shown in FIG. 2J, after which the customer may use the unique identification code to pay for goods or services.

D. A Method for Presentation and Acceptance of Terms and Conditions in A Modified ACH Payment Processing or Linked Loyalty Program In each of FIGS. 1 and 2A-C, reference was made as to whether the customer enrolling in a card-free or card-based program offered by a merchant, such as, but not limited to, ACH payment programs, loyalty programs and linked loyalty programs, has satisfied a terms and conditions requirement which must be met in order for enrollment of the customer in the program to be completed. Terms and conditions may additionally include agreement to a privacy policy in various embodiments. The method by which the customer meets or fails to meet the terms and conditions requirement shall now be described with reference to FIG. 3.

Figure 3:
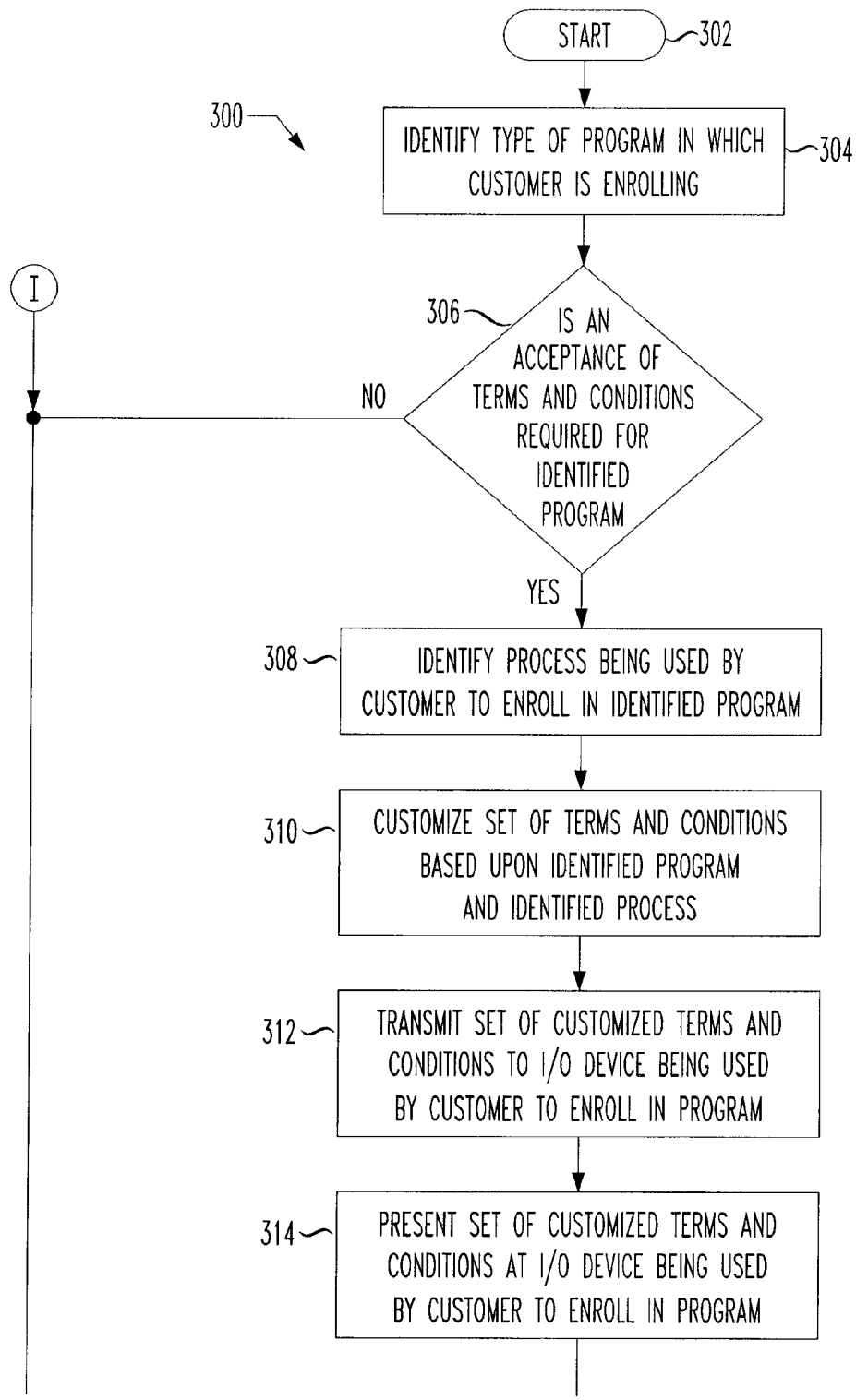
FIG. 3 is a flow chart of a method for determining whether a customer, enrolling in an ACH payment or linked loyalty program in accordance with the method of FIG. 1 or FIGS. 2A-C has met a terms and conditions requirement for enrolling in that program.
Figure 3:
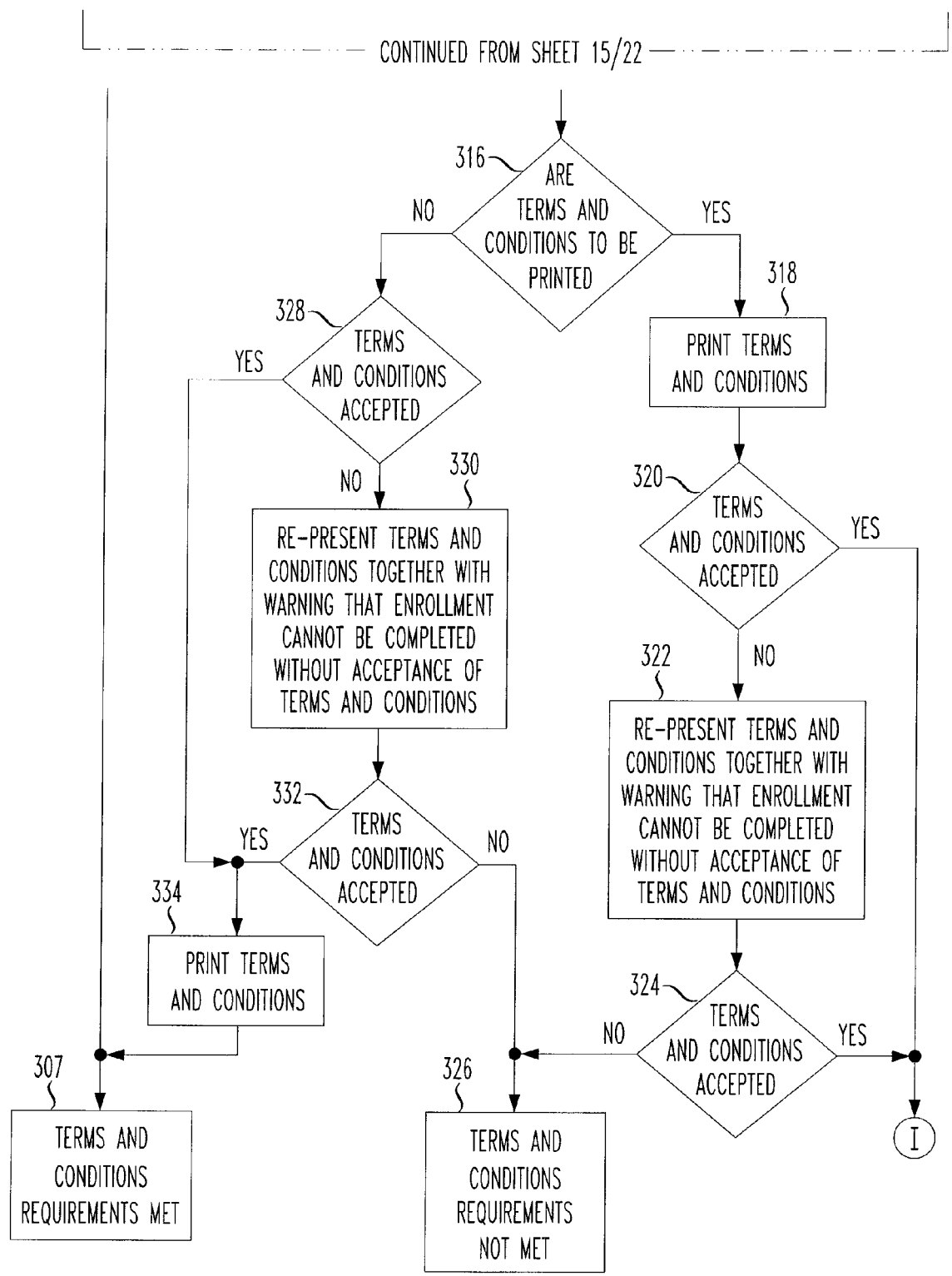

At various stages of the methods 100, 200 of enrolling customers in card-free or card-based programs offered by a merchant, such as, but not limited to modified ACH payment processing programs, loyalty programs and linked loyalty programs, the methods 100, 200 each made inquiry as to whether or not the customer seeking enrollment in the program had met the terms and conditions requirement established as a prerequisite for enrollment in the program. More specifically, such an inquiry was made at 116 of the method 100 and at 218 and 238 of the method 200. Referring now to FIG. 3, a method 300 by which it is determined whether the customer has met the terms and conditions requirements for enrollment in the program will now be described in greater detail.

The method 300 commences at 302 and, at 304, the type of program in which the customer is enrolling is identified. For example, the system may include, in memory or other storage source, a list of programs offered by the merchant. It is contemplated that the various programs offered by the merchant may have different terms and conditions and, on occasion, may not require any terms and conditions at all. For example, programs which incorporate financial transactions, for example, the modified ACH payment processing or linked loyalty programs may typically require detailed terms and conditions while other programs, for example, loyalty programs may require terms and conditions of less detail or perhaps no terms and conditions of use at all.

Continuing on to 306, the method 300 determines if the identified program requires the acceptance of terms and conditions in order to complete enrollment therein. If the identified program does not require the acceptance of terms and conditions, the method 300 proceeds to 307 where it is determined that the terms and conditions requirement has been met, a result which, in turn, may be used during the enrollment methods 100 and 200 illustrated in FIGS. 1 and 2A-C, respectively. If, however, it is determined at 306 that the identified program is a program that requires the acceptance of terms and conditions in order to complete enrollment, the method 300 may then proceed to 308 where the process being used by the customer to enroll in the identified program is itself identified. In the examples described herein, three processes were employed during the enrollment process—an in-store POS process, an in-store kiosk PC process; an out-of-store PC process and an out-of-store telephone process. In the examples described herein, the programs offered by the merchant uniformly required the acceptance of certain terms and conditions. However, acceptance of terms and conditions need not be a requirement for enrollment in the identified program as noted previously. Also, the disclosed examples uniformly required at least one portion of enrollment be completed in-store but permitted at least one portion of enrollment to be completed out-of store. However, it is fully contemplated that enrollment may be completed out-of-store. Finally, while some embodiments disclosed that satisfaction of the terms and conditions requirement was completed in-store, it is again contemplated that the terms and conditions requirement may be satisfied out-of-store, for example via an out-of-store PC process such as via an Internet-based application.

After identifying the process being used by the customer to enroll in the identified program, the method 300 proceeds to 310 for customization of a set of terms and conditions (and/or privacy policy) based upon the identified program and the identified process used to enroll the customer in the identified program. At 312, the set of customized terms and conditions are transmitted to the I/O device being used by the customer to enroll in the identified program and, at 314, the set of customized terms and conditions are presented to the customer at the I/O device being used by the customer to enroll in the identified program. For example, in the modified ACH payment processing and linked loyalty programs hereinabove described with respect to FIGS. 2A-C, the set of terms and conditions are transmitted from the system which controls participation in the programs to the pinpad located at the POS where the customized terms are presented to the customer enrolling in the program at 218. Alternatively, the set of terms and conditions are transmitted from the system which controls participation in the programs to the user interface, e.g., PC, where the customized terms are presented to the customer enrolling in the program at 238. Continuing on to 316, the method 300 determines the manner by which the terms and conditions are to be presented to the customer. It is contemplated that the terms and conditions may be presented to the customer in the form of a hard copy, as a visible image, or both. If a hard copy of the terms and conditions are to be presented, the method 300 proceeds to 318 where the printed terms and conditions are printed out. For example, the pinpad may have a printing component configured to dispense a printed copy of the terms and conditions, for example via a receipt printer located at the POS. If desired, the printed terms and conditions may appear on a display portion of the pinpad generally simultaneously with the printing thereof. Alternatively, the terms and conditions may be printed via a printer attached to the user interface, e.g., PC, at 238.

Continuing from 318 on to 320, the customer may then review the terms and conditions and, if acceptable, may accept the terms and conditions by depressing a first GUI, typically, in the form of a button, generated on the display portion of the pinpad or PC, with the word "YES" appearing thereon. If, however, the customer declines the presented terms and conditions, whether by depressing a second GUI, as before, typically in the form of a button, generated on the display portion of the pinpad or PC, with the word "NO" appearing thereon, or by failing to make a selection within a predetermined time period, the method 300 proceeds to 322 for "re-presentation" of the terms and conditions. While a re-presentation of the terms and conditions for which acceptance is required may or may not involve the re-printing and or re-displaying of the actual terms and conditions, a representation of the terms and conditions does include the clearing of the customer's prior rejection of the terms and conditions (if appropriate) or the re-set of the time period in which acceptance of the terms and conditions is required (again, if appropriate) and which had previously expired without the customer making a selection. Re-presentation does include the system generating a warning, typically, on the display portion of the pinpad, that enrollment in the modified ACH payment processing or linked loyalty programs cannot be completed without acceptance of the printed terms and conditions that have been presented to the customer. The method then proceeds to 324 where the customer may have a second opportunity to decide whether they wish to explicitly accept the presented terms or conditions, again, for example, by depressing the first GUI appearing in the form of a button having the word "YES" appearing thereon, explicitly reject the presented terms and conditions, again, for example, by depressing the second GUI appearing in the form of a button having the word "NO" appearing thereon or implicitly reject the presented terms and conditions, again, for example, by declining to make a selection within a pre-determined time period. If, at 324, the terms and conditions are either explicitly or implicitly rejected, the method 300 proceeds to 326 where, based upon the explicit or implicit rejection at 324, it is determined that the terms and conditions requirements have not been met, a result which, in turn, may be used during the enrollment methods 100 and 200 illustrated in FIGS. 1 and 2A-C, respectively.

Returning now to 316, if it determined that the terms and conditions are not to be printed at the pinpad or other I/O device such as a PC being used by the customer to enroll in the identified program, the method 300 may instead proceed to 328 for electronic presentation of the terms and conditions, typically, by generating the terms and conditions on a display portion of the pinpad or other I/O device such as a PC being used to enroll in the identified program. The customer may the review the terms and conditions appearing on the display portion of the pinpad or PC and, if desired, may elect to accept the terms and conditions by depressing the first GUI, typically, in the form of a button, generated on the display portion of the pinpad or PC, with the word "YES" appearing thereon. If, however, the customer declines the presented terms and conditions, whether by depressing a second GUI, as before, typically in the form of a button, generated on the display portion of the pinpad or PC, with the word "NO" appearing thereon, or by failing to make a selection within a predetermined time period, the method 300 proceeds to 330 for "re-presentation" of the terms and conditions, again, using one or more screens of the display portion of the pinpad or PC. As before with 322, a re-presentation of the terms and conditions requires the clearing of the customer's prior rejection of the terms and conditions (if appropriate) or the re-set of the time period in which acceptance of the terms and conditions is required (again, if appropriate) and which had previously expired without the customer making a selection. Re-presentation also include the system generating a warning, typically, on the display portion of the pinpad or PC, that enrollment in the modified ACH payment processing or linked loyalty programs cannot be completed without acceptance of the terms and conditions that have been presented electronically to the customer. The method then proceeds to 332 where the customer may have a second opportunity to indicate whether they wish to explicitly accept the presented terms or conditions, again, for example, by depressing the first GUI appearing in the form of a button having the word "YES" appearing thereon, explicitly reject the presented terms and conditions, again, for example, by depressing the second GUI appearing in the form of a button having the word "NO" appearing thereon or implicitly reject the presented terms and conditions, again, for example, by declining to make a selection within a pre-determined time period.

If, at 332, the terms and conditions are either explicitly or implicitly rejected, the method 300 again proceeds to 326 where, based upon the explicit or implicit rejection at 332, it is determined that the terms and conditions requirements have not been met, a result which, in turn, may be used during the enrollment methods 100 and 200 illustrated in FIGS. 1 and 2A-C, respectively. If, however, the terms and conditions required for enrollment in either the modified ACH payment processing or linked loyalty programs are accepted at either 328 or 332, the method 300 proceeds to 334 where the, now accepted, terms and conditions are printed out for subsequent use by the customer. The method 330 may then continue to 307 where, based upon the explicit acceptance of the terms and conditions at 328 or, in the alternative, based upon the explicit acceptance of the terms and conditions at 332, it is determined that the terms and conditions requirement has been met, a result which, in turn, may be used during the enrollment methods 100 and 200 illustrated in FIGS. 1 and 2A-C, respectively.

E. A Card-Free Payment Process Suitable for Use in Financial Transactions

Figure 4A:
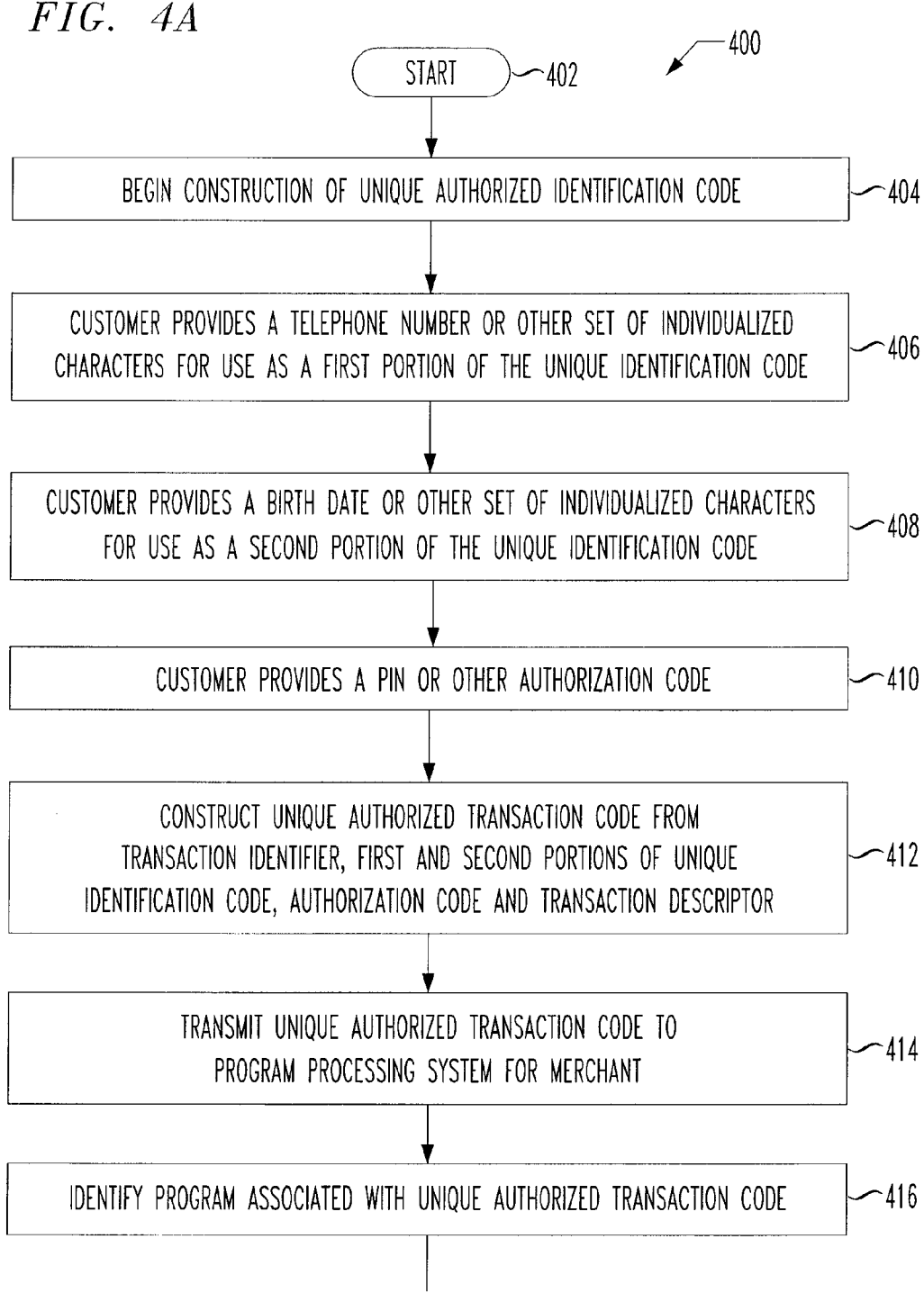
FIG. 4A is a flow chart of a method for card-free payment for goods or services suitable for use in POS transactions.
Figure 4A:
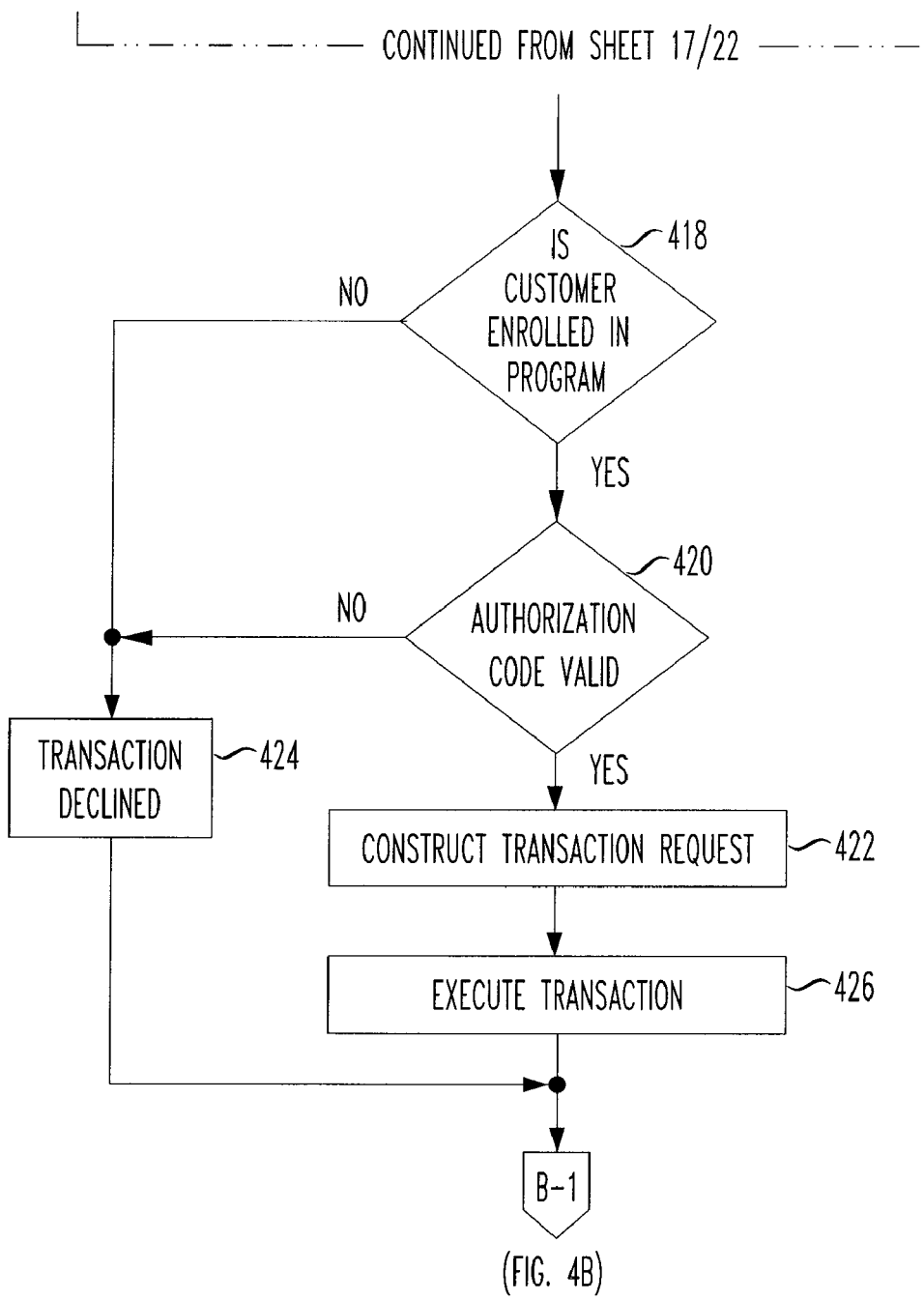

FIG. 4 illustrates a method 400 by which a customer, previously enrolled in either the modified ACH payment processing program or linked loyalty program in accordance with the method 100 illustrated in FIG. 1 or the method 200 illustrated in FIG. 2, may use a unique identification code to complete a transaction, for example, a purchase of goods from a merchant. Briefly, and in accordance with the method 400, the customer is able to access a financial resource, most commonly a checking account maintained on behalf of the customer by a financial institution, using an identification code unique to the customer and known only by the customer and the merchant or payment program third party. By doing so, the customer may use the ACH payment processing system to complete a transaction, for example, the purchase of goods from the merchant, without access to a check, debit card or any other type of instrument traditionally used to access a bank account. In that the customer may make a purchase without physical possession of cash, checks, debit/credit cards or other type of financial instrument or physical tender, the customer is afforded considerably more flexibility when needing to access their financial resources. For example, a customer would no longer be obligated to carry cash, a checkbook, debit/credit cards or the like when patronizing a store operated by the merchant.

The method 400 commences at 402 where a cashier or other representative of a merchant requests payment for goods being purchased by a customer. In response, the customer indicates, also as part of 402, that they wish to pay using the card-free payment program offered by the merchant in which they had previously enrolled. The customer may indicate the desired method of payment by stating their intention or by depressing a selected key on a pinpad located at the POS, commonly used by customers to indicate the form of payment to be tendered. Upon indicating that they intend to tender payment using the card-free payment program in which they had previously enrolled, the customer may now provide the cashier with the information necessary for the cashier to initiate an ACH transaction similar to that used when a customer presents a check or debit card for payment.

The method 400 proceeds, in sequence, to 406, 408 and 410. In each of these steps, the customer provides one component of the unique identification code. As previously set forth, one configuration of the unique identification code is constructed of three components—the customer's telephone number, the customer's birth date and a PIN. While it is contemplated that the customer may simply say the unique identification code and the cashier uses the provided information to initiate an ACH transaction, such a process is preferably discouraged because of the absence of security. Similarly, it is contemplated that the customer may provide the unique identification code to the cashier by answering a series of questions, the answer to each of which is one component of the unique identification code. Again, the foregoing process is not preferable because of the absence of security. A similar process which is somewhat more secure but still discouraged involves the customer answering a pair of questions asked by the cashier immediately followed by use of the pinpad.

For security purposes, it is preferred that the customer enter the unique identification code using the pinpad or other data I/O device located at the POS. For example, after depressing a button indicating that the customer intends to pay using the card-free payment program (or upon the cashier activating the pinpad for payment using the card-free payment program), the customer enters the unique identification code required for the cashier to initiate an ACH transaction. It is contemplated that the customer may simply enter the entire unique identification code (in the disclosed embodiment, an eighteen or nineteen digit number) in response to a request in the display portion of the pinpad for entry of the unique identification number. Or, as illustrated in FIG. 4A, the customer may simply reply to each one of a series of queries (the first being "please enter your telephone number", the second being "please enter the month and day of your birth date" and the third being "please enter your security code"), with the answer to each of which being one component of the unique identification code of the customer.

Upon entry of the components of the unique identification code, the method 400 proceeds to 410 where a unique authorized transaction code is constructed from a transaction identifier, the unique identification code and a transaction descriptor. While it is contemplated that various devices may construct the unique authorization transaction code, in most cases, the POS constructs the unique authorized transaction code from a combination of the data entered by the cashier, typically, the type and amount of the transaction and the unique identification code provided by the customer. The transaction identifier is a code which identifies the type of transaction being conducted. While the transaction identifier may vary depending on the type of transaction being conducted, here the transaction identifier would identify the transaction as a card-free payment. The transaction descriptor, on the other hand, would describe the transaction itself. While the transaction descriptor may also vary depending on the type of transaction being conducted, for a card-free payment, the transaction descriptor may be comprised of a single field containing the amount of the purchase requested by the customer.

At 414, the unique authorized transaction code is transmitted to a computer system for execution of the transaction defined by the unique authorized transaction code. The computer system may be the POS itself, a local server tied to each POS at the store where the purchase is being made or a main server, tied to each local server, and installed at a remotely located control center. Uniquely, and as will be more fully set forth with respect to FIG. 5, below, in addition to executing financial transactions, the computer system also controls operation of the various programs offered by the merchant, including the loyalty program, the card-free payment program (including both the modified ACH payment processing program and the linked loyalty program) and any other program offered by the merchant. Continuing on to 416, the transaction processing system identifies the type of transaction associated with the unique authorized transaction code. For example, the computer system may check the contents of the first field (which, as previously set forth, contains the transaction identifier for the transaction) of the unique authorized transaction code received thereby to a list of transaction types maintained in memory. By matching the received transaction identifier to one of the transaction types listed in memory, the computer system identifies the received authorized transaction code as corresponding to a particular type of transaction. In the foregoing example, the aforementioned comparison would result in the computer system determining that the received authorized transaction code corresponds to a card-free payment.

Upon identifying the transaction defined by the unique authorized transaction code as being a card-free payment transaction, the method 400 proceeds to 418 for determination as to whether the customer who provided the unique identification code to the POS is enrolled in a card-free payment program offered by the merchant. In the example set forth herein, the card-free payment programs offered by the merchant are the modified ACH payment processing program and the linked loyalty program. It is fully contemplated that the card-free payment program may also encompass programs other than those specifically recited herein. To determine whether the customer is enrolled in one of the card-free programs offered by the merchant, the computer system checks the identity of the customer against a list of enrollees in the card-free programs. To do so, the computer system maintains, in memory, a list of participants in the card-free programs. In the present embodiment, each participant is identified by the first and second components of the unique identification code which, as previously set forth, respectively form the second and third fields of the received authorized transaction code. If the second and third fields of the authorized transaction code match the identity of one of the participants in the card-free payment program, the method 400 proceeds to 420 for further processing. If, on the other hand, the second and third fields of the unique authorized transaction code fail to match the identity of one of the participants in the card-free payment program, the method 400 may instead proceed to 424 where the computer system declines the requested transaction. The computer system may then forward a transaction rejection message to the POS which, in turn, generates a message on the display portion of the pinpad indicating that the transaction has been declined.

Returning to 418, upon confirming that the customer requesting execution of a card-free payment transaction is enrolled in a card-free program, the method proceeds to 420 for determination as to whether the received authorized transaction code is valid. To do so, the computer system further maintains, in memory, a list of authentication codes for the participants in the card-free payment program. The authentication code for a participant is the PIN which, as previously set forth, forms the third component of the unique identification code for a participant in the card-free payment program. Each PIN is linked to an enrollee so that, upon identification of an enrollee, the computer system can retrieve the PIN corresponding to that enrollee. In accordance with the embodiment in which the PIN is unique for each customer, there is no need for linking each PIN to a corresponding one of the customers enrolled in the card-free program. Using the link between enrollees and authentication codes, the computer system identifies the authentication code corresponding to an enrollee. The computer system may then compare the PIN for the enrollee identified in 418 to the contents of the fourth field of the received authorized transaction code. If the contents of the fourth field of the received authorized transaction code fail to match the PIN of the identified customer, the method 400 proceeds to 424 for rejection of the transaction in the manner previously set forth. If, however, the PIN retrieved from memory matches the fourth field of the received authorized transaction code, the requested transaction is authorized and the method 400 proceeds to 422 for further processing.

Continuing on to 422, the computer system proceeds to construct the transaction request from the transaction descriptor contained in the authorized transaction code and the customer information contained in the participation information for the customer requesting execution of the transaction. At 422, the computer system constructs a transaction request from the message using information maintained in the memory and the transaction descriptor, here, the fifth field of the authorized transaction code containing the amount of the purchase sought to be completed by the customer. More specifically, the transaction request is constructed from the participation information maintained in the memory for each of the customers enrolled in a program offered by a merchant. For example, in a modified ACH payment processing program, the participation information for a participant in the payment program is comprised of the routing number of the bank or other financial institution with which the financial transaction is to be conducted and the account number for an account maintained at the identified financial institution on behalf of the participant. The participation information for each customer enrolled in the payment program is linked to the access information (e.g., the unique identification code) for the customer enrolled in the payment program. Accordingly, upon confirming that a customer is a participant in the payment program and authorizing the requested transaction, the computer system may then access the participation information necessary to construct a transaction request needed, together with the transaction descriptor, to issue a transaction request.

At 422, the computer system executes the transaction identified in the first field of the received transaction code, for example, a card-free payment processing program such as the modified ACH payment processing program. For example, if the requested transaction was a modified ACH payment processing transaction to be used by the customer to pay for a purchase at the POS, the computer system would construct a transaction request which includes the financial institution where the customer maintains an account, the number of that account and the amount to be debited from that account. The computer system would then indicate to the POS that the transaction has been completed such that the customer may exit the POS and the POS system may be reset to begin at 402 for processing another card-free payment transaction. Once the transaction information is captured by the computing system, e.g. a store LAN or merchant-wide WAN, the POS terminal is freed to process another transaction while the remainder of steps required to receive payment for a previous transaction may be carried out as follows.

Figure 5A:
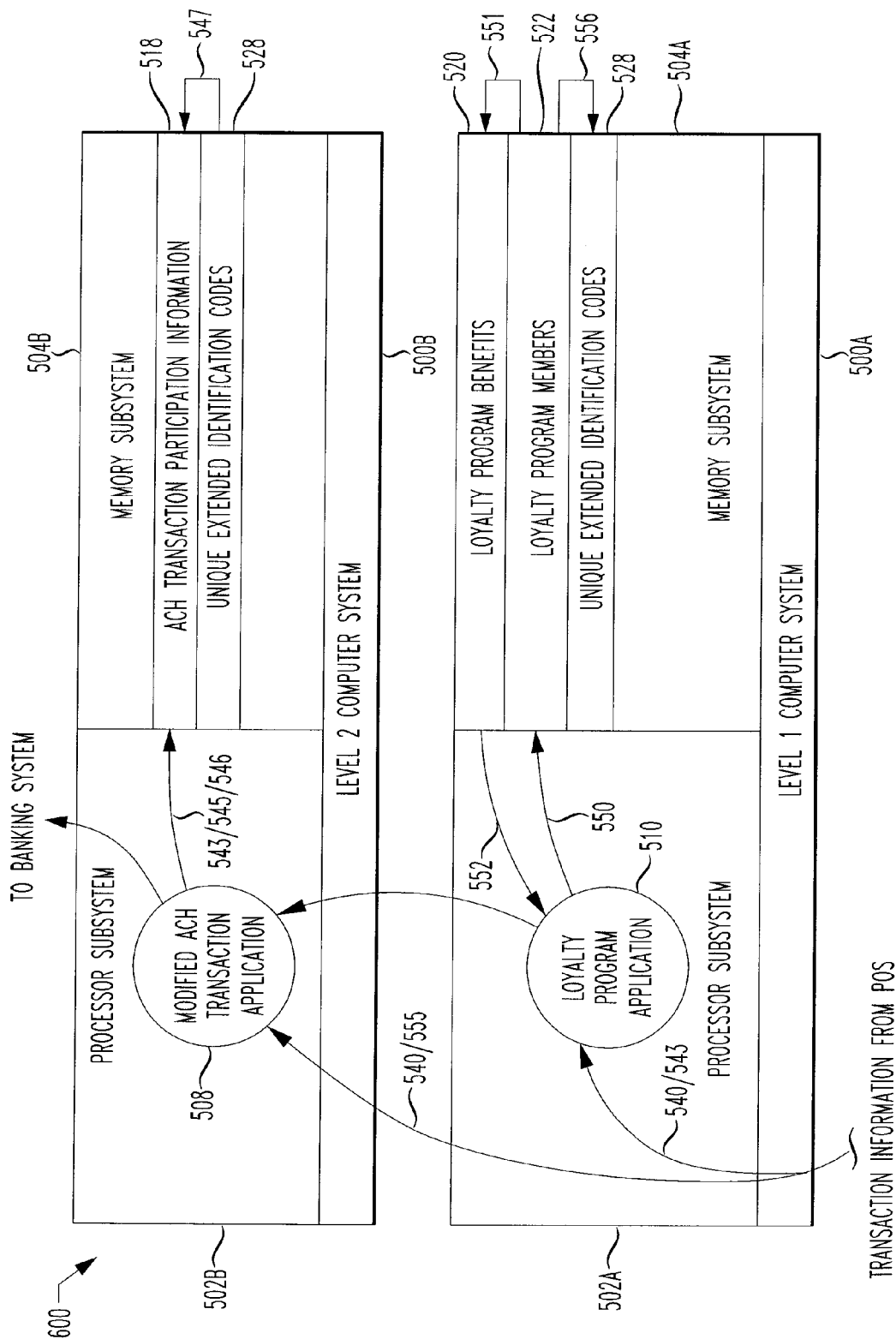
FIG. 5A is a block diagram of a hierarchical computer architecture used to access information used in modified ACH payment processing or linked loyalty programs.
Figure 5B:
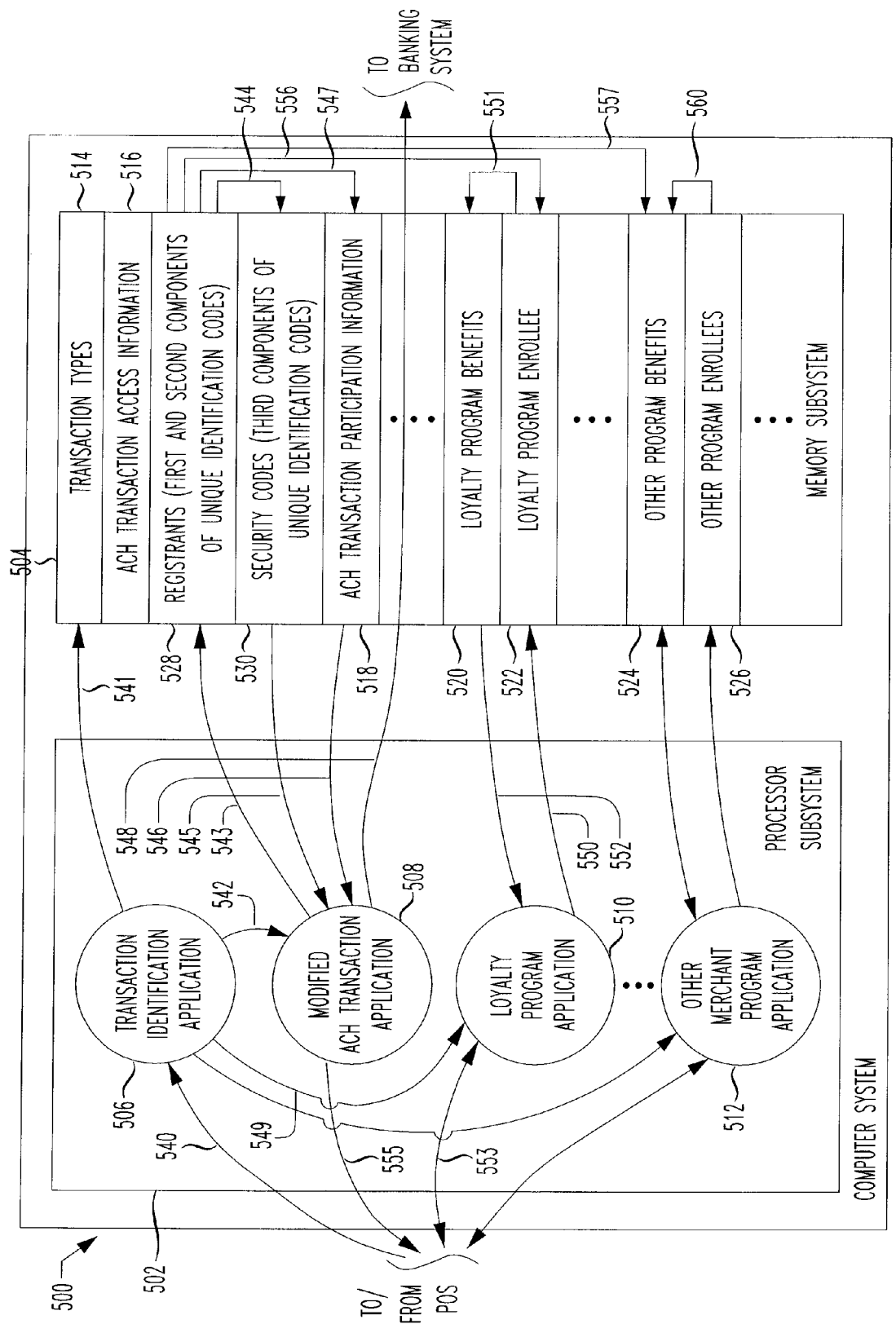
FIG. 5B is a block diagram of a computer system for performing modified ACH payment processing or linked loyalty programs.
Figure 5C:
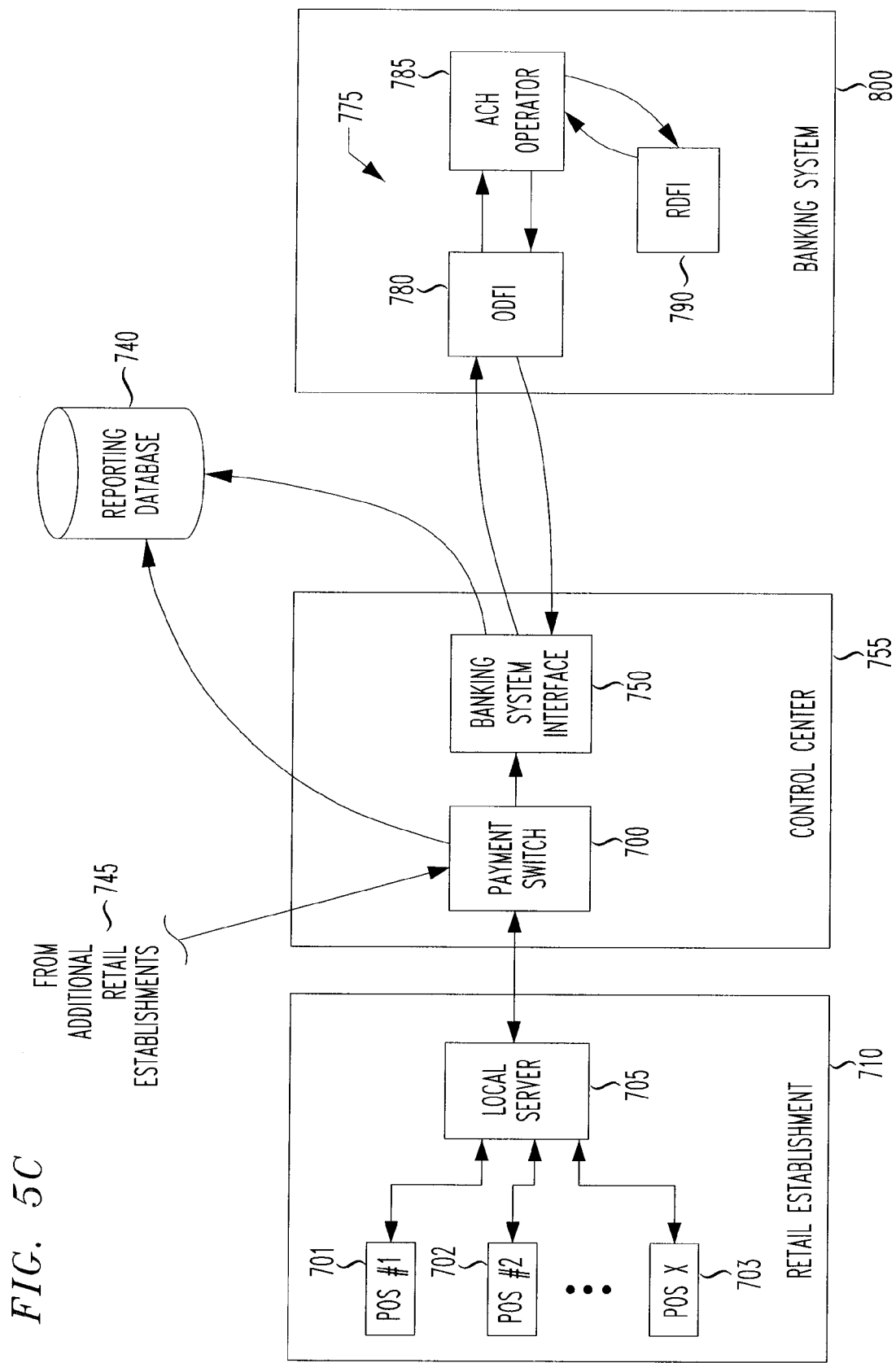
FIG. 5C is a block diagram of computer system for performing modified ACH payment processing.

Method 400 may be implemented via a computing system such as that set forth in FIG. 5C. Plural POS locations are represented by 701, 702, and 703 may be linked via a local area network to a local server 705 residing at a merchant location 710. An ACH payment transaction according to method 400 may be started by a customer at any of POS locations 701, 702, or 703 and processed as described previously via local server 705. The computer system 705 does not directly request the amount to be debited from the customer's account. Rather, the request is processed through the well-known ACH network and system 775, which is implemented by the banking system 800. The ACH process 775 includes a number of additional entities including, but not limited to, an originating depository financial institution (ODFI) 780, a central clearing facility 785, and a receiving depository financial institution (RDFI) 790. The ODFI 780 is the merchant's financial institution that receives formatted payment instructions from the merchant corresponding to the transaction request. In this regard, the computer system does not directly transmit the transaction request to the ODFI 780. Rather, the computer system passes the transaction requests a collection system, for example a payment switch 700, which records information related to the transaction in a database maintained by the merchant. Where the merchant operates multiple stores 745, various computer systems distributed at the store level may forward the transaction requests to a centralized server or payment switch 700 located at a control center 755 for consolidation of the transaction requests. The transaction requests may be formatted into a format suitable for transmission to the ODFI 780, which may be performed at the central server/switch or alternatively by an ODFI interface 750 such as a third party service provider. The payment switch 700 and/or the ODFI interface 750 may update transaction information in a reporting database 740 that is accessible by various components of the methods and systems described herein as needed for such information stored therein. The ODFI interface 750 may format and bundle plural transaction requests into a single data package for transmission to the ODFI 780, which in turn passes the instructions for each transaction received thereby to the central clearing house, commonly known as an ACH Operator 785. The ACH Operator 785 may be, for example, a federal reserve bank. Using the received instructions, the ACH Operator 785 identifies the RDFI 790. The ACH operator 785 then transmits the payment information to the identified RDFI 790. The RDFI 790 receives the payment information and processes the payment information. If funds are available, the ODFI 780 may receive the funds from the RDFI 790 on a settlement date. The foregoing is a highly simplified description of an ACH network and system 775. However, such systems are known in the art and, once the transaction request is received by the ODFI interface, any further processing of the transaction request in connection with the payment of funds to the merchant is conventional in nature and need not be described in further detail. Upon execution of the transaction at 426, the method may conclude, or alternatively may proceed with a tender-based reward as follows.

F. A Method for Distributing Tender-Based Rewards in a Loyalty Program

Figure 4B:
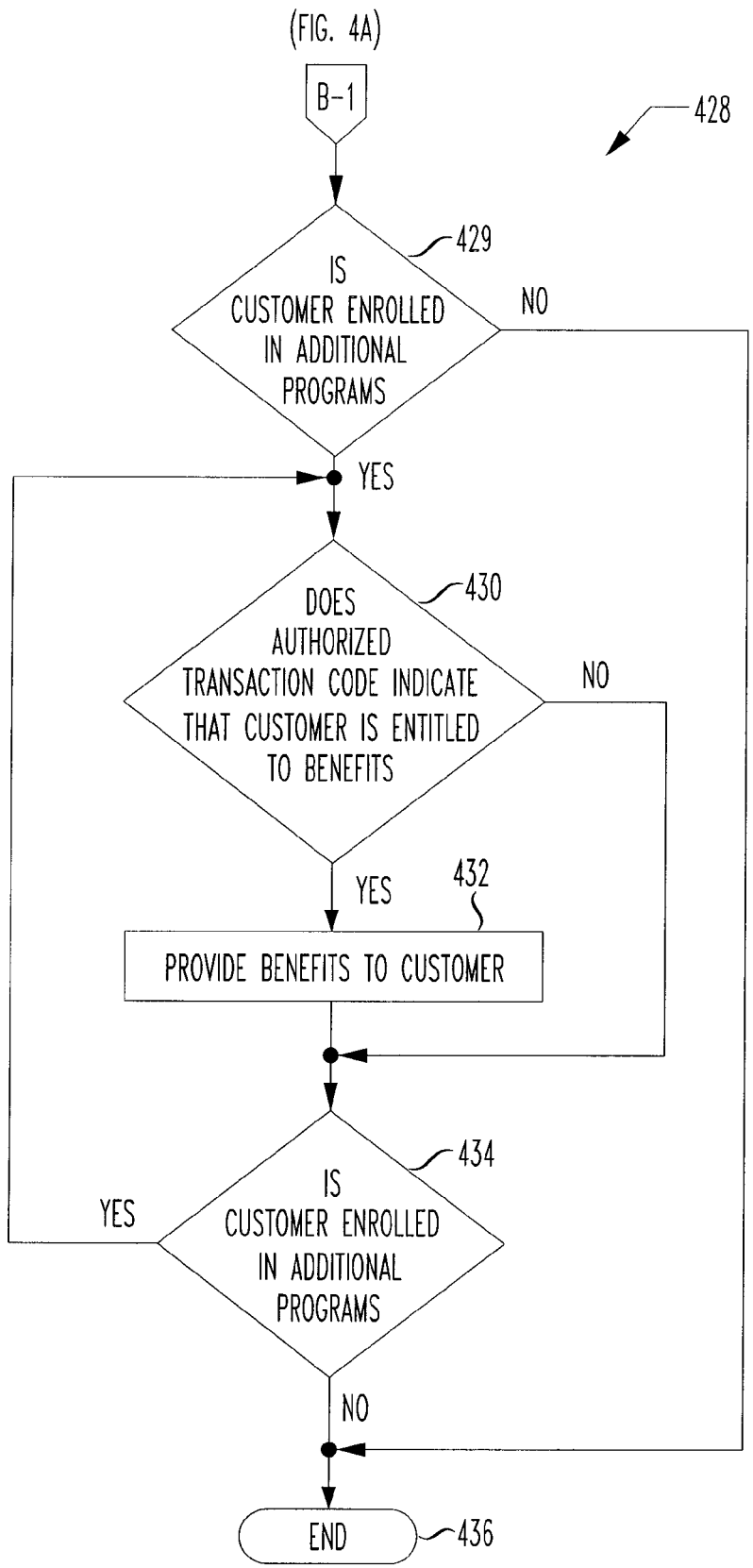
FIG. 4B is a flow chart of a method of providing additional benefits such as tender-based rewards as part of a card-free payment of goods or services.

Referring next to FIG. 4B, a method 428 for distributing tender-based rewards will now be described in greater detail. In the embodiment described and illustrated herein, the method 428 is initiated upon conclusion of the method 400 for card-free payment by a customer for goods or services to be purchased from a merchant. In this regard, it is noted that, in order for the customer to complete a card-free purchase, enrollment in either a modified ACH payment processing program or a linked loyalty program is required. Thus, in the embodiment disclosed herein, the customer is enrolled in both a card-free payment processing program and a second type of program—a tender based reward program. Enrollment in either a card-free payment processing program such as a modified ACH payment processing program or a linked loyalty program is not a requirement for enrollment in the tender-based reward program disclosed herein. Thus, the method 428 may be executed independently of method 400, and need not necessarily be preceded thereby. Similarly, enrollment in a loyalty program is also not a requirement for enrollment in the tender-based reward program. Finally, it is fully contemplated that the techniques disclosed herein are equally applicable to loyalty programs as well as other types of programs, offered to customers by a merchant, not specifically recited herein.

In the method described herein, certain links between the information maintained in the memory associated with the computer system are disclosed. The most common of these links involve the loyalty program. For example, when, as previously set forth, a customer enrolls in a loyalty program, an account number is assigned to the customer. This account number is then linked to a set of benefits which the customer shall receive in return for participating in the program. In this manner, the computer system is able to determine, based upon the account number for the customer, the benefits to which a customer is entitled to receive upon completion of a particular transaction. The card-free payment processing program, which is also referred to herein as a modified ACH payment processing program if the customer is not enrolled in a loyalty program or as a linked loyalty program if the customer is also enrolled in a loyalty program, operates in a somewhat similar fashion. During the enrollment process, a unique identification code is assigned to each customer. Within the memory, the unique identification code is linked to the customer's participation information, i.e., the information required to execute a financial transaction.

In this manner, the unique identification code is used to provide access to the information, for example, the routing number for a financial institution and an account number for a checking account maintained by the financial institution, required for initiation of a financial transaction, for example, a debit to the customer's checking account, using the card-free payment processing program. So that the customer may take advantage of the benefits of other programs in which they have enrolled, a link is established between the unique identification code and each such program. In this regard, while it is fully contemplated that the unique identification code may be linked directly to each additional program to which the customer has enrolled (including those maintained by the same merchant or other third parties), in the embodiment disclosed herein it is contemplated that the unique identification code for each customer is linked to the loyalty program account number for that customer and, in turn, the loyalty program account number for that customer is linked to the program benefits for each other program in which the customer is enrolled.

Thus, as may be seen in FIG. 4B, the method 428 commences at 429 where it is determined whether the customer is enrolled in any other programs, for example a tender-based reward program in which rewards are distributed based upon the type of tender offered by a customer enrolled in the program used in a completed transaction, for example, a purchase of goods or services completed in accordance with the card-free purchase method 400. While it is specifically contemplated that the tender-based reward program may be structured to distribute any desired type of reward to participating customers, a common reward is the cash rebate. In such a program, the merchant distributes cash rebates based upon a set percentage of purchases made using the desired type of tender. It is contemplated that the merchant or payment program third party may enjoy any number of benefits by offering a tender-based reward program such as the one described herein. For example, if the merchant is assessed a 3% service charge on transactions paid by credit card, the merchant or payment program third party may offer a tender-based reward program in which the customer is awarded a 1½% rebate on purchases made using cash or a card-free ACH transaction as described previously. By establishing such a program, the merchant or payment program third party may be able to recapture a significant portion of revenues lost to service charges assessed for transactions made on credit, particularly when a significant portion of the merchant's sales are made on credit. Similarly, the merchant or payment program third party may establish a tender-based reward program in which a set percentage of sales are donated to local charities if the purchases are made with a credit card issued by the merchant. Alternatively, a customer may accumulate points based upon tender type that may be used for discounts, free items, promotional items, etc. Likewise, discounts may be provided based on tender type. A wide variety of tender-based rewards are contemplated herein.

For the computer system to determine, at 429, whether a customer, here, a customer for whom a card-free payment transaction has just been completed in accordance with the method 400, is enrolled in an additional program offered by a merchant or program third party, here, the merchant with whom the customer has just completed the transaction, the computer system utilizes the unique identification code provided by the customer during the card-free payment transaction to link from the unique identification number to the loyalty program account number. From the loyalty program account number, the computer system may then link to the benefits associated with a first program, for example, the benefits associated with the aforementioned tender-based rewards program, in which the customer is enrolled. Conversely, the absence of such a link indicates that the customer is not enrolled in any additional programs. It is contemplated that, in the alternative, the loyalty program account number which identifies enrollees in the loyalty program may instead be linked to the enrollees in the tender-based rewards program. In turn, the enrollees in the tender-based rewards program would be linked to the corresponding benefits of participation in the tender-based rewards program.

If it is determined at 429 that the customer is not enrolled in any other programs, the method 428 ends at 436. If, however, it is determined at 429 that the customer is enrolled in another program, the method 428 then proceeds to 430 for determination if the customer is entitled to any benefits under the rules of the tender-based rewards program or other additional program in which the customer is enrolled. To do so requires access to two data components—the benefits associated with the tender-based reward program or other program in which the customer is enrolled and the authorized transaction code transmitted to the computer system by the POS. For example, the tender-based rewards program may be configured to distribute a cash rebate of 1½% of the purchase price if the customer tenders payment in the form of a direct debit from their checking account, which may be initiated as either a card-based or card-free transaction. By comparing information regarding the type of transaction conducted contained in the authorized transaction code to a list of rewards to be distributed depending on the type of transaction conducted, the computer system may determine, at 430, whether any benefits may be distributed to the customer. In the foregoing example, if the authorized transaction code indicates that the transaction was paid by direct debit to the customer's checking account and the other program benefits linked to the customer by the unique identification number contained in the authorized transaction code indicates that the customer shall receive a 1½% rebate if payment was made by direct debit, the computer system may determine at 430 that the customer is entitled to benefits under the tender-based reward distribution program and, continuing on to 432, the computer system may issue the indicated benefit to the customer. For example, the computer system may issue a command to the POS indicating that the customer is to receive a rebate of a selected amount of cash. Such rebate need not be paid instantly at the POS, but rather notification of the rebate may be provided at the POS and such rebates may be cumulated and issued periodically at the POS or otherwise, for example via mail. If, however, the comparison of the authorized transaction code and the list of transactions and associated benefits indicates that the customer has not completed a transaction which entitles the customer to a benefit, the method 428 proceeds to 434 for further processing.

Upon the computer system providing the indicated benefits to the customer at 432 or upon determining, at 430, that the customer has not completed any transactions which entitle the customer to any benefits under the program, the method proceeds to 434 for determination as to whether the customer is enrolled in an additional program offered by the merchant. As the method of determining, at 434, whether the customer is enrolled in another program which may or may not entitle the customer to benefits as a result of the completion of a transaction between merchant and the customer is generally similar to the method previously set forth with respect to 429, further description of 434 is not necessary. However, if it is determined at 434 that the customer is enrolled in an additional program offered by the merchant which may entitle the customer to benefits, the method 428 returns to 430 for further processing in accordance with the methods set forth above. If, however, it is determined at 434 that the customer is not enrolled in any other programs which may entitle the customer to benefits, the method 428 ends at 436.

G. A Computer System Suitable for Use in Conjunction With Either a Modified ACH Payment Processing or Linked Loyalty Program The methods hereinabove described in Sections (A) through (F) are implemented by use of a computer system 500 which, in various embodiments thereof, may be a PC, local server, remote server, or combinations thereof. In this regard, the term PC is intended to encompass any device which includes a memory subsystem and a processor subsystem configured to perform processing operations using the contents of the memory subsystem. Accordingly, it is noted that the term PC encompasses POS devices such as those described herein, for example a computerized cash register coupled to a pinpad device. In certain embodiments thereof, particularly those for which a merchant offering a program has plural stores in which transactions need to be tracked across multiple locations, for example, by providing a tender-based cash program which returns a cash rebate in return for tendering payment for the goods to be purchased in a specified form regardless of the purchase location, one or more components of the computer system 500 may be embodied as a network server residing at a remotely located control center and tied to plural local servers, each residing at a respective store operated by the merchant. In such an embodiment, transactions would be executed at the wide area network (WAN) network level. In an alternate embodiment, it is contemplated that one or more of components of the computer system 500 may be embodied as a local server residing at a work station located on the premises of a specific store operated by the merchant. In this embodiment, the local server would be tied to each downstream POS installed within the store and tied to the upstream WAN network server. In accordance with this embodiment, information captured or required locally, for example related to initial enrollments of customers in one or more programs, updates to the profiles of existing customers and/or information related to transactions which may materially affect rewards distributed to customers, would need to be updated periodically and made accessible to all locations. Accordingly, it is contemplated that locally captured information such as each new enrollment, change or execution of a transaction related to a loyalty program be uploaded to the WAN network server located at the control center for later download to each local server, for example, on a daily basis. In such an embodiment, transactions may be captured, executed, or both at the local area network (LAN) level. In still another alternate embodiment, it is contemplated that one or more components of the computer system 500 may be embodied as a POS tied to an upstream LAN server located, with the POS, within a store operated by the merchant. In turn, the LAN server would be tied to an upstream WAN network server. As with the prior embodiment, information captured or required at a local level such a information related to initial enrollments of customers in one or more programs, updates to the profiles of existing customers and/or information related to transactions which may materially effect rewards distributed to customers, would need to be updated periodically. Accordingly, it is contemplated that each new enrollment, change or execution of a transaction related to a loyalty program be uploaded to the WAN network server located at the control center for later download to the LAN network server located at each store operated by the merchant and, in turn, for subsequent download to each POS located at the store and coupled to the LAN network server.

In this regard and with reference to FIG. 5A, a multi-tier or hierarchical computing architecture 600 is contemplated wherein information and/or applications may reside at computer systems 500A and 500A residing at various tiers or levels. For example customer financial information may reside at a remote, centralized location having heightened security which is accessible at a local level via the WAN. Likewise, less sensitive information such as loyalty program participation information may reside at a local level and be accessible at a POS via the LAN. Such a multi-tier system is shown in FIG. 5A, which various like components thereof having like reference numerals described in more detail with reference to FIG. 5B and further described with respect to the various methods described herein that are carried out on the computing system.

The computer system 500 will now be described in greater detail with reference to FIGS. 5A-C. For ease of description, the computer system 500 has been greatly simplified and that many details not necessary for an understanding of the invention have been omitted. Furthermore, various components and functionality of the methods described herein may reside and be executed by the computing system according to the detailed description set forth previously. In this regarding FIG. 5B shows such components and their relationships via flow arrows between components (e.g., communications, operable coupling, functional relationships, etc.), and such disclosure is supplemental to the more detailed functional and communication relationships described previously herein. As may be seen by reference to FIG. 5B, the computer system 500 is comprised of a processor subsystem 502 coupled to a memory subsystem 504 by a bus subsystem (not shown). As used herein, the processor subsystem 502 encompasses the total processing capacity within the computer system 500, including, but not limited to, the central processing unit (CPU), any secondary processing unit or device residing within the computer system 500 and the like. Similarly, the memory subsystem 504 encompasses the total memory capacity within the computer system, including, but not limited to, the main memory, auxiliary memory (e.g., databases) and the like. As may be further seen, residing within the processor subsystem 502 are a first (or transaction identification) application 506, a second (or ACH transaction) application 508, a third (or loyalty program) application 510 and a fourth (or other merchant program) application 512. While illustrated, in FIG. 5B, as residing within the processor subsystem 502, each of the first, second, third and fourth applications 506, 508, 510 and 512 is comprised of a series of lines of code, maintained in the memory subsystem 504 and executable by the processor subsystem 502, and thus embodied as executed instantiations in processor subsystem 502. Further, while FIG. 5B illustrates each of the first, second, third and fourth applications 506, 508, 510 and 512 as being discrete applications, it is fully contemplated that one or more of the applications may, in fact, be subroutines within a common application. Similarly, any one of he first, second, third and fourth applications 506, 508, 510 and 512 may be configured as plural applications residing on the same or different processing units or devices, including distributed units or devices, which collectively comprise the processor subsystem 502. Finally, while FIG. 5B suggests that each of the first, second, third and fourth applications 506, 508, 510 and 512 reside on a common processor unit or device, the one or more of the applications may instead reside on a discrete and/or distributed processor unit or device of the one or more processor units or devices which, as previously set forth, collectively form the processor subsystem 502.

As may be further seen in FIG. 5B, the memory subsystem 504 is comprised of plural memory areas, which have been described during the discussion of the various method executed by the computing system or which will be apparent in view thereof. Examples of such memory areas include, including a first (or transaction types) memory area 514, a second (or ACH transaction access information) memory area 516, a third (or ACH transaction participation information) memory area 518, a fourth (or loyalty program benefits) memory area 520, a fifth (or loyalty program enrollees) memory area 522, a sixth (or other program benefits) memory area 524 and a seventh (or other program enrollees) memory area 526. In turn, the ACH transaction access information memory area 516 is subdivided into plural sub-areas, specifically, a first (or enrollees) memory sub-area 528 and a second (or authorization codes) memory sub-area 530. While FIG. 5B shows each of the memory areas 516, 518, 520, 522, 524 and 526, as well as memory sub-areas 528 and 530, as being contiguous areas within the memory subsystem 504, each such memory area may be comprised of one or more discrete and/or distributed locations, within the memory subsystems 504, accessible by write or read commands to a specified address corresponding to the discrete and/or distributed locations. Similarly, while FIG. 5B implies that the memory sub-areas 528 and 530 are located, in their entirety, within the second memory area 516, the memory sub-areas 528 and 530 may each be distributed among one or more of the locations which collectively define the memory area 516. One or both of the memory sub-areas 528 and 530 may be comprised of discrete contiguous areas within the memory subsystem 504 (in which case any such discrete areas would be considered to form part of the second memory area 516) or may be comprised of one or more discrete locations within the memory subsystem 504 (in which case any such discrete locations would be considered to form part of the second memory area 516).

In the description which follows, reference shall be made to "lists" of information which is maintained in various ones of the memory areas 516 through 526, and the contents of which having been described in more detail previously. As used herein, the term "list" refers to a series of entries, each written to a respective address within the corresponding memory area, comprised of a series of data bits which describes certain information contained in that entry. For example, a memory area may be used to describe a program which, for example, may be comprised of a description of the membership in and the benefits provided by the merchant program. In turn, the memory area would include one or more lists, each comprised of a series of entries. In one configuration, the memory area would include a single list in which each entry is an encoded description of a member in the program and the benefits accorded to that member. In another configuration, the memory area would include first and second lists. In the first list, each entry would be an encoded description of a member of the program and, in the second list, each entry would be an encoded description of each benefit which may be accorded to one or more members of the program. A link between each member of the program and the benefits which the member is eligible to receive would then be established. The foregoing description has been greatly simplified and that only those details which are necessary to an understanding of the disclosure have been included in the description set forth herein.

A description of a transaction will now follow. The description that follows includes certain specifics regarding the manner in which the transaction is executed. Such specifics should not be viewed as either an implicit or explicit statement as to configuration of any particular portions of the process by which a transaction completing a transaction. Rather, in order to set forth a clear and concise description of the process, it was necessary to select a single configuration for the disclosed process. Thus, while the process may have a wide variety of configurations, only one such configuration is disclosed herein.

The transaction to be described herein is a card-free payment transaction in which a customer seeks to pay for goods by initiating a modified ACH transaction which may cause funds to be drawn from a checking account maintained in a financial institution by the customer. After a cashier has determined the amount needed to purchase the desired goods, the customer indicates that they intend to use the merchant's card-free purchase program to purchase the goods. The customer would then indicate the desired form of payment by depressing a button marked "card-free purchase" on a pinpad installed at and coupled to a POS manned by the cashier. The POS would then generate a message for display on the pinpad which reads "Please enter your ten digit telephone number." Upon the customer entering the telephone number using the pinpad, the POS would generate a second message, again for display on the pinpad, which reads "Please enter the month and date of your birth (XXYY)." Upon the customer entering the month and date of birth, again, using the pinpad, the POS would generate a third message, this one reading "Please enter your four digit security code, for display on the pinpad The customer would again use the pinpad to enter their security code.

Using the information provided by the customer, the POS would then construct an authorized ACH transaction message for transmission via 540 to the computer system 500. The authorized ACH transaction message would be comprised of first, second and third fields, the first containing a transaction type code, the second containing an authorization code and the third containing a transaction descriptor. The transaction type field indicates, based on the desired form of payment input by the customer, that the transaction to be executed by the POS is a card-free payment transaction. The authorization code contains the information necessary to access the financial information, maintained by the computer system 500, to execute the desired card-free payment transaction. Finally, the transaction descriptor contains any other information necessary for the computer system 500 to complete the transaction. For purchases, the transaction descriptor would contain the cost of the goods to be purchased by the customer.

Upon construction of the authorized ACH transaction message, the POS transmits via 540 the authorized ACH transaction message to the transaction identification application 506. The transaction application 506 may then identify the type of transaction to which the received authorized ACH transaction message relates. To identify the type of transaction, the transaction application 506 compares via 541 the transaction type contained in the first field of the received authorized ACH transaction message to the list of transaction types maintained in the first memory area 514. Upon identifying a match between the transaction type contained in the first field of the received authorized transaction message to one of the listed transaction types, the transaction identification application would forwarding the received authorized ACH transaction message to the appropriate application for execution of the message. Here, as the matching transaction type is an ACH transaction, the transaction identification application would forward via 542 the received authorized ACH transaction message to the modified ACH transaction application 508.

Upon receipt of the authorized ACH transaction message from the transaction identification application 506, the modified ACH transaction application 508 first determines if the message is actually an authorized message. To do so, the modified ACH transaction application 508 may compare via 543 a first portion of the authorization code contained in the second field of the authorized transaction message to the list of people who have registered for card-free payment of purchases contained in the first sub-area 528 of the second memory area 516 of the memory subsystem 504. As previously set forth, each person that has been enrolled for card-free payments is uniquely identified by the combination of their ten digit telephone number and their four digit birth date. Thus, to confirm that the authorized ACH transaction message has been issued on behalf of a person who has registered for card-free payment of transactions, the modified ACH transaction application 508 compares the first portion of the second field of the received authorized transaction message containing the telephone number and birth date for the person requesting card-free payment of a transaction to the list of registrants contained in the first memory sub-area 528. Upon identifying a match between the first portion of the second field of the received authorized transaction message and an entry in the list of registrants contained in the first memory sub-area 528, the modified ACH transaction application 508 determines that the person requesting card-free payment of a transaction is a person who had registered for the card-free payment program.

Each registrant set forth in the list of registrants maintained in the memory sub-area 528 is linked via 544 to a PIN contained in a list of security codes maintained in the second memory sub-area 530. While the person requesting card-free payment of a purchase has been identified, in order to authenticate the requesting person, the modified ACH transaction application 508 shall access via 545 and compare the PIN contained in a second portion of the second field of the received authorized ACH transaction message to the PIN, contained in the list of security codes maintained in the second memory sub-area 530, linked via 544 to the registrant contained in the list of registrants maintained in the first memory sub-area 528 matched to the first portion of the second field of the received authorized ACH transaction message. If the PIN contained in the second portion of the second field of the received authorized ACH transaction matches the linked PIN, then the modified ACH transaction application 508 concludes that the identify of the person requesting card-free payment of a purchase has been confirmed as a person entitled to make card-free payments for purchases.

Having confirmed that the person requesting card-free payment of a purchase is a person entitled to make card-free payments for purchases, the modified ACH transaction application 508 may now initiate an ACH transaction via 546. In addition to a PIN, each registrant in the list of registrants maintained in the first memory sub-area 528 is linked via 547 to an entry, in the third memory area 518, containing the information to be used by the modified ACH transaction application 508 to complete the card-free payment for a purchase. As previously set forth, the information to be used to complete payment includes the routing number assigned to the financial institution which maintains an account that the registrant intends to debit to pay for the purchase and the account number for that account. Accessing via 546 and using the routing number and account number linked via 547 to the person previously identified as having requested card-free payment for a purchase and the amount of the purchase contained in the transaction descriptor of the authorized ACH transaction message received from the transaction identification application 506, the modified ACH transaction application 508 assembles a request for initiation of an ACH transaction for transmission via 548 to a payment switch 700 of FIG. 5C, which (1) generates a record for the ACH transaction for transmission to a database; and (2) passes the request to an interface 750 to the banking system 800 of FIG. 5C. In turn, the interface 750 formats the information contained in the request originated by the modified ACH transaction application 508 into a format suitable for processing by the banking system 800, bundles the request with other requests and initiates a corresponding transaction with the banking system for processing, by the banking system in accordance with conventional techniques described previously. The modified ACH transaction application 508 further notifies the POS of transaction approval via 555.

As previously set forth, applications other than the transaction identification application 506 and the modified ACH transaction application 508 may reside on the processor subsystem 502. One such application is the loyalty program application 510. Use of stand-alone applications which administer loyalty programs are known and need not be described in great detail herein. Briefly however, one method in which such a stand-alone loyalty application may function is that the POS transmits via 540 a loyalty program transaction message to the transaction identification application 506 (if multiple applications that provide services to customers of the merchant reside on the processor subsystem 502) or directly to the loyalty program application 510 (if no other applications which provide services to customers of the merchant reside on the processor subsystem 502). If appropriate, the transaction identification application 506 would identify the message as a loyalty program transaction message and re-direct the message via 549 to the loyalty program application 510. In contrast with the authorized ACH transaction message, the first field of the loyalty program transaction message would identify the message as a loyalty program transaction message, the second field of the loyalty program transaction message would contain the account number of the customer enrolled in the loyalty program and the third field would contain the information related to customer's transaction with the merchant necessary to provide the customer with the benefits to which they are entitled. To confirm the identity of the customer requesting benefits and the benefits to which the customer is entitled, the loyalty program 510 may interact via 550 with the list of loyalty program enrollees maintained in the fifth memory area 522 and the loyalty program benefits maintained in the fourth memory area 520 and linked via 551 to the list of enrollees in the loyalty program maintained in the fifth memory area 522. After determining via 552 the benefits to which the enrollee is entitled, the loyalty program application may forward via 553 a command message to the POS which may cause the POS to provide the benefits to the customer. Any other merchant program applications 512, for example, a tender-based reward program, may be accessed and operate in a manner similar to the loyalty program, as described previously herein and depicted functionally in FIG. 5B. Accordingly, further description of how the other merchant program application 512 functions is not necessary.

As previously set forth, if a customer is both entitled to make card-free payments for purchases and receive benefits by virtue of their enrollment in the loyalty program, the customer is identified as being a participant in the loyalty program. While it is contemplated that the linked loyalty program may be configured, one suitable example is described below. The foregoing description is provided purely by way of example and it is fully contemplated that other configurations are equally suitable for the purposes contemplated herein.

For a linked loyalty program, the process at the POS may remain generally unchanged. However, in one configuration of the linked loyalty program, the transaction descriptor constructed for transmission to the transaction identification application 506 may be modified to include the information necessary to determine the benefits to which the customer is entitled should they be participants in the linked loyalty program. In an alternate configuration, in order to eliminate the transfer of unneeded loyalty program information for customers who are enrolled in the modified ACH payment processing program but are not enrolled in the loyalty program, the POS may be configured to maintaining a list of unique identification codes and, if the customer to which the unique identification code has been assigned, the corresponding loyalty program account number for the customer. In this configuration, the customer would only need to provide their unique identification code entitling them to card-free payments for purchases. In turn, the POS would search the list of unique identification codes for a match with the unique identification code provided by the customer. If the unique identification code matching the provided unique identification code has a corresponding loyalty program account number associated therewith, the POS would then append the information necessary to determine the benefits to which the customer is entitled to the transaction descriptor. In still another configuration, upon determining that the customer requesting a card-free payment for a purchase is also a member of the loyalty program offered by the merchant, the POS may construct two messages for transmission to the processor subsystem—a first to be used in the manner previously set forth to permit the customer to make a card-free payment for a purchase and a second to be used in the manner previously set forth to permit the customer to receive the benefits to which they are entitled to receive as a participant in the loyalty program. As before, the foregoing configuration may be similarly employed if the customer requesting a card-free payment for a purchase is also enrolled in another program offered by the merchant, for example, a tender-based reward distribution program, or is also enrolled in both a loyalty program and another program offered by the merchant, for example, the tender-based reward distribution program.

Returning to the configuration in which the POS determines whether the customer requesting a card-free payment is also a member of the loyalty program and in which the authorized ACH transaction message is transmitted to the transaction identification after modification, of the transaction descriptor, to include the information necessary to provide the benefits to which the customer requesting a card-free payment for a purchase is entitled to as a participant in the loyalty program, the process by which the ACH transaction is initiated is modified slightly to provide the customer with the benefits associated with being a participant in the loyalty program. As previously set forth, each entry in the memory sub-area 528 identifying a person authorized to make card-free payment for purchases is also linked via 556 and 557 to the corresponding entry or entries for that person in the memory sub-areas listing other programs offered by the merchant for which that person has enrolled. For example, if the customer requesting a card-free payment for a purchase is also enrolled in the loyalty program, the entry in the memory sub-area 528 for that person would be linked via 556 to the corresponding entry for that person in the fifth memory area 522 identifying those customers enrolled in the loyalty program. Similarly, if the customer authorized to make card-free payments for purchases is also enrolled in another program such as the tender-based reward distribution program, the entry in the memory sub-area 528 for that person would be linked via 557 to the corresponding entry for that person in another memory area, for example, the memory area 526, identifying participants in the tender-based reward distribution program. Memory sub-areas may be further linked, for example sub-area 526 linked via 560 to sub-area 524.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. may be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of enrolling a customer in a merchant savings program, comprising:
    (a) receiving from the customer a unique identification number, wherein the unique identification number is chosen by the customer for accessing the merchant savings program after the customer has been enrolled in the merchant savings program, and wherein receipt of the unique identification number does not require the participation of a customer's physical device; and
    (b) associating by the merchant the unique identification number with the savings program such that the customer may accumulate savings from the merchant in accordance with the savings program.

2. The method of claim 1 further comprising:
    (a) presenting electronically to the customer at a point of sale terms and conditions of the savings program; and
    (b) receiving electronically from the customer at the point of sale, acceptance of the terms and conditions of the savings program, wherein the acceptance does not require the participation of a customer's physical device.

3. The method of claim 2 wherein the presenting and accepting are via a merchant's pinpad.

4. The method of claim 2 wherein the customer's physical device comprises a card, RFID tag, mobile telephone, or combinations thereof.

5. A method of enrolling a customer in a merchant payment program, comprising:
    (a) receiving from the customer, data comprising account information and a unique identification number, wherein the unique identification number is chosen by the customer for accessing the merchant savings program after the customer has been enrolled in the merchant savings program, and wherein receipt of the data and the unique identification number does not require the participation of a customer's physical device; and
    (b) associating by the merchant the unique identification number with the account information such that the merchant may receive payment via an ACH transaction from the account.

6. The method of claim 5 wherein the unique identification number comprises the customer's telephone number, date of birth, or both.

7. The method of claim 5 wherein the data further comprises a security code for authorizing the payment of goods purchased from the merchant.

8. The method of claim 5 wherein the data is received at a point of sale.

9. The method of claim 5 wherein the data is received in a check-out lane.

10. The method of claim 5 wherein all or a portion of the data is provided via a merchant's pinpad.

11. The method of claim 10 wherein the merchant's pinpad is associated with a cash register.

12. The method of claim 5 further comprising verifying by the merchant the identity of the customer.

13. The method of claim 5 further comprising verifying by the merchant the validity of the account information provided by the customer.

14. The method of claim 5 further comprising cross-checking the identity of the customer against a list of prohibited customers.

15. The method of claim 5 further comprising associating by the merchant the unique identification number with a savings program such that the customer's savings from the merchant may accumulate in accordance with the savings program.

16. The method of claim 15 further comprising providing the customer with a loyalty card having a unique card number and associating by the merchant the unique card number with the account information such that the merchant may conduct business with the customer via an ACH transaction from the account by using the unique identification number, the unique card number, or both.

17. The method of claim 16 wherein the unique identification number, the unique card number, or both, allows one or more merchants, in addition to the enrolling merchant, to conduct business with the customer.

18. The method of claim 17 wherein at least one of the other merchants provide the customer with an additional unique card number associated with a savings program of the other merchant and the additional unique card number is associated with the account information such that the other merchant may conduct business with the customer via an ACH transaction from the account by receiving at least one of the unique identification number, the unique card number, the additional unique card number, or combinations thereof.

19. The method of claim 18 wherein the conducting of business by the enrolling merchant, or one or more other merchants, with the customer allows one or both of such merchants, in accordance with the respective savings program, to provide for the accumulation of the customer's savings under the respective savings program.

20. The method of claim 5 wherein the unique identification number allows one or more merchants, in addition to the enrolling merchant, to conduct business with the customer.

21. The method of claim 5 further comprising presenting electronically to the customer at a point of sale terms and conditions of the payment program; and accepting electronically by the customer at the point of sale the terms and conditions of the payment program.

22. The method of claim 21 wherein the presenting and accepting are via a merchant's pinpad.

23. The method of claim 5 wherein the business conducted comprises receipt of payment for goods purchased by the merchant.

24. The method of claim 5 wherein the account information identifies two or more separate accounts from which payment may be received by the merchant.

25. The method of claim 24 wherein the separate accounts comprise accounts from different financial institutions.

26. The method of claim 24 wherein the separate accounts comprise a savings account, a checking account, a line of credit, a credit card account, or combinations thereof.

27. The method of claim 26 wherein the line of credit or credit card account is from the merchant.

28. The method of claim 5 further comprising providing one or more additional unique identification numbers corresponding to one or more additional users authorized to use the account and associating the one or more additional unique identification numbers with the account information such that the merchant may likewise conduct business with the additional authorized users.

* * * * *